(12) United States Patent
Nishitani et al.

(10) Patent No.: US 8,839,699 B2
(45) Date of Patent: Sep. 23, 2014

(54) LONG SHAFT INNER SURFACE MACHINING APPARATUS AND METHOD THEREFOR

(75) Inventors: Akiyuki Nishitani, Tokyo (JP); Miki Shinagawa, Tokyo (JP); Nobuyuki Suzumura, Tokyo (JP); Kiyokazu Mikanagi, Tokyo (JP); Wataru Ueda, Tokyo (JP); Tomoo Mizuno, Tokyo (JP)

(73) Assignee: IHI Corporation, Tokyo (JP)

( * ) Notice: Subject to any disclaimer, the term of this patent is extended or adjusted under 35 U.S.C. 154(b) by 939 days.

(21) Appl. No.: 12/921,749

(22) PCT Filed: Mar. 10, 2009

(86) PCT No.: PCT/JP2009/054483
§ 371 (c)(1),
(2), (4) Date: Dec. 3, 2010

(87) PCT Pub. No.: WO2009/113510
PCT Pub. Date: Sep. 17, 2009

(65) Prior Publication Data
US 2011/0079120 A1 Apr. 7, 2011

(30) Foreign Application Priority Data
Mar. 20, 2008 (JP) .................. 2008-058961

(51) Int. Cl.
*B23B 41/02* (2006.01)
*B23Q 17/22* (2006.01)
*B23B 29/034* (2006.01)
*B23B 31/40* (2006.01)

(52) U.S. Cl.
CPC ............ *B23B 41/02* (2013.01); *B23Q 17/2275* (2013.01); *B23Q 17/2233* (2013.01); *B23B 29/03417* (2013.01); *B23B 31/4053* (2013.01)
USPC ............... 82/1.4; 408/57; 408/13; 408/158; 408/83

(58) Field of Classification Search
USPC ............... 82/1.2, 1.4, 1.5; 408/2, 13, 11, 8, 9, 408/79–83, 104, 107, 158, 157, 161, 56, 57
See application file for complete search history.

(56) References Cited

U.S. PATENT DOCUMENTS 2,247,284 A * 6/1941 Young ............................ 82/1.2
3,854,839 A * 12/1974 Gottelt .......................... 408/129

(Continued)

FOREIGN PATENT DOCUMENTS

| JP | 51-34594 | 9/1976 |
|---|---|---|
| JP | 55-31573 A | 3/1980 |

(Continued)

OTHER PUBLICATIONS

International Search Report, issued in corresponding application No. PCT/JP2009/054483, completed Jun. 2, 2009, mailed Jun. 16, 2009.

(Continued)

*Primary Examiner* — Andrea Wellington
*Assistant Examiner* — Brendan Ayer
(74) *Attorney, Agent, or Firm* — Griffin & Szipl, P.C.

(57) ABSTRACT

A long shaft inner surface machining apparatus of the present invention includes: a long shaft support device 10 that fixes a long shaft 1 so as not to bend; a machining head 20 capable of being inserted into the prepared hole 2 of the long shaft 1 in the axial direction; a head support device 30 that is coupled with the machining head 20 from one end of the long shaft 1 through the prepared hole 2 and moves the machining head 20 in the axial direction; and a blade drive device 40 that is coupled with the machining head from the other end of the long shaft 1 through the prepared hole 2 and rotary-drives the blade 29 around a shaft axis.

38 Claims, 27 Drawing Sheets

(56) References Cited

U.S. PATENT DOCUMENTS

| | | | |
|---|---|---|---|
| 4,084,484 A * | 4/1978 | Shklyanov et al. | 409/140 |
| 4,400,118 A * | 8/1983 | Yamakage et al. | 408/3 |
| 4,425,693 A * | 1/1984 | Dickinson | 29/90.01 |
| 4,451,185 A * | 5/1984 | Yamakage | 408/2 |
| 4,581,808 A * | 4/1986 | Lawson et al. | 29/558 |
| 4,715,751 A * | 12/1987 | Rigoulot | 409/139 |
| 4,954,023 A * | 9/1990 | Bromley | 408/1 R |
| 5,062,187 A * | 11/1991 | Bromley | 29/33 T |
| 5,150,496 A * | 9/1992 | Bromley | 29/33 T |
| 5,544,985 A * | 8/1996 | Lane | 408/56 |
| 5,857,813 A * | 1/1999 | Kress et al. | 408/1 R |
| 6,012,880 A * | 1/2000 | Horn et al. | 408/156 |
| 6,062,778 A * | 5/2000 | Szuba et al. | 408/156 |
| 6,243,962 B1 * | 6/2001 | Brock | 33/542 |
| 6,270,295 B1 * | 8/2001 | Hyatt et al. | 408/1 R |
| 6,287,057 B1 * | 9/2001 | Kurz | 408/1 R |
| 6,312,200 B1 * | 11/2001 | Graham et al. | 408/1 R |
| 6,343,899 B1 * | 2/2002 | Straub et al. | 408/54 |
| 6,554,549 B1 * | 4/2003 | Kurz | 408/1 R |
| 6,705,185 B2 * | 3/2004 | Bruggemann | 82/82 |

FOREIGN PATENT DOCUMENTS

| | | |
|---|---|---|
| JP | 58-071015 | 4/1983 |
| JP | 60-178548 | 11/1985 |
| JP | 02-139110 | 5/1990 |
| JP | 04-331002 A | 11/1992 |
| JP | 05-337707 | 12/1993 |
| JP | 7-246 | 1/1995 |
| JP | 09-314408 A | 12/1997 |
| JP | 10-202434 | 8/1998 |
| JP | 2000-246593 A | 9/2000 |
| JP | 2002-283112 A | 10/2002 |
| JP | 2007-152465 A | 6/2007 |

OTHER PUBLICATIONS

Office Action issued in corresponding Japanese application 2009-050941 on Aug. 22, 2013.

* cited by examiner

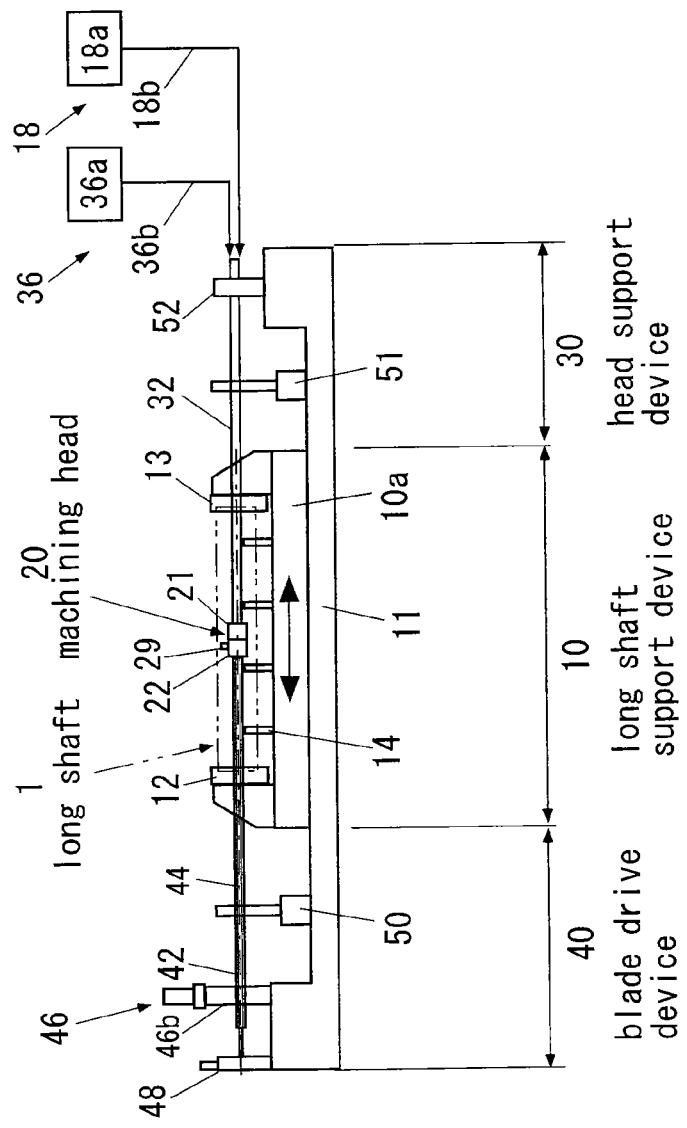

LONG SHAFT INNER SURFACE MACHINING APPARATUS AND METHOD THEREFOR

This is a National Phase Application in the United States of International Patent Application No. PCT/JP2009/054483 filed Mar. 10, 2009, which claims priority on Japanese Patent Application No. 2008-058961, filed Mar. 10, 2008. The entire disclosures of the above patent applications are hereby incorporated by reference.

TECHNICAL FIELD OF THE INVENTION

The present invention relates to an apparatus to cut an inner surface of a long shaft such as a long shaft that couples a turbine with a fan or a compressor in a jet engine and a method therefor.

DESCRIPTION OF THE RELATED ART

A slender hollow shaft (e.g., overall length: about 3 m, outer diameter of a major part: 10 to 20 cm) called a long shaft is used to couple a turbine with a fan or a compressor in a jet engine. Such a long shaft is required to be thin-walled for light weight and to have a high rotational balance accuracy to allow for high-speed rotation with a turbine. Therefore, it is difficult to use normal inner-surface machining apparatuses (e.g., boring machine) for this purpose, and a machining flow as illustrated in FIG. 1 is used.

That is, (A) after rough machining of an outer surface of a long shaft 101, (B) sulfur 103 is molded into a gap between a core bar 102 and the long shaft 101, (C) after solidification of the sulfur, a boring bar 104 of approximately the same diameter as that of the core bar 102 is inserted, and (D) an inner surface is machined by a tool 106 at a tip part 105 while pulling the boring bar 104 out.

By such means, the tip part 105 of the boring bar 104 can be supported by the solidified sulfur 103, thus preventing wobbling of the center of the tool 106 at the tip part, and the inner surface is machined together with the sulfur 103, so that a long shaft can be machined with less fluctuations in the inner diameter.

As an inner-surface copying apparatus related to the present invention, Patent Document 1 is disclosed. As an inner-surface machining apparatus for long shaft as stated above, Patent Document 2 is already disclosed, for example.

A "copy machining apparatus of an inner surface of a tube" of Patent Document 1 has an object to, when using a cutting blade to cut an inner surface of a tube such as a steel tube, enable cutting with a constant thickness along the inner surface of the steel tube even when the inner diameter is not a true circle, and to provide a finished surface with a roughness of good quality.

To this end, as illustrated in FIG. 2A and FIG. 2B, this invention provides a copy machining apparatus for an inner surface of a tube including: a rotary drive apparatus 119 that rotates a tube A around its axis while supporting one end thereof; a boring bar 111 capable of moving forward and backward in the axis direction of the tube; and a boring head 112 attached at a tip of the boring bar and provided with a cutting blade 113, the boring head capable of being inserted into the tube, wherein the boring head 112 includes: a mount bush 117a with a built-in spring provided inwardly of the radial direction from the circumferential surface on the tip end side of the boring head 112; a supporter 116c supported by the spring; one movable shoe 116 fixed to an outer end of the supporter and biased to an outside of the boring head so that the movable shoe 116 can protrude and recede; one fixed shoe 114 provided at a position opposed to the movable shoe and protruding from a circumferential surface of the boring head provided in the vicinity of a cutting blade 113; and one fixed shoe 115 of the same height and provided on a rear side of the fixed shoe in a rotary direction of the tube and at a middle position from the movable shoe 116.

"A long shaft inner surface machining apparatus" of Patent Document 2 has an object to prevent idle running due to slip of sulfur without using sulfur nonslip paint.

To this end, as illustrated in FIG. 3A and FIG. 3B, this invention includes: a shaft rotating device 122 to rotary-drive a long shaft 121 around a shaft center Z-Z; and a tool moving device 126 to move a machining tool 124 along the shaft center within the long shaft. The machining tool 124 includes: a hollow tube 139 extending along the shaft center of the long shaft, an expansion and contraction rod 132 penetrating through the tube 139; a knurling tool support part 134 including a knurling tool 133; a parallel link 135 to couple the knurling tool support part with a tip part of the hollow tube; and an expansion and contraction link 136 to couple the knurling tool support part with the tip part of the rod.

[Patent Document 1]
Japanese Patent Publication No. H07-246, "copy machining apparatus of an inner surface of a tube"

[Patent Document 2]
Japanese Patent Application No. H10-202434, "long shaft inner surface machining apparatus"

SUMMARY OF THE INVENTION

FIG. 4 schematically illustrates a long shaft as a target of the present invention. This long shaft 1 has a balance already adjusted and has an inner surface 2 (prepared hole) machined as a true circle or to be concentric with reference to the shaft axis, to which boring machining has to be done so as to copy the prepared hole 2.

The long shaft 1 of FIG. 4 has a prepared hole 2 with a small diameter at both ends (in this example, 96 mm and 79 mm) and an expanded diameter (in this example, 130 mm) at a mid part, and therefore the apparatus of Patent Document 1 cannot be used because a machining head is too large to be inserted in the hole. Further, since a tool reaction force will occur due to stiffness of the boring bar, the ratio of the diameter relative to the length cannot be made small. Further, since a blade drive mechanism and a coolant supply mechanism are disposed within the boring bar, the diameter thereof cannot be made small.

Meanwhile, the apparatus of Patent Document 2 requires a large number of machining steps as stated above including molding sulfur within the long shaft 1. When boring machining of the shaft with balance already adjusted is done, the boring machining has to be done precisely so as to copy the prepared hole. However, according to the conventional technique, an inner circumferential surface is machined with reference to the outer diameter, and therefore precise copy machining cannot be done.

The present invention is to solve with the above-stated problems. That is, it is an object of the present invention to provide a long shaft inner surface machining apparatus and a method therefor, by which, even when a slender long shaft with a prepared hole of about 100 mm at both end parts and about 130 mm at a mid part and with the overall length of about 3 m is to be machined, a maximum diameter of a machining head inserted in the long shaft can be made smaller than the prepared hole at both end parts of the long shaft, deterioration in machining precision can be prevented due to a tool reaction force during machining, a machining unable range can be minimized, and an inner surface of the long shaft can be machined precisely so as to copy the prepared hole.

(1) A long shaft inner surface machining apparatus of the present invention cuts an inner surface of a long shaft including a prepared hole penetrating therethrough in an axial direction so as to copy the prepared hole. The long shaft inner surface machining apparatus includes: a long shaft support device that fixes the long shaft so as not to bend; a machining head capable of being inserted into the prepared hole of the long shaft in the axial direction, including a blade for inner surface machining movable in a radial direction, having a function of letting a rotation center of the blade coincide with a shaft axis of the prepared hole, and being movable within the prepared hole in the axial direction; a head support device that is coupled with the machining head from one end of the long shaft through the prepared hole and moves the machining head in the axial direction; and a blade drive device that is coupled with the machining head from the other end of the long shaft through the prepared hole and rotary-drives the blade around a shaft axis.

(2) Further, a long shaft inner surface machining apparatus of the present invention cuts an inner surface of a long shaft including a prepared hole penetrating therethrough in an axial direction so as to copy the prepared hole. The long shaft inner surface machining apparatus includes: a long shaft support device that fixes the long shaft so as not to bend, and rotates the long shaft around a shaft center thereof; a machining head capable of being inserted into the prepared hole of the long shaft in the axial direction, including a blade for inner surface machining movable in a radial direction, having a function of letting a rotation center of the blade coincide with a shaft axis of the prepared hole, being movable within the prepared hole in the axial direction, and permitting rotation of the long shaft in a state of being inserted in the prepared hole; a head support device that is coupled with the machining head from one end of the long shaft through the prepared hole and moves the machining head in the axial direction; and a blade drive device that is coupled with the machining head from the other end of the long shaft through the prepared hole and moves the blade in the radial direction.

(3) Further, a long shaft inner surface machining apparatus of the present invention cuts an inner surface of a long shaft including a prepared hole penetrating therethrough in an axial direction so as to copy the prepared hole. The long shaft inner surface machining apparatus includes: a long shaft support device that fixes the long shaft so as not to bend, and moves the long shaft in the axial direction; a machining head capable of being inserted into the prepared hole of the long shaft in the axial direction, including a blade for inner surface machining movable in a radial direction, having a function of letting a rotation center of the blade coincide with a shaft axis of the prepared hole, and permitting axial direction movement of the long shaft in a state of being inserted in the prepared hole; a head support device that is coupled with the machining head from one end of the long shaft through the prepared hole and fixes an axial direction position of the machining head; and a blade drive device that is coupled with the machining head from the other end of the long shaft through the prepared hole and rotary-drives the blade around a shaft axis.

(4) Further, a long shaft inner surface machining apparatus of the present invention cuts an inner surface of a long shaft including a prepared hole penetrating therethrough in an axial direction so as to copy the prepared hole. The long shaft inner surface machining apparatus includes: a long shaft support device that fixes the long shaft so as not to bend, moves the long shaft in the axial direction, and rotates the long shaft around a shaft center thereof; a machining head capable of being inserted into the prepared hole of the long shaft in the axial direction, including a blade for inner surface machining movable in a radial direction, having a function of letting a rotation center of the blade coincide with a shaft axis of the prepared hole, and permitting axial direction movement and rotation of the long shaft in a state of being inserted in the prepared hole; a head support device that is coupled with the machining head from one end of the long shaft through the prepared hole and fixes an axial direction position of the machining head; and a blade drive device that is coupled with the machining head from the other end of the long shaft through the prepared hole and moves the blade in the radial direction.

(5) In the above-described long shaft inner surface machining apparatus of (1), the machining head includes: an inner surface copy head to expand a diameter thereof radially by hydraulic pressure so as to let a shaft axis thereof coincide with the shaft axis of the prepared hole and is movable in the axial direction within the prepared hole; and a blade head supported by the inner surface copy head rotatably around a shaft axis thereof, and including an axial direction moving member movable in the axial direction where axial direction movement thereof moves the blade in the radial direction. The head support device includes a boring bar with one end thereof coupled with the inner surface copy head and extending in the axial direction, and a bar moving device that moves the boring bar in the axial direction so as not to rotate, and the blade drive device includes: a main rod with one end thereof coupled with the blade head and extending in the axial direction; and a rotary drive device that rotary-drives the main rod around a shaft axis and moves in the axial direction so as to follow the machining head.

(6) In the above-described long shaft inner surface machining apparatus of (2), the machining head includes an axial direction moving member movable in the axial direction where axial direction movement of the axial direction moving member moves the blade in the radial direction, and expands a diameter thereof radially by hydraulic pressure so as to let a shaft axis thereof coincide with the shaft axis of the prepared hole. The head support device includes a boring bar with one end thereof coupled with the machining head and extending in the axial direction, and a bar moving device that moves the boring bar in the axial direction so as not to rotate. The blade drive device includes: a main rod with one end thereof coupled with the blade head and extending in the axial direction; and a main rod support device that supports the main rod and moves in the axial direction together with the main rod so as to follow the machining head.

(7) In the above-described long shaft inner surface machining apparatus of (3), the machining head includes: an inner surface copy head to expand a diameter thereof radially by hydraulic pressure so as to let a shaft axis thereof coincide with the shaft axis of the prepared hole and is movable in the axial direction within the prepared hole; and a blade head supported by the inner surface copy head rotatably around a shaft axis thereof, and including an axial direction moving member movable in the axial direction where axial direction movement thereof moves the blade in the radial direction. The head support device includes a boring bar with one end thereof coupled with the inner surface copy head and extending in the axial direction, and a bar support member that supports the boring bar so as not to rotate and so as not to move in the axial direction. The blade drive device includes: a main rod with one end thereof coupled with the blade head and extending in the axial direction; and a rotary drive device that rotary-drives the main rod around a shaft axis.

(8) In the above-described long shaft inner surface machining apparatus of (4), the machining head includes an axial direction moving member movable in the axial direction where axial direction movement of the axial direction moving member moves the blade in the radial direction, and expands a diameter thereof radially by hydraulic pressure so as to let a shaft axis thereof coincide with the shaft axis of the prepared hole. The head support device includes a boring bar with one end thereof coupled with the inner surface copy head and extending in the axial direction, and a bar support member that supports the boring bar so as not to rotate and so as not to move in the axial direction. The blade drive device includes: a main rod with one end thereof coupled with the blade head and extending in the axial direction; and a main rod support device that supports the main rod.

(9) In the above-described long shaft inner surface machining apparatus of (5) or (7), the boring bar includes a first hollow extending in the axial direction. The head support device includes a hydraulic supply device that supplies liquid through the first hollow of the boring bar to give the inner surface copy head hydraulic pressure. The inner surface copy head includes: a cylindrical main body with a diameter insertable into the prepared hole of the long shaft in the axial direction; a pair of inner surface chucks positioned with an interval in an axial direction of the main body; and a pair of pistons provided movably in opposite directions of the axial direction within the main body and between the inner surface chucks. Each inner surface chuck includes in a circumferential direction: three or more sets of a revolving rotor rotatable so as to permit axial direction movement of the machining head relative to the long shaft; and a guide member provided movably in the radial direction within the main body and causes axial direction movement of the pistons move the revolving rotor in the radial direction. The main body includes a hydraulic channel that supplies the liquid between the pair of pistons from the first hollow of the boring bar.

(10) In the above-described long shaft inner surface machining apparatus of (6) or (8), the boring bar includes a first hollow extending in the axial direction. The head support device includes a hydraulic supply device that supplies liquid through the first hollow of the boring bar to give the machining head hydraulic pressure. The machining head includes: a cylindrical head body with a diameter insertable into the prepared hole of the long shaft in the axial direction; a pair of inner surface chucks positioned with an interval in an axial direction of the head body; and a pair of pistons provided movably in opposite directions of the axial direction within the head body and between the inner surface chucks. Each inner surface chuck includes in a circumferential direction: three or more sets of a free roller rotatable so as to permit movement in the axial direction and rotation of the machining head relative to the long shaft; and a guide member provided movably in the radial direction within the head body and causes axial direction movement of the pistons move the free roller in the radial direction. The head body includes a hydraulic channel that supplies the liquid between the pair of pistons from the first hollow of the boring bar.

(11) In the above-described long shaft inner surface machining apparatus of any one of (5) to (8), the main rod includes a hollow penetrating through in the axial direction, and the blade drive device includes: a blade drive rod extending in the axial direction through the hollow of the main rod and coupled with the axial direction moving member; and a shaft moving device that moves the blade drive rod relative to the main rod in the axial direction.

(12) In the above-described long shaft inner surface machining apparatus of (5) or (7), the blade head includes: a cylindrical sub body supported rotatably around a shaft axis thereof against the inner surface copy head; and a tool base including the blade at a tip end thereof and including an inclined tooth guided movably in the radial direction within the sub body and inclined with reference to a shaft axis. The axial direction moving member includes an inclined tooth meshing with the inclined tooth of the tool base.

(13) In the above-described long shaft inner surface machining apparatus of (6) or (8), the machining head includes a tool base including an inclined tooth guided movably in the radial direction within the body and inclined with reference to a shaft axis, the tool base including the blade at a tip end thereof, and the axial direction moving member includes an inclined tooth meshing with the inclined tooth of the tool base.

(14) In the above-described long shaft inner surface machining apparatus of (5), the blade drive device includes: a main rod support part provided at a position between the long shaft support device and the rotary drive device closer to the long shaft support device, which supports the main rod rotatably; and a middle support part provided movably in the axial direction at a position between the main rod support part and the rotary drive device, which supports the main rod rotatably.

(15) In the above-described long shaft inner surface machining apparatus of (14), the middle support part is coupled with the rotary drive device by a cord.

(16) In the above-described long shaft inner surface machining apparatus of (15), the blade drive device further includes a driven mechanism that mechanically and operatively associates with axial direction movement of the rotary drive device to move the middle support part in a same moving direction and by a moving amount less than an axial direction movement amount of the rotary drive device.

(17) In the above-described long shaft inner surface machining apparatus of any one of (5) to (8), the boring bar includes a second hollow extending in the axial direction. The head support device includes a machining fluid supply device that supplies machining fluid to the machining head via the second hollow of the boring bar. The machining head includes a machining fluid channel that guides machining fluid supplied from the machining fluid supply device close to a part to be cut.

(18) In the above-described long shaft inner surface machining apparatus of (17), a machining fluid outlet of the machining fluid channel is provided under the machining head.

(19) In the above-described long shaft inner surface machining apparatus of any one of (1) to (4), the machining head includes, as the blade, a first blade and a second blade. Operatively in association with a retracting motion by the first blade from a machining position to cut the inner surface inwardly in the radial direction, the second blade is moved to a machining position outside of the radial direction from inside of the radial direction.

(19-1) In the above-described (19), the machining head includes an axial direction moving member, and axial direction movement of the axial direction moving member causes the first blade to retract inwardly in the radial direction from the machining position and the second blade to move to a machining position outside of the radial direction from inside of the radial direction.

(19-2) In the above-described (19-1), the machining head includes a first and a second tool bases. A first blade is provided at an end part of the first tool base in the radial direction, and the second blade is provided at an end part of the second tool base in the radial direction. The axial direction moving member has a first and a second side faces each provided with an inclined tooth extending in a slanting direction with reference to the shaft axis, where the first tool base includes an inclined tooth extending in the same direction as the inclined tooth of the first side face and engaging with the inclined tooth, and the second tool base includes an inclined tooth extending in the same direction as the inclined tooth of the second side face and engaging with the inclined tooth, whereby the axial direction movement of the axial direction moving member moves the first and the second tool bases in the radial direction.

(19-3) In the above-described (19-1), the machining head includes a tool base, provided with a first blade at one end part thereof in the radial direction and with a second blade at the other end part thereof in the radial direction. The axial direction moving member includes an inclined tooth extending in a slanting direction with reference to the shaft axis, and the tool base includes an inclined tooth extending in the slanting direction and engaging with the inclined tooth. Thereby, the axial direction movement of the axial direction moving member moves the tool base in the radial direction.

(20) In the above-described (1), the machining head is attachable to an inner circumferential surface of the long shaft so that a shaft axis thereof coincides with the shaft axis of the prepared hole, and includes: an inner surface copy head movable in the axial direction in a state of being attached to the inner circumferential surface; and a blade head including a blade for inner surface machining and supported rotatably by the inner surface copy head around a shaft axis thereof. The head support device is coupled with the inner surface copy head from one end of the long shaft through the prepared hole and moves the inner surface copy head in the axial direction together with the blade head, and the blade drive device is coupled with the blade head from the other end of the long shaft through the prepared hole and rotary-drives the blade head around the shaft axis together with the blade. The long shaft support device includes: a chuck device that supports by grasping both end parts of the long shaft; a chuck rotation device that rotates the chuck device so as to rotate, together with the long shaft, the inner surface copy head attached to the inner circumferential surface of the long shaft relative to the blade head; and a measurement instrument disposed to the blade head to measure a position of a measurement point on the inner circumferential surface. The position measurement is to measure a position in the radial direction with reference to a center of the relative rotation, and the relative rotation shifts the measurement point in a circumferential direction.

(21) In the above-described (2) or (4), the long shaft support device includes: a chuck device that supports by grasping both end parts of the long shaft; a chuck rotation device that rotates the chuck device so as to rotate the long shaft relative to the machining head; and a measurement instrument disposed to the machining head to measure a position of a measurement point on an inner circumferential surface of the long shaft. The position measurement is to measure a position in the radial direction with reference to a center of the relative rotation, and the relative rotation shifts the measurement point in a circumferential direction.

(22) The above-described long shaft inner surface machining apparatus according to any one of (5) to (8) further includes a contact detection sensor to detect a contact of the blade with the inner surface of the prepared hole.

(23) In the above-described (22), the blade head includes a tool base with the blade attached at a tip end thereof and movable in the radial direction, where the axial direction moving member is driven in the axial direction and the axial direction movement moves the tool base in the radial direction, the blade drive device includes a blade drive rod that moves the axial direction moving member in the axial direction, and the contact detection sensor is a pressure sensor or a strain gauge provided coming with the tool base, the axial direction moving member or the blade drive rod.

(24) In the above-described (22), the contact detection sensor is a sound sensor or a vibration sensor attached to the machining head.

(25) In the above-described (1) or (3), the machining head includes an inner surface copy head and a blade head, the inner surface copy head has a function of letting a shaft axis thereof coincide with the shaft axis of the prepared hole, the blade head is supported by the inner surface copy head rotatably around a shaft axis thereof in a state of being attached to the inner surface copy head, and is rotary-driven by the blade drive device, and an inner surface inspection head is further provided that inspects the inner surface in a state of being attached to the inner surface copy head instead of the blade head.

(26) In the above-described (25), the inner surface inspection head includes: a radial direction moving member movable in a radial direction of the long shaft; a driving device that moves the radial direction moving member in the radial direction; a contact detection sensor that detects a contact between the radial direction moving member and the inner surface and outputs a signal of the contact; and a distance measurement part that measures, based on the signal, a distance where the radial direction moving member moves in the radial direction from an initial position to a contact position for the contact with the inner surface. The long shaft inner surface machining apparatus includes a relative rotation device that rotates the inner surface inspection head relative to the long shaft around a shaft center of the long shaft.

(27) In the above-described (25), the inner surface inspection head includes a laser distance meter that applies laser to the inner surface to measure a distance to the inner surface based on the laser reflected from the inner surface, and the long shaft inner surface machining apparatus includes a relative rotation device that rotates the inner surface inspection head relative to the long shaft around a shaft center of the long shaft.

(28) In the above-described (25), the inner surface inspection head includes an image pickup device that images the inner surface.

(29) In the above-described (25), the inner surface inspection head includes: a radial direction moving member movable in a radial direction of the long shaft; a driving device that moves the radial direction moving member in the radial direction; a contact detection sensor that detects a contact between the radial direction moving member and the inner surface and outputs a signal of the contact; and a distance measurement part that measures, based on the signal, a distance where the radial direction moving member moves in the radial direction from an initial position to a contact position for the contact with the inner surface. A plurality of sets of the radial direction moving members, the driving devices, the contact detection sensors, and the distance measurement parts are provided, where these plurality sets of radial direction moving members are provided at mutually different positions in a circumferential direction revolving around a shaft of the long shaft.

(30) In the above-described (25), the inner surface inspection head includes a laser distance meter that applies laser to the inner surface to measure a distance to the inner surface based on the laser reflected from the inner surface, and a plurality of the laser distance meters are provided in a circumferential direction revolving around a shaft of the long shaft.

(31) Further, a long shaft inner surface machining method of the present invention is to cut an inner surface of a long shaft including a prepared hole penetrating therethrough in an axial direction so as to copy the prepared hole. The method includes the steps of: providing a machining head including a cylindrical main body and a cylindrical sub body supported rotatably around a shaft axis thereof, the main body having a diameter insertable into the prepared hole of the long shaft in the axial direction and the sub body having a diameter insertable into the prepared hole of a minimum diameter of the long shaft in the axial direction; radially expanding a diameter of a pair of inner surface chucks positioned with an interval in an axial direction of the main body so as to let a shaft axis of the main body coincide with a shaft axis of the prepared hole and support the main body movably in the axial direction; moving the main body in the axial direction from outside and moving a blade for inner surface machining from the sub body in the radial direction and rotary-driving this around the shaft axis from outside, while performing inner surface machining so as to copy the prepared hole; and then reversing the axial direction of the long shaft, and performing inner machining in a similar manner.

(32) Further, a long shaft inner surface machining method of the present invention is to cut an inner surface of a long shaft including a prepared hole penetrating therethrough in an axial direction so as to copy the prepared hole. The method includes the steps of: preparing a machining head including a cylindrical head body and a blade for inner surface machining capable of protruding from the head body, the head body including a part formed with a diameter insertable into the prepared hole of the long shaft in the axial direction and a part formed with a diameter insertable into the prepared hole of the long shaft in the axial direction; after inserting the machining head into the long shaft, radially expanding a diameter of a pair of inner surface chucks positioned with an interval in an axial direction of the head body so as to let a shaft axis of the machining head coincide with a shaft axis of the prepared hole and support the same movably in the axial direction, while permitting rotation of the long shaft with reference to the machining head; letting the blade for inner surface machining protrude from the head body; moving the machining head in the axial direction from outside, while rotating the long shaft around the shaft axis to perform inner surface machining so as to copy the prepared hole; and then reversing the axial direction of the long shaft, and performing inner machining in a similar manner.

(33) Further, a long shaft inner surface machining method of the present invention is to cut an inner surface of a long shaft including a prepared hole penetrating therethrough in an axial direction so as to copy the prepared hole. The method includes the steps of: preparing a machining head including a cylindrical main body, a cylindrical sub body supported rotatably around a shaft axis thereof, and a blade for inner surface machining capable of protruding from the sub body, the main body having a diameter insertable into the prepared hole of the long shaft in the axial direction, and the sub body having a diameter insertable into the prepared hole of a minimum diameter of the long shaft in the axial direction; after inserting the machining head into the long shaft, radially expanding a diameter of a pair of inner surface chucks positioned with an interval in an axial direction of the main body so as to let a shaft axis of the main body coincide with a shaft axis of the prepared hole in a state of permitting axial direction movement of the long shaft; letting the blade for inner surface machining protrude from the sub body; moving the long shaft in the axial direction, while rotary-driving the sub body around the shaft axis from outside to perform inner surface machining so as to copy the prepared hole; and then reversing the axial direction of the long shaft, and performing inner machining in a similar manner.

(34) Further, a long shaft inner surface machining method of the present invention is to cut an inner surface of a long shaft including a prepared hole penetrating therethrough in an axial direction so as to copy the prepared hole. The method includes the steps of: preparing a machining head including a cylindrical head body and a blade for inner surface machining capable of protruding from the head body, the head body including a part formed with a diameter insertable into the prepared hole of the long shaft in the axial direction and a part formed with a diameter insertable into the prepared hole of the long shaft in the axial direction; after inserting the machining head into the long shaft, radially expanding a diameter of a pair of inner surface chucks positioned with an interval in an axial direction of the head body so as to let a shaft axis of the machining head coincide with a shaft axis of the prepared hole and permit axial direction movement and rotation of the long shaft with reference to the machining head; letting the blade for inner surface machining protrude from the head body; moving the long shaft in the axial direction, while rotating the long shaft around the shaft axis to perform inner surface machining so as to copy the prepared hole; and then reversing the axial direction of the long shaft, and performing inner machining in a similar manner.

EFFECT OF THE PRESENT INVENTION

According to the configuration of the above-described (1) of the present invention, a drive power required for the machining head is supplied from two shafts disposed on both ends of the axial direction, thus miniaturizing the machining head and making the diameter thereof smaller.

That is, it is configured so that the head support device and the blade drive device coupled with the machining head via the prepared hole of the long shaft achieve the axial direction movement and rotary drive of the machining head with the blade for inner surface machining, whereby the machining head includes the blade for inner surface machining movable in the radial direction and simply may have a function of letting the rotation center of the blade coincide with the shaft axis of the prepared hole and supporting the same movably in the axial direction, and therefore the maximum diameter of the machining head can be made smaller than the prepared hole at both end parts of the long shaft.

According to the configuration of the above-described (2) of the present invention, it is configured so that the head support device coupled with one end of the machining head via the prepared hole of the long shaft performs the axial direction movement of the machining head with the blade for inner surface machining, the blade drive device coupled with the other end of the machining head moves the blade in the radial direction, and the long shaft support device rotary-drives the long shaft, whereby the machining head includes the blade for inner surface machining movable in the radial direction and simply may have a function of letting the rotation center of the blade coincide with the shaft axis of the prepared hole and permitting the rotation of the long shaft in a state of being inserted into the long shaft, and therefore the maximum diameter of the machining head can be made smaller than the prepared hole at both end parts of the long shaft.

Further, since the long shaft support device rotary-drives the long shaft, a mechanism to rotate the machining head is not necessary, thus simplifying the apparatus configuration.

According to the configuration of the above-described (3) of the present invention, it is configured so that the long shaft support device moves the long shaft in the axial direction and the head support device coupled with one end of the machining head via the prepared hole of the long shaft fixes the machining head with the blade for inner surface machining in the axial direction, and the blade drive device coupled with the other end of the machining head moves the blade in the radial direction, whereby the machining head includes the blade for inner surface machining movable in the radial direction and simply may have a function of letting the rotation center of the blade coincide with the shaft axis of the prepared hole and permitting the axial direction movement of the long shaft in a state of being inserted into the long shaft, and therefore the maximum diameter of the machining head can be made smaller than the prepared hole at both end parts of the long shaft.

Further, in the above-described apparatuses of (1) and (2), the necessary length of the machining apparatus is about three times the length of the prepared hole (long shaft) because the machining head is moved in the axial direction for machining. However, in the configuration of the present invention, instead of moving the machining head in the axial direction, the long shaft support device moves the long shaft in the axial direction, and therefore the length of the machining apparatus is only about twice the length of the prepared hole, thus saving space.

According to the configuration of the above-described (4) of the present invention, the long shaft support device moves the long shaft in the axial direction, while rotary-driving the same, the head support device coupled with one end of the machining head through the prepared hole of the long shaft fixes the machining head with the blade for inner surface machining in the axial direction, the blade drive device coupled with the other end of the machining head moves the blade in the radial direction. Therefore, the machining head includes the blade for inner surface machining movable in the radial direction and it requires only a function of letting the rotation center of the blade coincide with the shaft axis of the prepared hole and permitting the axial direction movement and the rotation of the long shaft in a state of being inserted into the prepared hole, so that the maximum diameter of the machining head can be made smaller than the prepared hole at both ends of the long shaft.

Further, since the long shaft support device rotary-drives the long shaft, a mechanism to rotate the machining head is not necessary, thus simplifying the apparatus configuration.

Further, the long shaft support device moves the long shaft in the axial direction, and therefore similarly to the above-described apparatus of (3), the length of the machining apparatus is only about twice the length of the prepared hole, thus saving space.

According to the present embodiments, the following effects also can be obtained.

The machining head is provided with inner surface chucks so as to relieve a machining reaction force in the radial direction to the work so that the shaft (boring bar) accepts the reaction force in the rotary direction, thus realizing a longer length and a smaller diameter.

The machining head is configured so that hydraulic pressure supplied from the head support device expands the diameter radially so that the shaft axis of the machining head coincides with the shaft axis of the prepared hole, while enabling relative rotation/relative axial direction movement with the long shaft, facilitating further miniaturization of the machining head and enabling the inner surface of the long shaft to accept a tool reaction force during machining, so that deterioration in the machining accuracy due to the tool reaction force can be prevented.

Further, the machining head is provided with two sets of independent chucks, whereby precise degree of concentricity of the machining head with respect to the work prepared hole can be secured, and moreover the degree of concentricity can be secured even when the prepared hole has a tapered shape.

That is, the machining head includes a pair of inner surface chucks positioned with an interval in the axial direction, which operate independently by a pair of pistons, and therefore the machining head can be always held concentrically with respect to the prepared hole in either case where the prepared hole has a cylindrical shape or a tapered shape.

Further, the axial direction movement of the axial direction moving member moved by the shaft moving device of the blade drive device moves the blade in the radial direction, thus further facilitating the miniaturization of the machining head.

Thus, the inner surface of the long shaft can be boring-machined precisely so as to copy the prepared hole thereof while preventing deterioration in the machining accuracy due to the tool reaction force during machining.

Further, the middle support part is provided in addition to the main rod support part, whereby bending of the main rod can be made less and wear of the main rod support part can be reduced. Further, since the middle support part can move in the axial direction, when the rotary drive device moves in the axial direction along with progression of the machining, the middle support part can be moved so as not to disturb the movement of the rotary drive device.

Further, the middle support part is coupled with the rotary drive device via a cord (string, wire or the like), and therefore by setting the length of the cord such that the middle support part can return to a fixed position when the rotary drive device is brought back to the initial position, thus preventing forgetting to bring the middle support part back to the fixed position.

Further, the driven mechanism makes the middle support part move at a predetermined ratio in accordance with the axial direction movement of the rotary drive device, whereby the middle support part can support the main rod at an appropriate position, thus reducing wear of the main rod support part due to bending of the main rod.

Further, the machining fluid supply device and the machining fluid supply channel allow machining fluid to be supplied to a part to be cut, thus enabling the machining requiring machining fluid.

Further, the machining fluid outlet is provided under the inner surface copy head, whereby chips can be removed effectively by the flow of the machining fluid.

Further, the contact detection sensor can detect a contact of the blade with the inner surface of the prepared hole, so that the position (zero-point position or reference position) where the blade just comes into contact with the inner surface of the prepared hole can be detected precisely, whereby blade alignment can be done precisely.

Further, according to a method of the present invention, the machining head includes a main body and a sub body, where the sub body has a diameter insertable into the prepared hole of a minimum diameter of the long shaft, and therefore the axial direction of the long shaft is reversed with reference to the machining head and the inner surface is machined so as to copy the prepared hole, thus making the machining unable range minimum.

Further, according to another method of the present invention, the machining head includes a head body including a part insertable into the prepared hole of a minimum diameter of the long shaft, and therefore the axial direction of the long shaft is reversed with reference to the machining head and the inner surface is machined so as to copy the prepared hole, thus making the machining unable range minimum.

Further, the blade head can be replaced with the inner surface inspection head, which is then attached to the inner surface copy head. In this state, the inner surface inspection head can inspect the inner surface of the prepared hole, and therefore the inner surface of the long shaft subjected to machining can be inspected easily.

That is, the inner surface inspection head attached to the inner surface copy head can be moved in the axial direction of the long shaft by the head support device along with the inner surface copy head, and therefore the inner surface of the long shaft can be inspected at a desired axial direction position or such a range. Therefore, there is no need to cut the long shaft to inspect the inner surface of the long shaft. Moreover, the inner surface of the long shaft can be inspected in a state of being fixed to the long shaft fixing device, and therefore there is no need to prepare a jig exclusively used for the measurement of the inner surface 2 of the long shaft. In this way, the inner surface of the long shaft can be easily inspected.

BRIEF DESCRIPTION OF THE DRAWINGS

FIG. 11 illustrates the overall configuration of a long shaft inner surface machining apparatus according to Embodiment 3 of the present invention.

DESCRIPTION OF THE PREFERRED EMBODIMENT

Figure 1A:
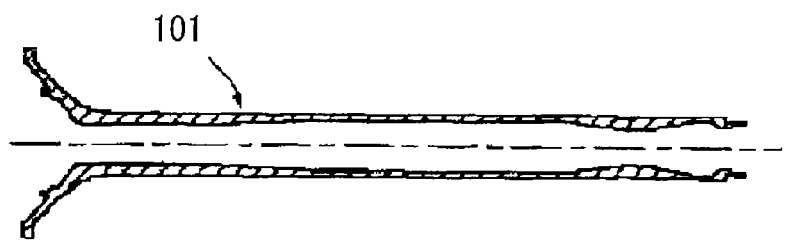
FIG. 1A is to describe a conventional machining procedure of a long shaft.
Figure 1B:
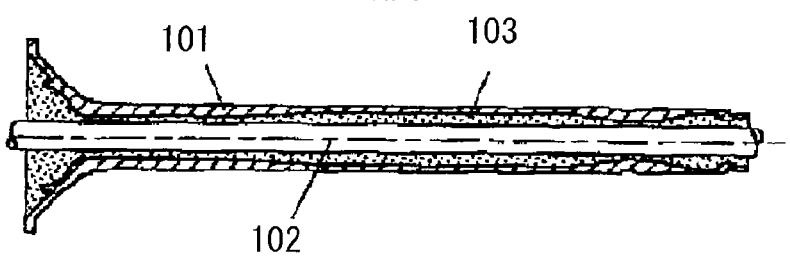
FIG. 1B is to describe a conventional machining procedure of a long shaft.
Figure 1C:
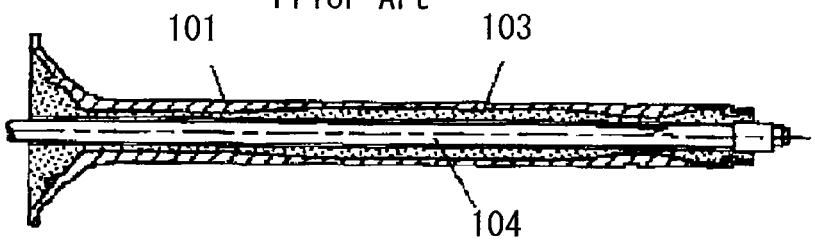
FIG. 1C is to describe a conventional machining procedure of a long shaft.
Figure 1D:
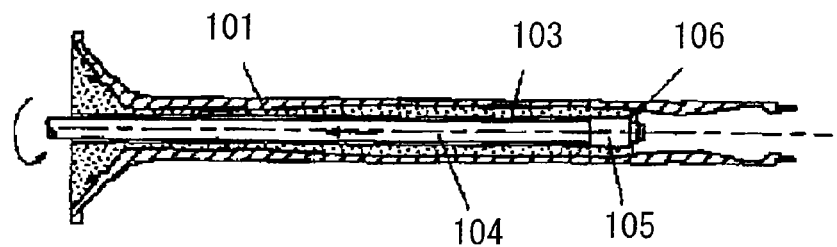
FIG. 1D is to describe a conventional machining procedure of a long shaft.

The following describes preferred embodiments of the present invention, with reference to the drawings. In the drawings, same reference numerals will be assigned to common parts and duplicated description therefor will be omitted.

Figure 4:
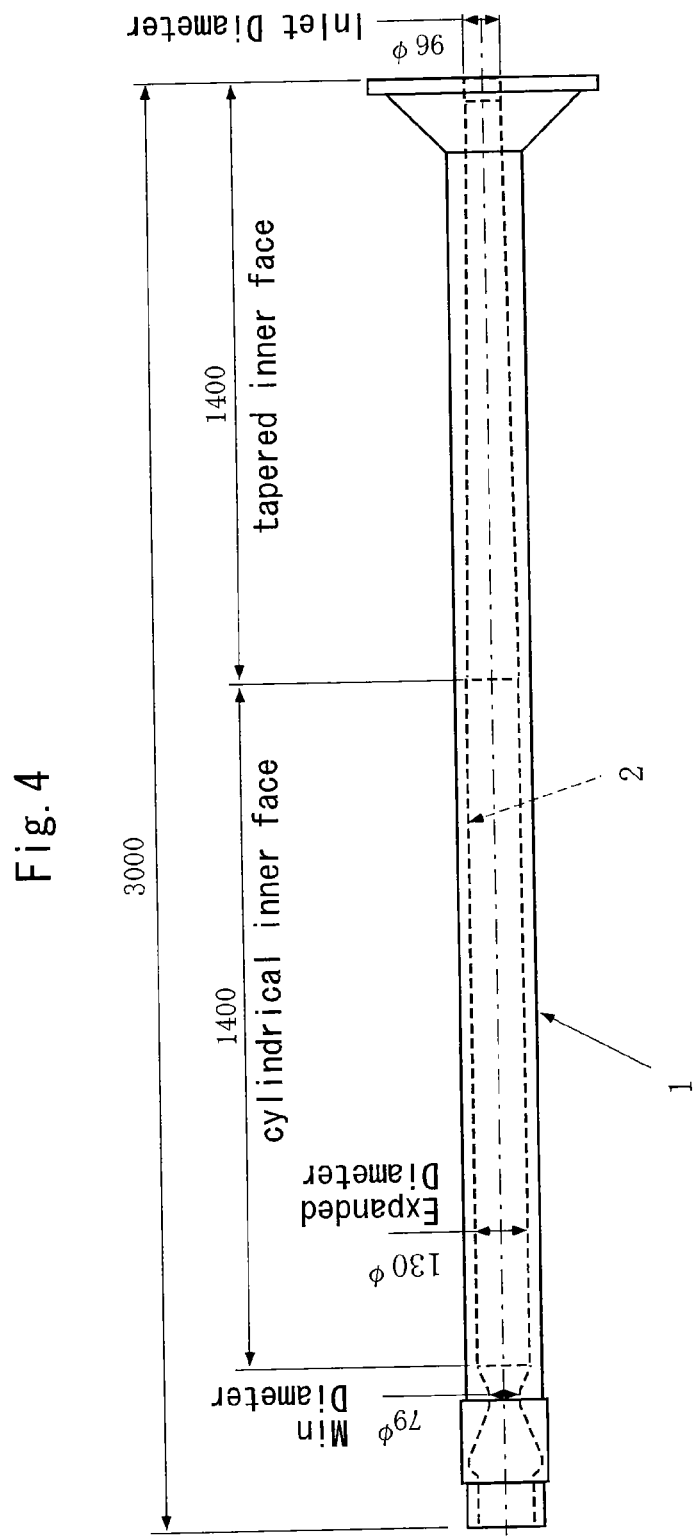
FIG. 4 schematically illustrates a long shaft as a target of the present invention.

A long shaft inner surface machining apparatus of the present invention is to cut an inner surface of a slender long shaft 1 with a prepared hole 2 penetrating therethrough in the axial direction and being symmetric about a shaft axis as illustrated in FIG. 4 so as to copy the prepared hole 2.

Embodiment 1

Figure 5:
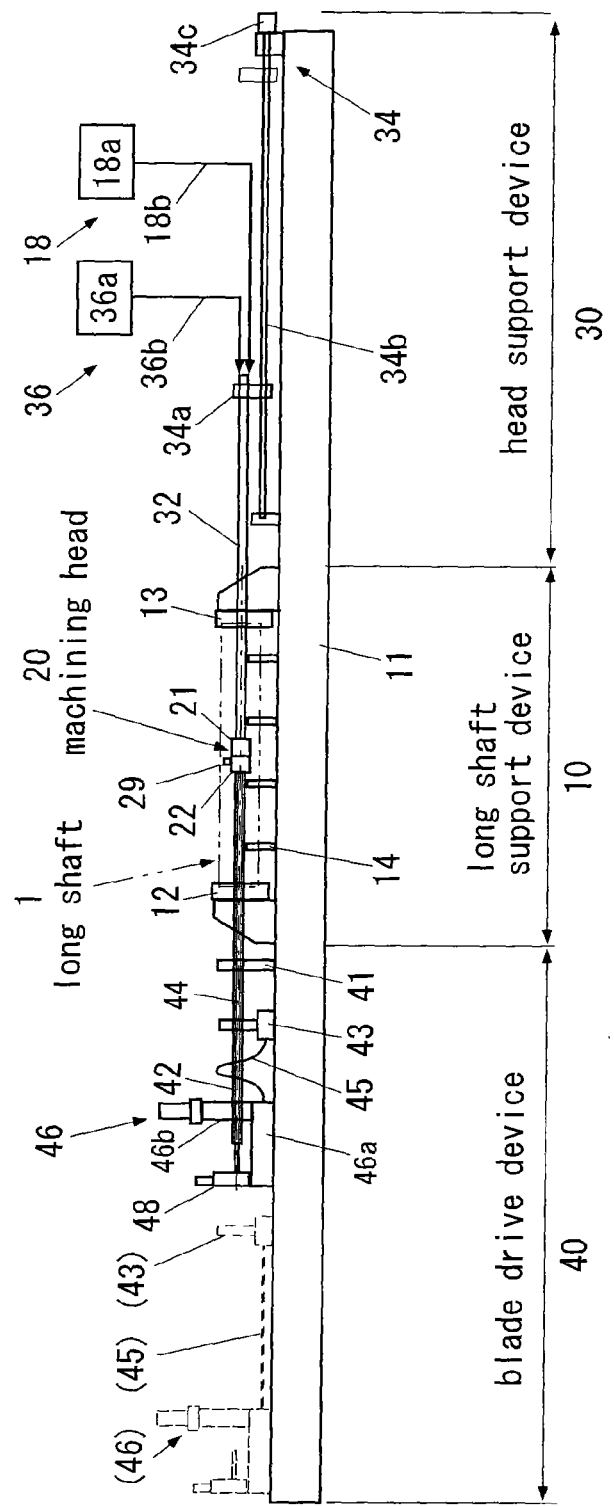
FIG. 5 illustrates the overall configuration of a long shaft inner surface machining apparatus according to Embodiment 1 of the present invention.

FIG. 5 illustrates the overall configuration of a long shaft inner surface machining apparatus according to Embodiment 1 of the present invention. As illustrated in this drawing, the long shaft inner surface machining apparatus of the present invention includes: a long shaft support device 10, a machining head 20, a head support device 30, and a blade drive device 40.

The long shaft support device 10 includes: a main frame 11 that extends horizontally; a pair of chuck devices 12, 13 provided movably along a top surface of the main frame 11 to support by grasping both end parts of the long shaft 1 concentrically; and a plurality of support metal parts 14 disposed at intervals along the top surface of the main frame 11 to support the long shaft 1. The thus configured long shaft support device 10 allows the long shaft 1 to be fixed without bending.

The machining head 20 has a dimension insertable into the prepared hole 2 of the long shaft 1 from at least one side thereof in the axial direction. The machining head 20 further includes a blade head 22 and an inner surface copy head 21.

The blade head 22 includes a blade 29 for inner surface machining that can move in the radial direction and is configured rotatable around the shaft center.

The inner surface copy head 21 supports the blade head 22 rotatably and supports the blade head 22 movably in the axial direction within the long shaft 1 while letting the rotation center of the blade head 22 coincide with the shaft axis of the prepared hole 2.

The detailed configuration of the machining head 20 will be described later.

The head support device 30 includes: a boring bar 32; a bar moving device 34 and a hydraulic supply device 36.

The boring bar 32 is a slender cylindrical hollow member having one end (left end in the drawing) coupled with the machining head 20 (inner surface copy head 21) and extending horizontally in the axial direction. This boring bar 32 includes a first hollow 32a and a second hollow 32b extending in the axial direction (see FIG. 6).

The bar moving device 34 includes: a moving member 34a that supports by grasping the boring bar 32 at a rear end thereof (right end part in the drawing) so as not to rotate; a screw 34b that screws with the moving member 34a to move the same in the axial direction; and a rotary drive device 34c (e.g., motor with decelerator) that rotary-drives the screw 34b around the shaft axis, and makes the rotary drive device 34c move the machining head 20 in the axial direction via the screw 34b and the boring bar 32.

Herein, the bar moving device 34 may have another configuration allowing the boring bar 32 to move in the axial direction instead of the configuration with the moving member 34a, the screw 34b and the rotary drive device 34c. For instance, it may have a configuration to drive a rack and pinion mechanism, a belt mechanism, a chain mechanism or the like by a rotary motor so as to move the boring bar 32 in the axial direction or a configuration to move the boring bar 32 directly in the axial direction by a linear motor.

The thus configured bar moving device 34 allows one end (left end) of the boring bar 32 to be coupled with the machining head 20 from one end of the long shaft 1 through the prepared hole 2 so that the movement of the boring bar 32 moves the machining head 20 in the axial direction.

The hydraulic supply device 36 includes: a hydraulic unit 36a; and a hydraulic hose 36b coupled with an end of the boring bar 32 (right end in the drawing), and is configured to supply liquid (hydraulic fluid) through the hollow 32a (see FIG. 6) of the boring bar 32 to give hydraulic pressure so that the machining head 20 operates.

The blade drive device 40 includes: a main rod 42; a blade drive rod 44; a rotary drive device 46; and a shaft moving device 48.

The main rod 42 is a slender cylindrical hollow member with one end (right end in the drawing) coupled with the machining head 20 (blade head 22) and extends horizontally in the axial direction.

The blade drive rod 44 extends through the hollow of the main rod 42 in the axial direction, and is coupled with an axial direction moving member 28 (see FIG. 6) described later of the machining head 20 so as not to rotate with respect to each other.

The rotary drive device 46 includes: a horizontal moving stage 46a provided along the top surface of the main frame 11 to be movable horizontally; and a rotary drive chuck 46b provided on the horizontal moving stage 46a. The horizontal moving stage 46a includes a not-illustrated horizontal rail and a guide guided by the horizontal rail and is configured to horizontally move with low resistance. The rotary drive chuck 46b includes a chuck device that supports by grasping the main rod 42 at a shaft end (left end in the drawing) and a chuck rotary drive mechanism that rotary-drives the chuck device around the shaft axis.

The thus described configuration allows the blade drive device 40 to rotary-drives, around the shaft axis, the main rod 42 coupled with the machining head 20 via the prepared hole 2 from the other end (left end in this drawing) of the long shaft 1 and to move the horizontal moving stage 46a in the axial direction so as to follow the movement of the machining head 20.

The shaft moving device 48 is a direct-acting actuator provided on the horizontal moving stage 46a, and is configured to move in the axial direction along with the rotary drive device 46 and move the blade drive rod 44 relative to the main rod 42 along the shaft. The shaft moving device 48 supports the blade drive rod 44 rotatably. Therefore, the blade drive rod 44 can rotate along with the axial direction moving member 28 described later.

In the configuration of FIG. 5, the blade drive device 40 further includes a main rod support part 41 and a middle support part 43.

The main rod support part 41 is provided at a position between the long shaft support device 10 and the rotary drive device 46 closer to the long shaft support device 10, and supports the main rod 42 rotatably.

The middle support part 43 is provided movably in the axial direction at a position between the main rod support part 41 and the rotary drive device 46, and supports the main rod 42 rotatably. In the illustrated example, the middle support part 43 is coupled with the rotary drive device 46 via a cord 45. As the cord 45, string, wire, rope, chain and the like can be used.

In the present embodiment, the long shaft inner surface machining apparatus further includes a machining fluid supply device 18 that supplies machining fluid to the inner surface copy head 21 via the second hollow 32b (see FIG. 6) of the boring bar 32. The machining fluid supply device 18 includes: a machining fluid supply source 18a made up of a machining fluid tank, a pump and the like; and a machining fluid supply hose 18b that guides machining fluid from the machining fluid supply source 18a to the boring bar 32. The inner surface copy head 21 is formed with a machining fluid supply channel 23b (see FIG. 6) described later, thus guiding machining fluid close to a part to be cut.

Figure 6:
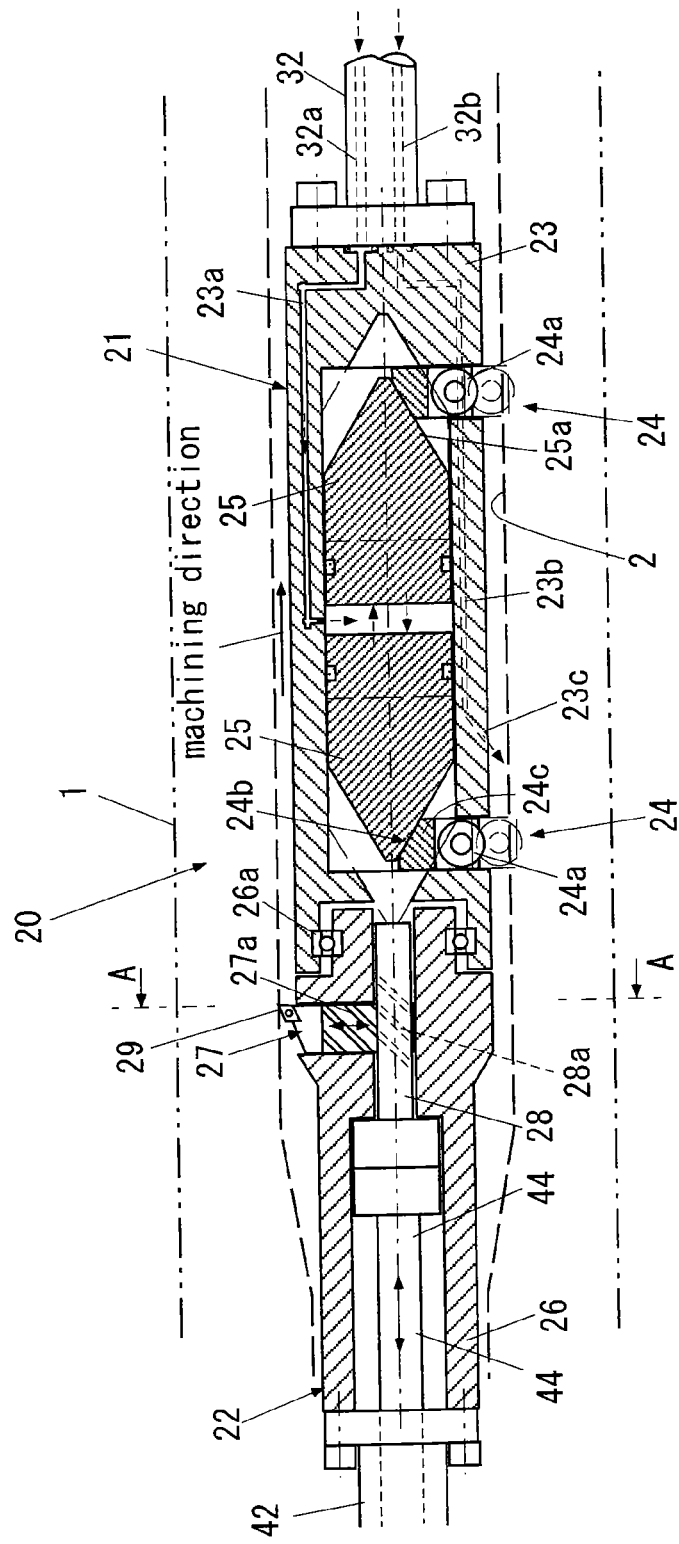
FIG. 6 is an enlarged cross-sectional view of a machining head of FIG. 5.

FIG. 6 is an enlarged cross-sectional view of the machining head 20 of FIG. 5.

In this example, the inner surface copy head 21 includes: a cylindrical main body 23; a pair of inner surface chucks 24 provided at positions with an interval in the axial direction of the main body 23; and a pair of pistons 25 provided at positions with an interval in the axial direction of the main body 23.

The cylindrical main body 23 has a diameter insertable into the prepared hole 2 of the long shaft 1 in the axial direction.

Each inner surface chuck 24 includes, in the circumferential direction, three or more sets of a revolving rotor 24a movable by rolling in the axial direction and a guide member 24c provided movably in the radial direction within the main body 23 so as to move the revolving rotor 24a forward and backward in the radial direction. In the configuration example of FIG. 6, each inner surface chuck 24 includes three sets of revolving rotors 24a and guide members 24c disposed at intervals of 120 degrees. Each guide member 24c includes a tapered surface 24b inclined with reference to the shaft axis.

One pair of pistons 25 are provided movably in the opposite directions of the axial direction within the main body 23 between the pair of inner surface chucks 24.

Each piston 25 has a tapered surface 25a with the same inclination as the tapered surface 24b of each guide member 24c at one end in the axial direction. The tapered surfaces 24b and 25a may be flat.

The main body 23 includes a hydraulic channel 23a that supplies liquid (hydraulic fluid) to give hydraulic pressure between the pair of pistons 25 from the hollow 32a formed in the boring bar 32.

The thus described configuration allows the diameter of the pair of inner surface chucks 24 to be expanded radially by pressure of the liquid supplied to the inner surface copy head 21 from the hydraulic supply device 36 so that the shaft axis of the blade head 22 coincides with the shaft axis of the prepared hole 2, while allowing the revolving rotor 24a to support the inner surface copy head 21 so as to be movable in the axial direction. In this way the diameter of the pair of inner surface chucks 24 is expanded radially so that the shaft axis of thereof coincides with the shaft axis of the prepared hole 2, whereby the inner surface copy head 21 assumes a state attached to the inner circumferential surface 2. In this state, the inner surface copy head 21 and the long shaft 1 do not rotate with respect to each other. However, the inner surface copy head 21 can move with reference to the long shaft 1 in the axial direction thereof.

Even in the case where the prepared hole 2 is a tapered hole, the pair of pistons 25 can move independently, and therefore each of the pair of inner surface chucks 24 can be independently expanded in the diameter so that the shaft axis of the machining head 20 coincides with the shaft axis of the prepared hole 2.

In the configuration example of FIG. 6, the inner surface copy head 21 (main body 23) further includes the machining fluid supply channel 23b that guides machining fluid supplied from the machining fluid supply device 18 close to a part to be cut. A machining fluid outlet 23c of the machining fluid supply channel 23b is shaped so as to allow machining fluid to flow toward the side of the blade head 22. This configuration allows machining fluid to be supplied to the blade 29.

The machining fluid outlet 23c is shaped so as to allow machining fluid to flow toward the upstream side in the machining direction. In the illustrated example, the machining direction is to the right, that is, the machining head 20 travels to the right, which means that machining fluid flows to the left.

This configuration prevents the flow of chips to the side of the inner surface chucks 24, thus preventing shaft center deflection in advance resulting from chips getting into between the inner surface chuck 24 and the inner surface of the prepared hole 2.

In the illustrated example, the machining fluid outlet 23c is provided under the inner surface copy head 21. This configuration makes it easy to form the flow of machining fluid, thus effectively removing chips by the flow of machining fluid.

The blade head 22 includes: a cylindrical hollow sub body 26; a tool base 27 with the blade 29 attached at the tip end thereof; and the axial direction moving member 28 provided in the sub body 26.

The sub body 26 is coupled with the inner surface copy head 21 via a bearing 26a so as to be rotatable around the shaft axis.

The tool base 27 includes an inclined tooth 27a guided movably in the radial direction within the sub body 26 and inclined with reference to the shaft axis.

The axial direction moving member 28 includes an inclined tooth 28a meshing with the inclined tooth 27a of the tool base 27. Further, the axial direction moving member 28 is coupled with the blade drive rod 44 concentrically so as not to rotate with respect to each other, and moves in the axial direction along with the blade drive rod 44 while rotating around the shaft center.

Figure 7:
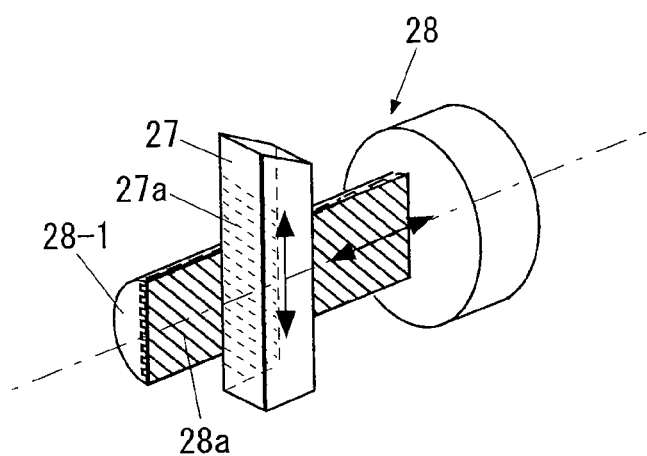
FIG. 7 is a perspective view of an axial direction moving member and a tool base.

FIG. 7 is a perspective view of the tool base 27 and the axial direction moving member 28. In this way, the axial direction moving member 28 includes a semicircle part 28-1, on a flat-side face of which the inclined tooth 28a is formed. At the tool base 27, the above-described inclined tooth 27a is formed at a face opposed to the inclined tooth 28a of the axial direction moving member 28.

The thus described configuration allows the blade head 22 to be supported with respect to the inner surface copy head 21 rotatably around the shaft axis thereof. Further, the shaft moving device 48 moves the blade drive rod 44 in the axial direction, thus moving the axial direction moving member 28 coupled with the blade drive rod 44 in the axial direction so as to convert this axial direction movement into radial direction movement of the tool base 27 via the inclined tooth 27a and the inclined tooth 28a, thus allowing the blade 29 to move in the radial direction.

Figure 8A:
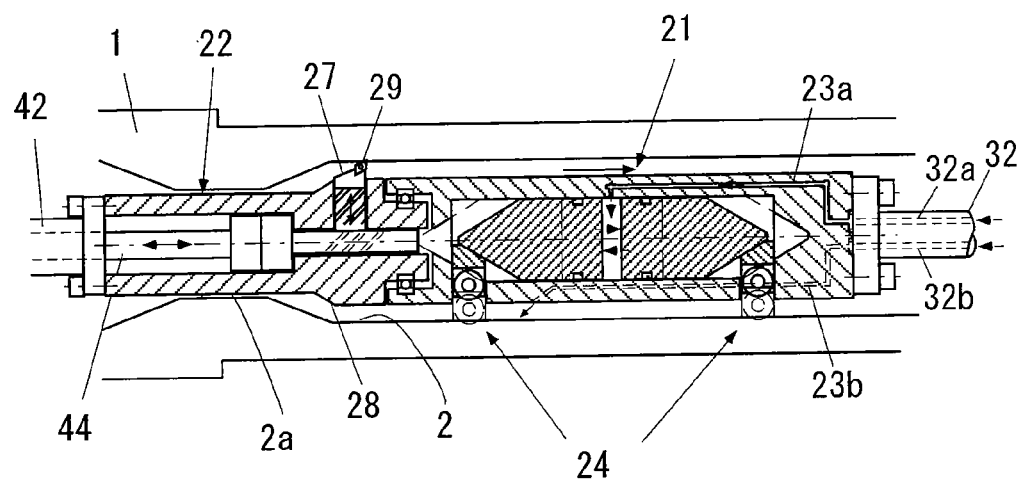
FIG. 8A is to describe an operation by a long shaft inner surface machining apparatus of the present invention.
Figure 8B:
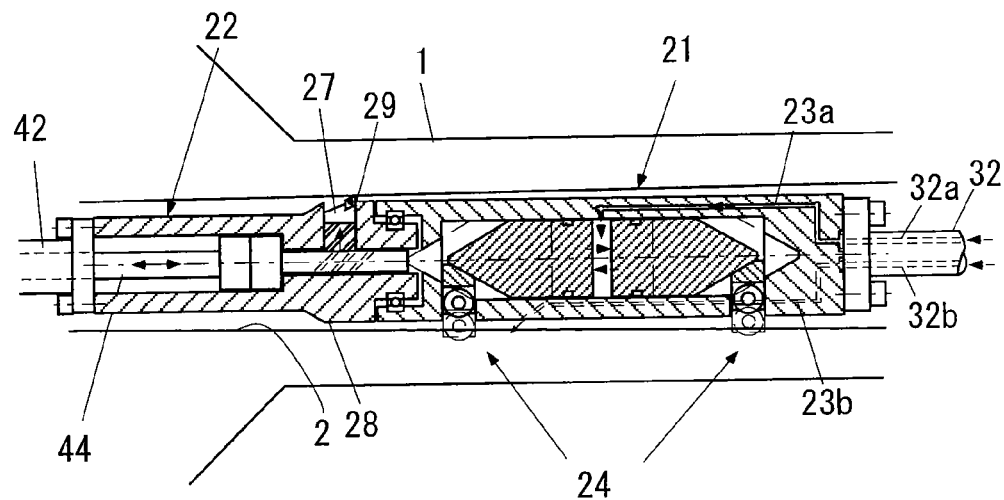
FIG. 8B is to describe an operation by a long shaft inner surface machining apparatus of the present invention.

Referring now to FIG. 8A and FIG. 8B, the following describes operations of the long shaft inner surface machining apparatus according to Embodiment 1.

FIG. 8A illustrates an inner surface machining state on the left-end side (side opposed to flange) of the long shaft 1 of FIG. 4, and FIG. 8B illustrates such a state on the right-end side (flange side).

In FIG. 8A, the machining head 20 is inserted into the prepared hole 2a of the minimum diameter on the left end side (side opposed to flange) of the long shaft 1 of FIG. 1 with the sub body 26 side facing the prepared hole 2.

Next, liquid (hydraulic fluid) is supplied between the pair of pistons 25 through the first hollow 32a of the boring bar 32 and the hydraulic channel 23a of the inner surface copy head 21 so as to move the pair of pistons 25 away from each other, whereby the diameter of the pair of inner surface chucks 24 is expanded radially. Such expansion in the diameter of the inner surface chucks 24 allows the shaft axis (rotation center) of the blade head 22 with the shaft axis of the prepared hole 2, so that the inner surface chucks 24 can support the inner surface copy head 21 and the blade head 22 movably in the axial direction within the prepared hole 2.

When the shaft axis of the blade head 22 coincides with the shaft axis of the prepared hole 2, the blade drive rod 44 is driven in the axial direction, thereby moving the blade 29 outwardly in the radial direction via the axial direction moving member 28 and the tool base 27 until the blade 29 protrudes at a position of a predetermined machining amount.

Next, the main rod 42 rotary drives the blade head 22 around the shaft axis from outside of the long shaft 1, and the bar moving device 34 moves the inner surface copy head 21 in the axial direction via the boring bar 32 from outside of the long shaft 1, thus machining the inner surface of the long shaft 1 so as to copy the prepared hole 2.

With the above-described procedure, the apparatus of the present invention can cut the inner surface of the long shaft 1 up to close to the prepared hole 2a of the minimum diameter in the long shaft 1.

Next, in FIG. 8B, the axial direction of the long shaft 1 is reversed, and the machining head 20 is inserted into the prepared hole on the right end side (flange side) of the long shaft 1 of FIG. 4 with the sub body 26 side facing the prepared hole 2, thus machining the inner surface in a similar manner. Thereby, the inner surface can be machined up to close to the flange of the long shaft 1 by the apparatus of the present invention.

Thusly the inner surface is machined so as to copy the prepared hole 2 while reversing the axial direction of the long shaft 1 with reference to the machining head 20, thus making the machining unable range minimum.

When the above-described inner surface machining requires machining fluid, the machining fluid supply device 18 supplies machining fluid to a part to be cut via the second hollow 32b of the boring bar 32 and the machining fluid supply channel 23b of the inner surface copy head 21.

Herein, in order to reverse the axial direction of the long shaft 1 easily, both end parts of the machining head 20 can be attached and removed easily with respect to the boring bar 32, the main rod 42 and the blade drive rod 44 by a bolt or the like.

With the above-described configuration of Embodiment 1, a drive power required to axial direction movement and rotary drive of the machining head 20 is supplied from two shafts (the boring bar 32 and the main rod 42) disposed on both ends of the axial direction, thus miniaturizing the machining head 20 and making the diameter thereof smaller.

That is, it is configured so that the head support device 30 and the blade drive device 40 coupled with the machining head 20 via the prepared hole 2 of the long shaft 1 achieve the axial direction movement and rotary drive of the machining head 20 with the blade 29 for inner surface machining, whereby the machining head 20 includes the blade 29 moving in the radial direction and simply may have a function allowing the rotation center of the blade head 22 to coincide with the shaft axis of the prepared hole 2 and supporting the same movably in the axial direction, and therefore there is no need to provide the machining head 20 with a function requiring a large drive power, so that the maximum diameter of the machining head 20 can be made smaller than the prepared hole 2 at least one of both end parts of the long shaft 1.

Further, the machining head 20 is provided with the inner surface chucks 24 so as to relieve the machining reaction force in the radial direction to the work (long shaft 1) so that the shaft (boring bar 32) accepts the machining reaction force in the rotary direction, thus realizing a longer length and a smaller diameter.

That is, hydraulic fluid supplied from the head support device 30 expands the diameter of the inner surface chucks 24 radially so that the shaft axis of the machining head 20 coincides with the shaft axis of the prepared hole 2 while supporting the blade head 22 movably in the axial direction, resulting in further miniaturization of the machining head 20 and enabling the inner surface of the prepared hole 2 of the long shaft 1 to accept a tool reaction force during machining, so that deterioration in the machining accuracy due to the tool reaction force can be prevented.

Moreover, the machining head 20 is provided with the pair of inner surface chucks 24, whereby the degree of concentricity of the machining head 20 with reference to the prepared hole 2 can be secured precisely, and further the degree of concentricity can be secured also even for the tapered prepared hole.

That is, the inner surface copy head 21 includes the pair of inner surface chucks 24 positioned with an interval in the axial direction, which operate independently by the pair of pistons 25, and therefore the machining head 20 can be always held concentrically with respect to the prepared hole in either case where the prepared hole 2 has a cylindrical shape or a tapered shape.

Moreover, the shaft moving device 48 of the blade drive device 40 moves the axial direction moving member 28 in the axial direction, and the axial direction movement of this axial direction moving member 28 moves the blade 29 in the radial direction, thus further miniaturizing the machining head 20.

Thus, the inner surface of the long shaft 1 can be boring-machined precisely so as to copy the prepared hole 2 thereof while preventing deterioration in the machining accuracy due to the tool reaction force during machining.

Further, the middle support part 43 is provided in addition to the main rod support part 41, whereby bending of the main rod can be made less and wear of the main rod support part 41 can be reduced. Further, since the middle support part 43 can move in the axial direction, when the rotary drive device 46 moves in the axial direction along with progression of the machining, the middle support part 43 can be moved so as not to disturb the movement of the rotary drive device 46.

Further, the middle support part 43 is coupled with the rotary drive device 46 via a cord (string, wire or the like), and therefore by setting the length of the cord such that the middle support part 43 can return to a fixed position when the rotary drive device 46 is brought back to the initial position, thus preventing forgetting to bring the middle support part 43 back to the fixed position.

Further, the machining fluid supply device 18 and the machining fluid supply channel 23b guide machining fluid close to a part to be cut, so that machining fluid can be supplied to the part to be cut, thus enabling the machining requiring machining fluid.

Further, the machining fluid outlet 23c is provided under the inner surface copy head 21, whereby chips can be removed effectively by the flow of the machining fluid.

Embodiment 2

Figure 9:
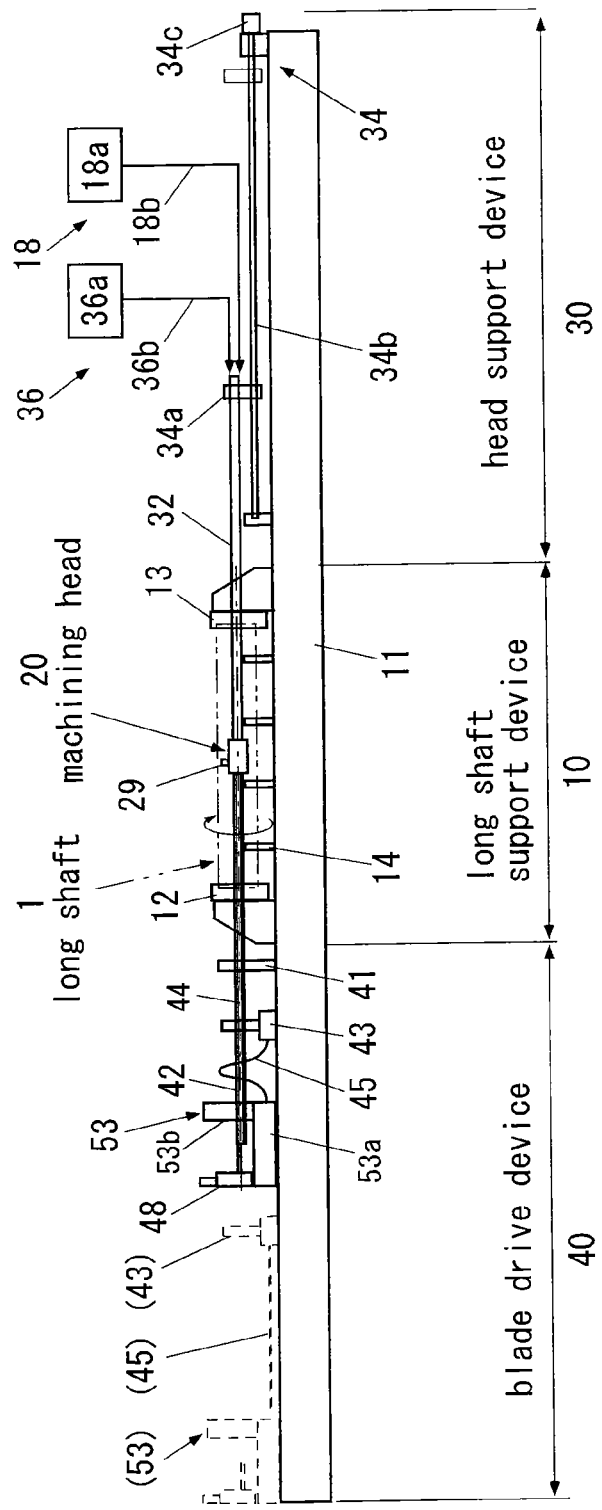
FIG. 9 illustrates the overall configuration of a long shaft inner surface machining apparatus according to Embodiment 2 of the present invention.

FIG. 9 illustrates the overall configuration of a long shaft inner surface machining apparatus according to Embodiment 2 of the present invention.

In the present embodiment, a long shaft support device 10 has a function of fixing a long shaft 1 so as not to bend and rotating the long shaft 1 around a shaft center thereof. To this end, a part of one or both of chuck devices 12 and 13 in the long shaft support device 10 that supports by grasping the long shaft 1 is rotary-driven by a drive source for rotation not illustrated.

As the not-illustrated drive source for rotation that rotary-drives one or both of the chuck devices 12 and 13, a rotary motor can be used, for example. In this case, a configuration to convey a rotary force of the rotary motor to a rotary shaft of a grasping part of the chuck device by an appropriate power convey mechanism (e.g., a gear mechanism, a belt mechanism, or a chain mechanism) may be used.

A machining head 20 can be inserted into a prepared hole of the long shaft 1 in the axial direction, includes a blade 29 for inner surface machining that is movable in the radial direction, has a function of letting the rotary center of the blade 29 coincide with the shaft axis of the prepared hole, can move in the axial direction within the prepared hole, and has a function of permitting rotation of the long shaft 1 in a state of being inserted into the prepared hole. A more detailed configuration of the machining head 20 in the present embodiment will be described later.

A head support device 30 is coupled with the machining head 20 through the prepared hole from one end of the long shaft 1 so as to move the machining head 20 in the axial direction, which includes a boring bar 32, a bar moving device 34 and a hydraulic supply device 36 similarly to Embodiment 1.

Similarly to Embodiment 1, the long shaft inner surface machining apparatus of the present embodiment further includes a machining fluid supply device 18.

A blade drive device 40 is coupled with the machining head 20 through the prepared hole from the other end of the long shaft 1 so as to move the blade 29 in the radial direction.

The blade drive device 40 includes: a main rod 42 with one end thereof coupled with the blade head and extending in the axial direction; a main rod support device 53 that supports the main rod 42 and follows the machining head 20 so as to move in the axial direction along with the main rod 42; a blade drive rod that passes through a hollow of the main rod 42 and extends in the axial direction; and a shaft moving device 48 that moves the blade drive rod relative to the main rod 42 in the axial direction.

The main rod support device 53 includes: a horizontal moving stage 53a provided along the top surface of the main frame 11 to be movable horizontally; and a rod support member 53b provided on the horizontal moving stage 53a to support the main rod 42. The rod support member 53b preferably supports the main rod 42 so as to constrain the rotation of the main rod 42.

Unlike Embodiment 1, the blade drive device 40 of Embodiment 2 does not have a function to rotary-drive the main rod 42.

The configuration of the shaft moving device 48 of Embodiment 2 is similar to that of the shaft moving device 48 of Embodiment 1.

Figure 10:
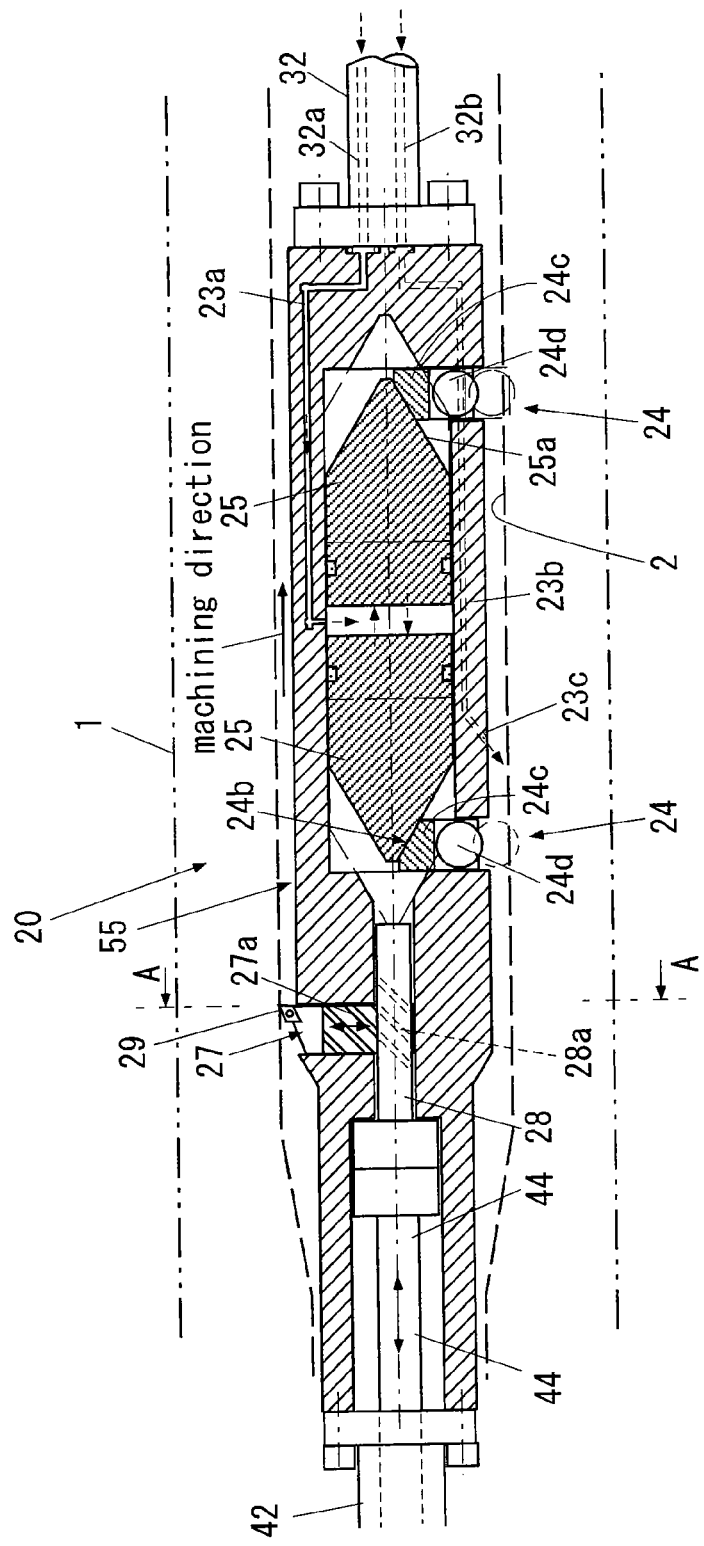
FIG. 10 is an enlarged cross-sectional view of the machining head of FIG. 8.

FIG. 10 is an enlarged cross-sectional view of the machining head 20 of Embodiment 2.

Unlike Embodiment 1, the machining head 20 includes: a cylindrical head body 55; a pair of inner surface chucks 24; a pair of pistons 25; a tool base 27; and an axial direction moving member 28.

The head body 55 in the present embodiment does not have a configuration including a main body and sub body which can rotate with respect to each other as in Embodiment 1.

The head body 55 in the present embodiment includes: a bigger part (part closer to the boring bar 32 in the illustrated example) formed with a diameter insertable into a prepared hole of the long shaft 1 in the axial direction; and a smaller part (part closer to the main rod 42 in the illustrated example) formed with a diameter insertable into a prepared hole of the minimum diameter of the long shaft 1.

The pair of inner surface chucks 24 and the pair of pistons 25 are provided within the bigger part in the head body 55 closer to the boring bar 32.

The tool base 27 and the axial direction moving member 28 are provided, within the head body 55, at a position closer to the main rod 42 side than from the pair of pistons 25.

Each inner surface chuck 24 includes, in the circumferential direction, three or more sets of a free roller 24d that can rotate so as to permit movement in the axial direction and rotation of the machining head 20 relative to the long shaft 1 and a guide member 24c provided movably in the radial direction within the head body 55 so as to move the free roller 24d forward and backward in the radial direction. In the configuration example of FIG. 10, each inner surface chuck 24 includes three sets of free rollers 24d and guide members 24c at intervals of 120 degrees.

The machining head 20 and other configuration of Embodiment 2 are similar to Embodiment 1. Therefore, the followings are done similarly to Embodiment 1, including to supply liquid between the pair of pistons; to supply machining fluid to the machining head 20; the radial direction movement of the guide member 24c resulting from the axial direction movement of the pair of pistons 25; and the radial direction movement of the tool base 27 resulting from the axial direction movement of the axial direction moving member 28.

Next, operations of the long shaft inner surface machining apparatus of Embodiment 2 will be described below.

After inserting the machining head 20 into the long shaft 1, liquid (hydraulic fluid) is supplied between the pair of pistons 25 to expand the diameter of the pair of inner surface chucks 24 radially, thereby letting the shaft axis of the machining head 20 coincide with the shaft axis of the prepared hole. Since the inner surface chucks are provided with the free roller 24d, the machining head 20 can move in the axial direction within the prepared hole, and the rotation of the long shaft 1 is permitted.

Next, the blade 29 is allowed to protrude from the head body 55 to a position of a predetermined machining amount.

Next, the machining head 20 is moved in the axial direction by the boring bar 32 from outside and the long shaft 1 is rotated around the shaft axis by the long shaft support device 10, whereby the inner surface of the long shaft 1 is machined so as to copy the prepared hole.

Next, the axial direction of the long shaft 1 is reversed, the machining head 20 is inserted into the prepared hole of the long shaft 1, and inner surface machining is done in a similar manner. Thereby, the inner surface can be machined up to close to the flange of the long shaft 1 by the apparatus of the present invention.

The above-described machining procedure allows the inner surface machining to be done close to the prepared hole 2a of the minimum diameter of the long shaft 1 of FIG. 4, and a machining unable range can be minimized by reversing.

According to the above-stated configuration of Embodiment 2, the head support device 30 coupled with one end of the machining head 20 through the prepared hole of the long shaft 1 moves the machining head 20 with the blade 29 for inner surface machining in the axial direction, the blade drive device 40 coupled with the other end of the machining head 20 moves the blade 29 in the radial direction, and the long shaft support device 10 rotary-drives the long shaft 1. Therefore, the machining head 20 includes the blade 29 for inner surface machining movable in the radial direction and it requires only a function of letting the rotation center of the blade 29 coincide with the shaft axis of the prepared hole and permitting the rotation of the long shaft 1 in a state of being inserted into the prepared hole, so that the maximum diameter of the machining head 20 can be made smaller than the prepared hole at both ends of the long shaft 1.

Further, unlike Embodiment 1, since the long shaft support device 10 rotary-drives the long shaft 1, a mechanism to rotate the machining head 20 is not necessary, thus simplifying the apparatus configuration.

As other effects, similar effects to those of Embodiment 1 can be obtained, including to prevent deterioration in the machining accuracy due to a tool reaction force and to always keep the machining head 20 concentric with respect to the prepared hole in either case where the prepared hole 2 has a cylindrical shape or a tapered shape.

Embodiment 3

FIG. 11 illustrates the overall configuration of a long shaft inner surface machining apparatus according to Embodiment 3 of the present invention.

In the present embodiment, a long shaft support device 10 has a function of fixing a long shaft 1 so as not to bend and moving the long shaft 1 in the axial direction.

In the present embodiment, the long shaft support device 10 includes a moving stage 10a that moves in the axial direction on a main frame 11, and to this moving stage 10a chuck devices 12 and 13 are fixed. Herein, as another configuration, the chuck devices 12 and 13 may be movable separately in the axial direction on the main frame 11 without providing a moving stage with the chuck devices 12, 13 commonly mounted thereon.

The axial direction movement of the long shaft support device 10 is done by an axial direction drive source not illustrated. As such an axial direction drive source, a rotary motor may be used, for example. In the case of a rotary motor used, rotation action of the rotary motor may be converted into linear action by an appropriate power conversion mechanism (e.g., a ball screw mechanism, rack and pinion, a belt mechanism, or a chain mechanism) for axial direction driving. Alternatively, as the axial direction drive source of the long shaft support device 10, a linear motor may be used, so that movement of a moving part of the linear motor can directly drive the long shaft support device 10 in the axial direction.

Figure 2A:
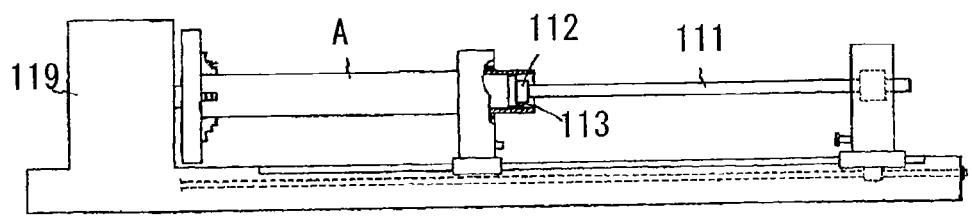
FIG. 2A illustrates a configuration of "a copy machining apparatus of an inner surface of a tube" of Patent Document 1.
Figure 2B:
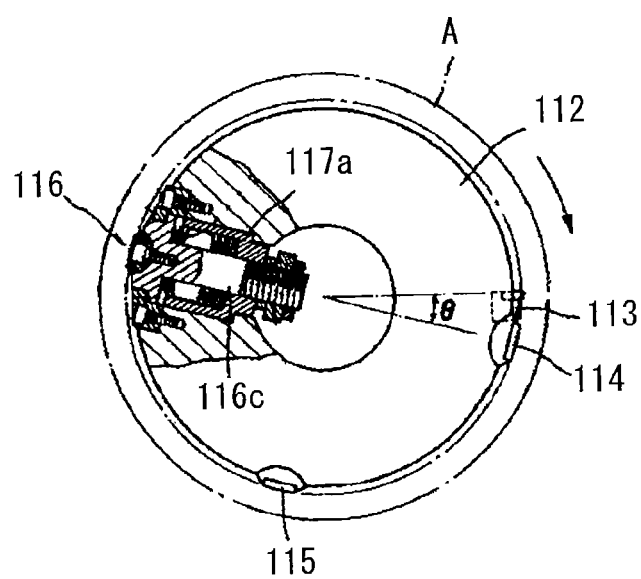
FIG. 2B illustrates a configuration of "a copy machining apparatus of an inner surface of a tube" of Patent Document 1.

A configuration and operations of the machining head 20 are similar to those of Embodiment 1. Although a blade drive device 40 is similar to Embodiment 1 in that a rotary drive device 46b and a shaft moving device 48 are provided, a horizontal moving base (46a of FIG. 2) is not provided, so that it is not configured to move the rotary drive device and the shaft moving device 48 in the axial direction.

Similarly to Embodiment 1, a head support device 30 is provided with a boring bar 32. However, a bar moving device 34 (34 of FIG. 5) is not provided, so that it is not configured to move the boring bar 32 in the axial direction. The boring bar 32 is supported by a bar support member 52 at an end on the opposite side of the machining head 20. The bar support member 52 supports the boring bar 32 in a state of not rotating and unmoving in the axial direction.

Similarly to Embodiment 1, a hydraulic supply device 36 and a machining fluid supply device 18 are provided, and configurations and operations thereof are similar to Embodiment 1.

As illustrated in FIG. 11, in order to reduce bending of the main rod 42, a rod middle support part 50 is preferably provided between the long shaft support device 10 and the rotary drive device 46 to support the main rod 42 rotatably. Further, in order to reduce bending of the boring bar 32, a bar middle support part 51 is preferably provided between the long shaft support device 10 and the bar support member 52 to support the boring bar 32. The rod middle support part 50 and the bar middle support part 51 are preferably movable in the axial direction.

The following describes operations of the long shaft inner surface machining apparatus of Embodiment 3.

After inserting the machining head 20 into the long shaft 1, liquid (hydraulic fluid) is supplied between the pair of pistons 25 to expand the diameter of the pair of inner surface chucks 24 radially, thereby letting the shaft axis of the machining head 20 coincide with the shaft axis of the prepared hole. Since the inner surface chucks are provided with the revolving rotor, the axial direction movement of the long shaft 1 is permitted in a state where the machining head 20 is inserted into the prepared hole.

Next, the blade 29 is allowed to protrude from the blade head 22 to a position of a predetermined machining amount.

Next, the blade head 22 is rotated around the shaft center by the main rod 42 from outside and the long shaft 1 is moved by the long shaft support device 10 in the axial direction, whereby the inner surface of the long shaft 1 is machined so as to copy the prepared hole.

Next, the axial direction of the long shaft 1 is reversed, the machining head 20 is inserted into the prepared hole of the long shaft 1, and inner surface machining is done in a similar manner. Thereby, the inner surface can be machined up to close to the flange of the long shaft 1 using the apparatus of the present invention.

The above-described machining procedure allows the inner surface machining to be done close to the prepared hole 2a of the minimum diameter of the long shaft 1 of FIG. 4, and a machining unable range can be minimized by reversing.

According to the above-stated configuration of Embodiment 3, the long shaft support device 10 moves the long shaft 1 in the axial direction, the head support device 30 coupled with one end of the machining head 20 through the prepared hole of the long shaft 1 fixes the machining head 20 with the blade 29 for inner surface machining in the axial direction, the blade drive device 40 coupled with the other end of the machining head 20 moves the blade 29 in the radial direction. Therefore, the machining head 20 includes the blade 29 for inner surface machining movable in the radial direction and it requires only a function of letting the rotation center of the blade 29 coincide with the shaft axis of the prepared hole and permitting the axial direction movement of the long shaft 1 in a state of being inserted into the prepared hole, so that the maximum diameter of the machining head 20 can be made smaller than the prepared hole at both ends of the long shaft 1.

Figure 12A:
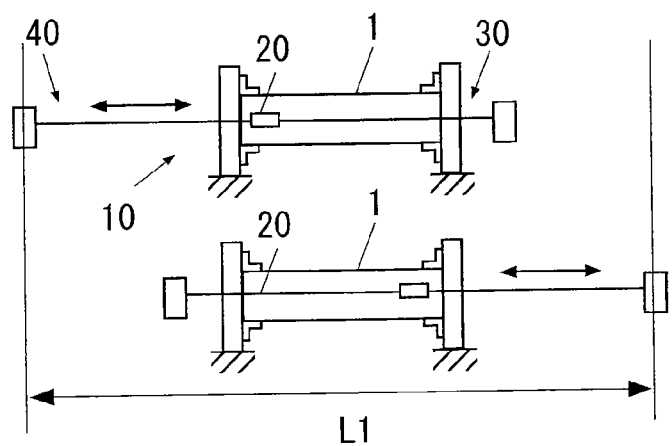
FIG. 12A is to describe an apparatus length of a long shaft inner surface machining apparatus of the present invention.
Figure 12B:
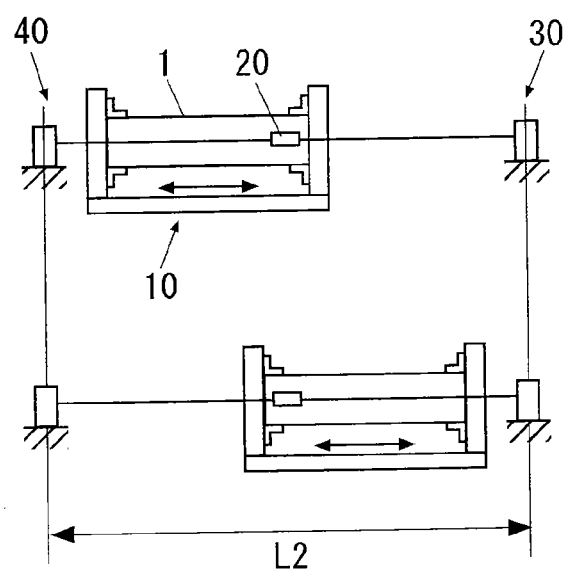
FIG. 12B is to describe an apparatus length of a long shaft inner surface machining apparatus of the present invention.

FIG. 12A and FIG. 12B are to describe an apparatus length of a long shaft inner surface machining apparatus of the present invention. FIG. 12A schematically illustrates Embodiment 1 and Embodiment 2, where the machining head 20, the head support device 30 and the blade drive device 40 are brought to the left side in the upper drawing but to the right side in the lower drawing. In this way, in Embodiments 1 and 2, in order to move the machining head 20, the head support device 30 and the blade drive device 40 in the axial direction, the overall length L1 of the machining apparatus has to be about three times the length of the prepared hole (long shaft 1).

On the other hand, FIG. 12B schematically illustrates Embodiment 3, where the long shaft 1 is brought to the left side in the upper drawing but to the right side in the lower drawing. In this way, in Embodiment 3, instead of moving the machining head 20 in the axial direction, the long shaft 1 is moved in the axial direction, and therefore the overall length L2 of the machining apparatus is just about twice the length of the prepared hole, thus saving space.

As other effects, similar effects to those of Embodiment 1 can be obtained, including to prevent deterioration in the machining accuracy due to a tool reaction force and to always keep the machining head 20 concentric with respect to the prepared hole in either case where the prepared hole 2 has a cylindrical shape or a tapered shape.

Embodiment 4

Figure 13:
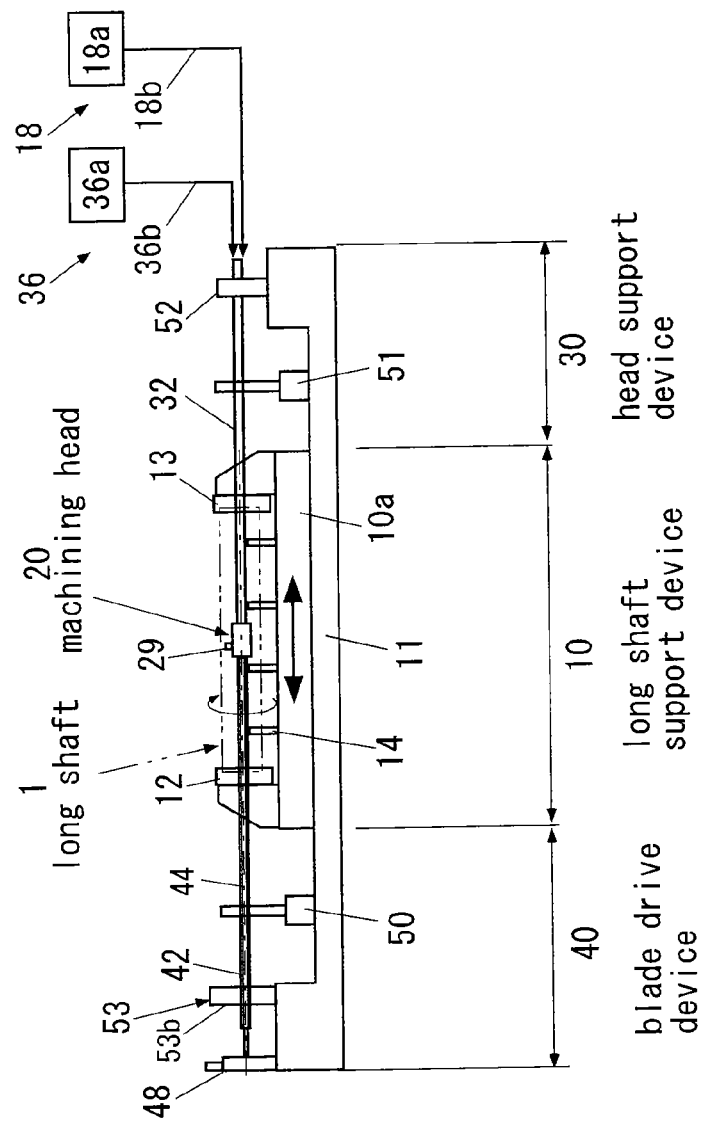
FIG. 13 illustrates the overall configuration of a long shaft inner surface machining apparatus according to Embodiment 4 of the present invention.

FIG. 13 illustrates the overall configuration of a long shaft inner surface machining apparatus according to Embodiment 4 of the present invention.

In the present embodiment, a long shaft support device 10 has a function of fixing a long shaft 1 so as not to bend, moving the long shaft 1 in the axial direction, and rotating the long shaft 1 around a shaft center thereof.

To this end, a part of one or both of chuck devices 12 and 13 in the long shaft support device 10 that supports the long shaft 1 by grasping is rotary-driven by a drive source for rotation not illustrated. As the mechanism to rotate the grasping part of the chuck devices 12 and 13 using a rotary driving source, a configuration similar to the corresponding part in Embodiment 2 can be used.

Further, the long shaft support device 10 includes a moving stage 10a that moves in the axial direction on a main frame, and to this moving stage 10a chuck devices 12 and 13 are fixed. Herein, as another configuration, the chuck devices 12 and 13 may be movable separately in the axial direction on the main frame 11 without providing a moving stage with the chuck devices 12, 13 commonly mounted thereon. The axial direction movement of the long shaft support device 10 is done by an axial direction drive source not illustrated. As a configuration that moves the long shaft support device 10 in the axial direction using an axial direction drive source, a configuration similar to the corresponding part in Embodiment 3 can be used.

The configuration of the machining head 20 is similar to that of Embodiment 2 (FIG. 10). Therefore, the machining head 20 can be inserted into a prepared hole of the long shaft 1 in the axial direction, includes a blade 29 for inner surface machining movable in the radial direction, has a function of letting the rotary center of the blade 29 coincide with the shaft axis of the prepared hole, and has a function of permitting axial direction movement and rotation of the long shaft 1 in a state of being inserted into the prepared hole.

A blade drive device 40 is coupled with the machining head 20 through the prepared hole from the other end of the long shaft 1 so as to move the blade 29 in the radial direction.

The blade drive device 40 includes: a main rod 42 with one end thereof coupled with the blade head and extending in the axial direction; a rod support device 53b that supports the main rod 42, a blade drive rod 44 that passes through a hollow of the main rod 42 and extends in the axial direction; and a shaft moving device 48 that moves the blade drive rod 44 relative to the main rod 42 in the axial direction. Unlike Embodiment 1, Embodiment 4 is not provided with a rotary drive chuck (46b of FIG. 5) and a horizontal moving stage (46a of FIG. 5).

A configuration of the head support device 30 is similar to Embodiment 3, including a boring bar 32 and a bar support member 52.

Similarly to Embodiment 1, a hydraulic supply device 36 and a machining fluid supply device 18 are provided, and configurations and operations thereof are similar to Embodiment 1.

As illustrated in FIG. 13, in order to reduce bending of the main rod 42, a rod middle support part 50 is preferably provided between the long shaft support device 10 and the rotary drive device to support the main rod 42. Further, in order to reduce bending of the boring bar 32, a bar middle support part 51 is preferably provided between the long shaft support device 10 and the bar support member 52 to support the boring bar 32. The rod middle support part 50 and the bar middle support part 51 are preferably movable in the axial direction.

The following describes operations of the long shaft inner surface machining apparatus of Embodiment 4.

After inserting the machining head 20 into the long shaft 1, liquid (hydraulic fluid) is supplied between the pair of pistons 25 to expand the diameter of the pair of inner surface chucks radially, thereby letting the shaft axis of the machining head 20 coincide with the shaft axis of the prepared hole. Since the inner surface chucks are provided with a free roller 24d, rotation and axial direction movement of the long shaft 1 are permitted in a state where the machining head 20 is inserted into the prepared hole.

Next, the blade 29 is allowed to protrude from the head body 55 to a position of a predetermined machining amount.

Next, the long shaft 1 is rotated and is moved in the axial direction by the long shaft support device 10, whereby the inner surface of the long shaft 1 is cut by the blade 29 so as to copy the prepared hole.

Next, the axial direction of the long shaft 1 is reversed, the machining head 20 is inserted into the prepared hole of the long shaft 1, and inner surface machining is done in a similar manner. Thereby, the inner surface can be machined up to close to the flange of the long shaft 1 using the apparatus of the present invention.

The above-described machining procedure allows the inner surface machining to be done close to the prepared hole 2a of the minimum diameter of the long shaft 1 of FIG. 4, and a machining unable range can be minimized by reversing.

According to the above-stated configuration of Embodiment 4, the long shaft support device 10 moves the long shaft 1 in the axial direction, while rotary-driving the same, the head support device 30 coupled with one end of the machining head 20 through the prepared hole of the long shaft 1 fixes the machining head 20 with the blade 29 for inner surface machining in the axial direction, the blade drive device 40 coupled with the other end of the machining head 20 moves the blade 29 in the radial direction. Therefore, the machining head 20 includes the blade 29 for inner surface machining movable in the radial direction and it requires only a function of letting the rotation center of the blade 29 coincide with the shaft axis of the prepared hole and permitting the axial direction movement and the rotation of the long shaft 1 in a state of being inserted into the prepared hole, so that the maximum diameter of the machining head 20 can be made smaller than the prepared hole at both ends of the long shaft 1.

Further, since the long shaft support device 10 rotary-drives the long shaft 1, a mechanism to rotate the machining head 20 is not necessary similar to Embodiment 2, thus simplifying the apparatus configuration.

Further, since the long shaft support device 10 moves the long shaft 1 in the axial direction, the length of the machining apparatus is just about twice the length of the prepared hole similar to Embodiment 3, thus saving space.

Embodiment 5

Figure 14:
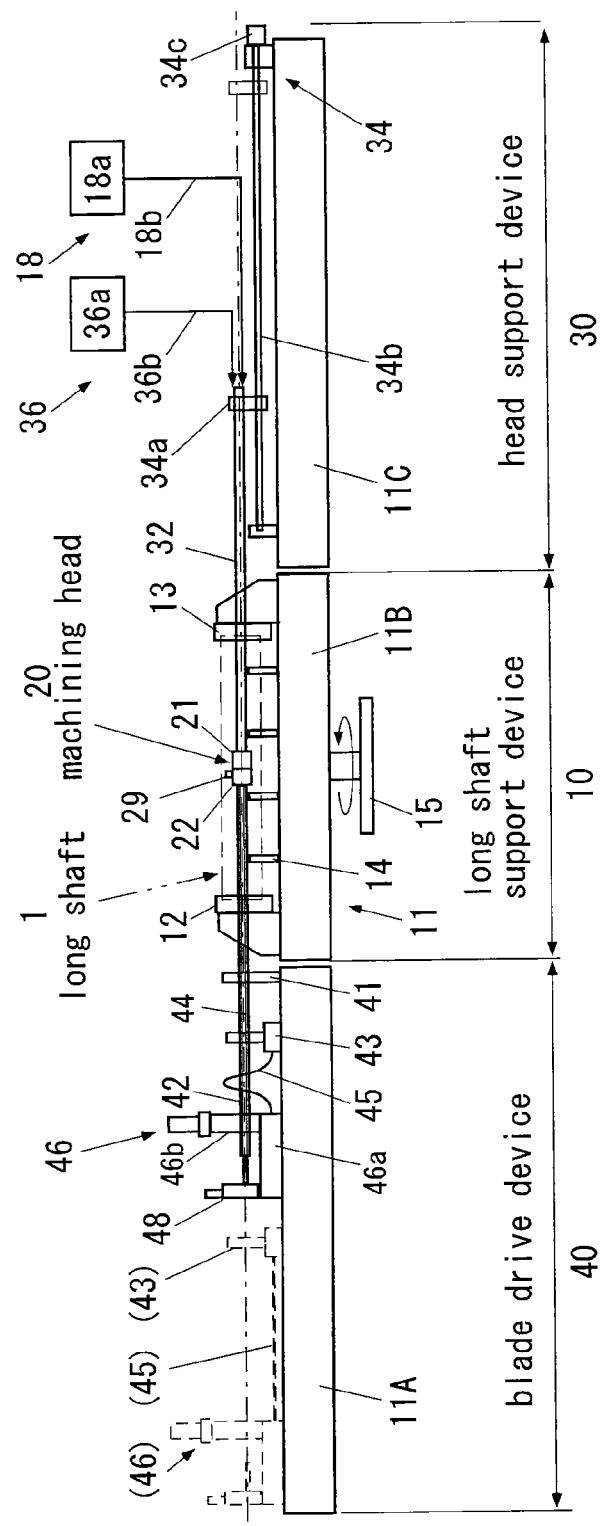
FIG. 14 illustrates the overall configuration of a long shaft inner surface machining apparatus according to Embodiment 5 of the present invention.

FIG. 14 illustrates the overall configuration of a long shaft inner surface machining apparatus according to Embodiment 5 of the present invention.

In the present embodiment, a main frame 11 includes: a first frame 11A belonging to a blade drive device 40; a second frame 11B belonging to a long shaft support device 10; and a third frame 11C belonging to a head support device 30.

The long shaft support device 10 includes a rotation mechanism 15 that can make the second frame 11B circle so as to reverse the axial direction of the long shaft 1. This rotation mechanism 15 may achieve the circling manually or may conduct the circle-drive by a drive source such as a motor. In the case where the rotation mechanism 15 circles manually, a preferable configuration is such that positioning means such as a pin fixes a position in a rotary direction of the second frame 11B so as to let the shaft center of the long shaft 1 coincide with the shaft center of the blade drive device 40.

Note here that the configuration of the long shaft inner surface machining apparatus of Embodiment 5 is the same in the other respects as those in Embodiment 1. According to Embodiment 5, similar effects to those from the above-stated Embodiment 1 can be obtained, as well as the following effects.

In the configuration of Embodiment 1, the long shaft 1 has to be once removed from the long shaft support device 10 to reverse the long shaft 1, and therefore there is a need to perform a center aligning operation again after the long shaft 1 is reversed and the long shaft support device 10 is fixed again, thus requiring some operations.

On the other hand, according to the configuration of Embodiment 5, since the rotation mechanism 15 allows the long shaft 1 to be reversed while being fixed to the long shaft support device 10. Thus, there is no need to remove the long shaft 1 from the long shaft support device 10 for reversing, thus eliminating a center aligning operation after reversing.

Herein, in the above-described Embodiment 5, the rotation mechanism for a long shaft is added to the configuration of Embodiment 1. However, such a rotation mechanism may be added to the above-described configurations of Embodiments 2 to 4.

Other Configuration Examples

Configuration Example A Related to a Mechanism to Move a Middle Support Part 43

In the above-described long shaft inner surface machining apparatuses of Embodiments 1 through 5, the middle support part 43 is coupled with the rotary drive device 46 via the cord 45. Instead of such a configuration, they may be provided with a driven mechanism that mechanically and operatively associates with the axial direction movement of the rotary drive device 46 to move the middle support part 43 in the same moving direction and by a moving amount less than the axial direction movement amount of the rotary drive device 46. The following describes a configuration example of the driven mechanism.

Figure 15:
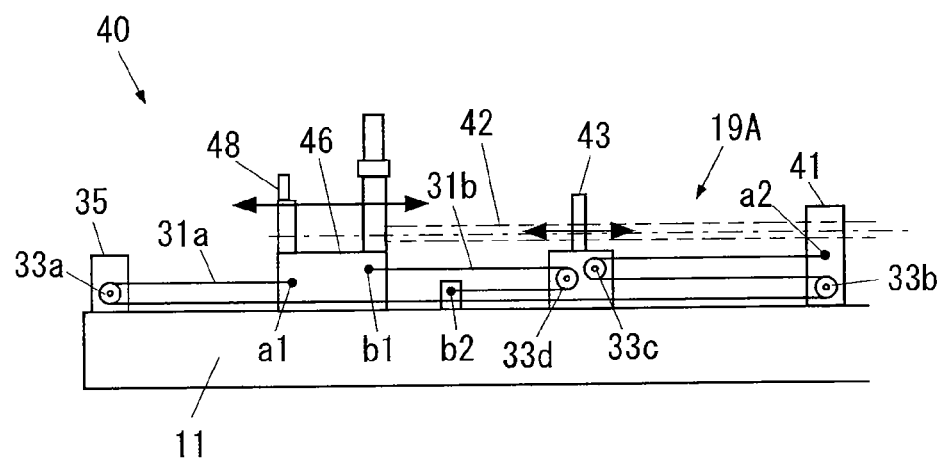
FIG. 15 illustrates a configuration of a driven mechanism as a first configuration example.

FIG. 15 illustrates a configuration of a driven mechanism 19A as a first configuration example. For brevity of the drawing, a blade drive rod 44 is not illustrated in FIG. 15.

The driven mechanism 19A as the first configuration example includes: a first rotator 33a; a second rotator 33b; a third rotator 33c, a fourth rotator 33d, a first cord 31a; and a second cord 31b.

The first rotator 33a is rotatably attached to a rotator fix part 35 provided at a position on the opposite side of a main rod support part 41 with reference to the rotary drive device 46. The movement of the first rotator 33a in the axial direction is constrained.

The second rotator 33b is rotatably attached to the main rod support part 41, and the movement thereof in the axial direction is constrained.

The third rotator 33c and the fourth rotator 33d are rotatably attached to the middle support part 43. Since the middle support part 43 is movable in the axial direction, the third rotator 33c and the fourth rotator 33d are movable in the axial direction along with the middle support part 43.

The first cord 31a is wound and hung around the first rotator 33a, the second rotator 33b, and the third rotator 33c, one end a1 of which is fixed to the rotary drive device 46 and the other end a2 of which is fixed to the main rod support part 41.

The second cord 31b is wound and hung around the fourth rotator 33d, one end b1 of which is fixed to the rotary drive device 46 and the other end b2 of which is fixed to an appropriate part closer to the rotary drive device 46 than from the middle support part 43.

As the above-described first cord 31a and the second cord 31b, various forms can be used such as wire, chain, belt, or string. In this case, the first cord 31a and the second cord 31b may have different forms as the cord. For instance, wire may be used as the first cord 31a, and belt may be used as the second cord 31b.

As the above-described first rotator 33a, second rotator 33b, third rotator 33c, and fourth rotator 33d, pulley, sprocket and the like may be used depending on the forms of the first cord 31a and the second cord 31b. In this case, the first to third rotators 33a to 33c and the fourth rotator 33d may have different forms as rotators.

In the driven mechanism 19A, when the rotary drive device 46 moves to the right in FIG. 15, then one end a1 of the first cord 31a moves to the right, and therefore the third rotator 33c corresponding to a moving pulley among rotators around which the first cord 31a is wound and hung in the pulley mechanism moves to the right by half the moving distance of the rotary drive device 46.

In the driven mechanism 19A, when the rotary drive device 46 moves to the left in FIG. 15, then one end b1 of the second cord 31b moves to the left, and therefore the fourth rotator 33d corresponding to a moving pulley in the pulley mechanism moves to the left by half the moving distance of the rotary drive device 46.

That is, when the rotary drive device 46 moves in the axial direction, the middle support part 43 accordingly moves in the axial direction in the same direction and by the moving amount half the moving amount of the rotary drive device 46.

According to the driven mechanism 19A as the first configuration example, the middle support part 43 is moved along with the axial direction movement of the rotary drive device 46 by the moving amount half the moving amount of the rotary drive device, whereby the main rod 42 can be always supported at just a middle position between the rotary drive device 46 and the main rod support part 41, thus further reducing wear of the main rod support part 41 resulting from bending of the main rod 42.

Figure 16:
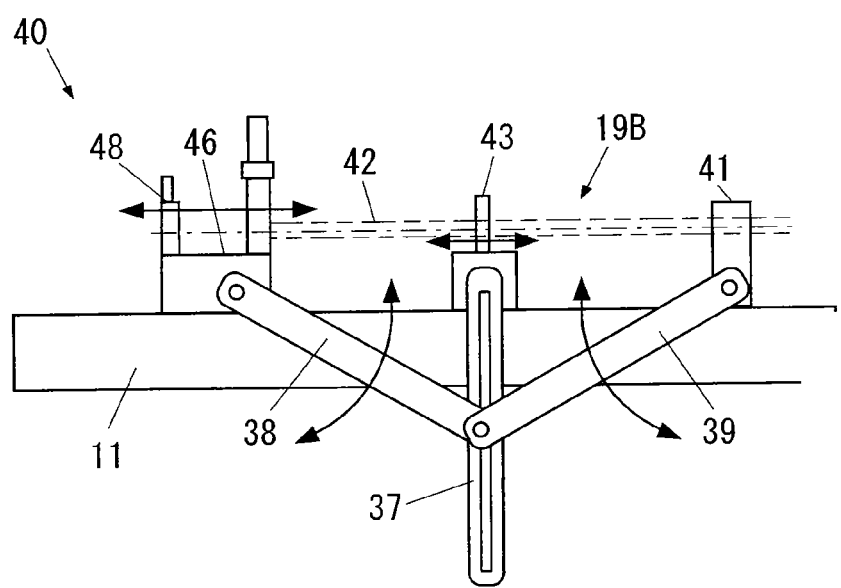
FIG. 16 illustrates a configuration of a driven mechanism as a second configuration example.

FIG. 16 illustrates a configuration of a driven mechanism 19B as a second configuration example. For brevity of the drawing, a blade drive rod 44 is not illustrated in FIG. 16.

The driven mechanism 19B of the second configuration example includes: a first arm 38; a second arm 39; and an output member 37.

The first arm 38 is coupled at one end rotatably with the rotary drive device 46. The second arm 39 is coupled at one end rotatably with the main rod support part 41. The first arm 38 and the second arm 39 are coupled rotatably with the respective other ends. The first arm 38 and the second arm 39 have the same length.

The output member 37 is fixed not-rotatably with the middle support part 43, and is movable in the axial direction (right and left directions in the illustrated example) along with the middle support part 43. The output member 37 is coupled at the coupling position with the first arm 38 and the second arm 39 so as to be rotatable with respect to the first arm 38 and the second arm 39 and be slidable in the direction perpendicular (up and down directions in the illustrated example) to the axial direction. Thereby, the coupling position of the first arm 38 and the second arm 39 and the output member 37 are constrained in the relative movement in the axial direction, but can move relatively with each other in the direction perpendicular to the axial direction.

In the driven mechanism 19B, when the rotary drive device 46 moves to the right in FIG. 16, then the coupling position of the first arm 38 and the second arm 39 moves to the right by half the moving distance of the rotary drive device 46, and therefore the middle support part 43 also moves to the right by half the moving distance of the rotary drive device 46.

In the driven mechanism 19B, when the rotary drive device 46 moves to the left in FIG. 16, then the coupling position of the first arm 38 and the second arm 39 moves to the left by half the moving distance of the rotary drive device 46, and therefore the middle support part 43 also moves to the left by half the moving distance of the rotary drive device 46.

According to the driven mechanism 19B as the second configuration example, the middle support part 43 is moved along with the axial direction movement of the rotary drive device 46 by the moving amount half the moving amount of the rotary drive device 46, whereby the main rod 42 can be always supported at just a middle position between the rotary drive device 46 and the main rod support part 41, thus further reducing wear of the main rod support part 41 resulting from bending of the main rod 42.

Configuration Example B Related to Means to Supply Machining Fluid

FIG. 5 and FIG. 6 illustrate the configuration to guide machining fluid to the machining head 20 through the second hollow 32b formed in the boring bar 32. However, when there is no need for machining fluid to flow out close to the blade, the configuration illustrated in FIG. 17 may be used to supply machining fluid.

Figure 17:
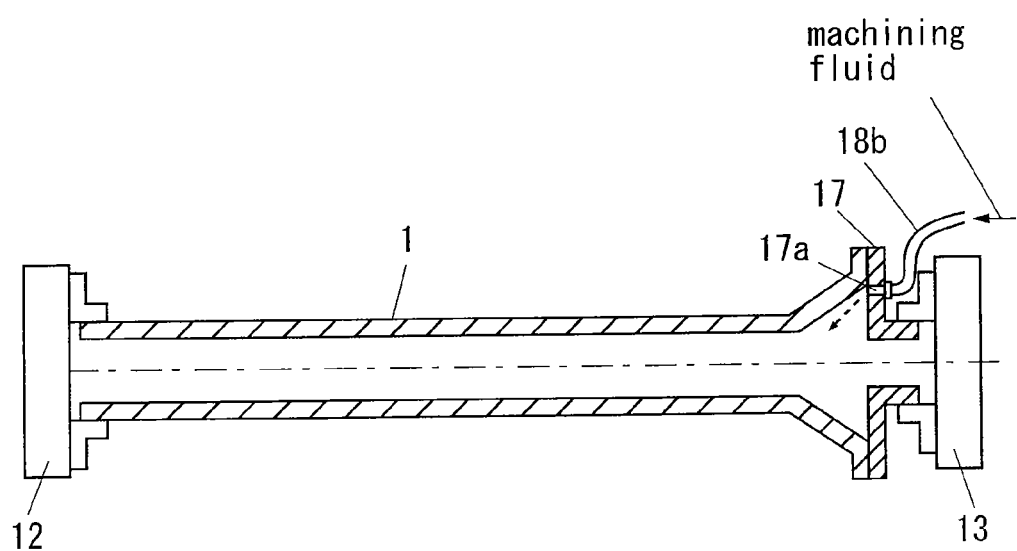
FIG. 17 illustrates another configuration to supply machining fluid.

In FIG. 17, one end (left end in the illustrated example) of a long shaft 1 is supported by grasping by one chuck device 12, and the other end (right end in the illustrated example) formed in a shape widening toward the end is supported by grasping by the other chuck device 13 via a fixing jig 17. The fixing jig 17 includes a machining fluid supply opening 17a, and is fixed by appropriate fix means (e.g., bolt) to the long shaft 1. A machining fluid supply hose 18b is connected with the machining fluid supply opening 17a.

Unlike the configuration example of FIG. 6, the above-stated configuration allows machining fluid to be supplied without providing a supply channel of machining fluid to the head support device 30 and the machining head 20.

Herein, in the configuration example of FIG. 17, machining fluid is supplied into the long shaft 1 from the machining fluid supply opening 17a provided in the fixing jig 17. However, if there is a gap between the grasping part of the chuck devices 12, 13 and the long shaft 1 of a size capable of supplying machining fluid, such a gap may be used to supply machining fluid. Alternatively, if the long shaft 1 has a hole other than at both ends thereof, such a hole may be used to supply machining fluid.

Configuration Example C Using a Plurality of Blades

In Embodiment 1 through Embodiment 5, the machining head 20 includes one blade 29 for inner surface machining movable in the radial direction. However, in any of Embodiment 1 through Embodiment 5, the machining head 20 may include a plurality of blades 29 for inner surface machining movable in the radial direction. The following describes configuration examples C-1, C-2, and C-3 in such a case.

In configuration examples C-1, C-2, and C-3, they may be the same as any one of the above-stated Embodiment 1 to Embodiment 5 except for the configurations of the drawings referred to in the following and the points described in the following.

Configuration Example C-1

Figure 18A:
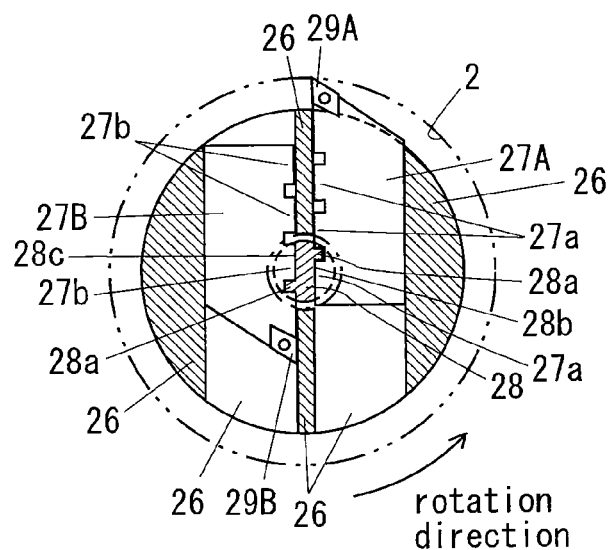
FIG. 18A illustrates configuration example C-1.

FIG. 18A corresponds to a cross-sectional view taken along the line A-A of FIG. 6 or FIG. 10. The machining head 20 includes, as a plurality of blades 29, a first and a second blades 29A and 29B for inner surface machining movable in the radial direction. Similarly to the above-stated embodiments, the machining head 20 has a function of letting the rotation center of the blades 29A and 29B coincide with the shaft axis of the prepared hole 2, and supporting the first and second blades 29A and 29B movable in the axial direction. Further, the machining head is configured so that, in association with a retracting motion of the first blade 29A from the machining position inwardly in the radial direction when it becomes worn after machining, the second blade 29B is moved to a machining position outside of the radial direction from the inside of the radial direction.

Herein, the machining position refers to a position in the radial direction where the first blade 29A or the second blade 29B is to be arranged to cut the inner surface 2. In the present application, the radial direction is the direction along the radius with reference to the rotation center of the machining head 20 or parallel with this direction.

The first blade 29A is provided at an end of a first tool base 27A in the radial direction, and the second blade 29B is provided at an end of a second tool base 27B in the radial direction. In this example, the first and the second tool bases 27A and 27B are members linearly extending in the radial direction. When moving in the radial direction, the first and the second tool bases 27A and 27B are guided by the inner surface of the sub body 26 movably in the radial direction, and during machining they are supported by the inner surface of the sub body 26 in the rotary direction.

Figure 18B:
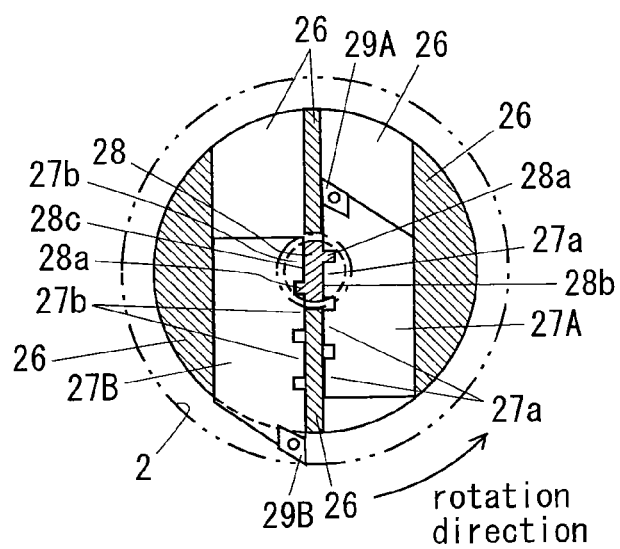
FIG. 18B illustrates a state where each blade moves from the state of FIG. 18A.

An axial direction moving member 28 includes a first and a second side faces 28b and 28c (see FIG. 18A) each provided with inclined teeth 28a extending in a slanting direction with reference to the shaft axis. As illustrated in FIG. 18A and FIG. 18B, a plurality of inclined teeth 28a are provided along the shaft axis direction at the side faces 28a and 28c. In the examples of FIGS. 18A and 18B, the inclined teeth 28a at the first side face 28b and the inclined teeth 28a at the second side face 28c may extend in the above-stated slanting directions parallel with each other. Herein, the inclined teeth 28a at the first side face 28b and the inclined teeth 28a at the second side face 28c may not be parallel.

Meanwhile, the first tool base 27A includes an inclined tooth 27a extending in the same slanting direction as that of the inclined tooth 28a of the first side face 28b and engaging with the inclined tooth 28a and the second tool base 27B includes an inclined tooth 27b extending in the same slanting direction as that of the inclined tooth 28a of the second side face 28c and engaging with the inclined tooth 28a, whereby the axial direction movement of the axial direction moving member 28 moves the first and the second tool bases 27A and 27B in the radial direction. In this example, the inclined teeth 27a and 27b are inclined with reference to the shaft axis.

The relationship between the inclined tooth 28a and the inclined tooth 27a or 27b is the same as the relationship between the inclined tooth 27a and the inclined tooth 28a of Embodiment 1. That is, in Embodiment 1, in a similar manner where the inclined tooth 27a and the inclined tooth 28a convert the axial direction movement of the axial direction moving member 28 into the radial direction movement of the tool base 27, the axial direction movement of the axial direction moving member 28 in the present configuration example is converted into the radial direction movement of the tool base 27A or 27B.

Thus, the axial direction movement of the axial direction moving member 28 moves the first blade 29A outwardly in the radial direction and moves the second blade 29B inwardly in the radial direction, and the opposite axial direction movement of the axial direction moving member 28 moves the second blade 29B outwardly in the radial direction and moves the first blade 29A inwardly in the radial direction.

Note here that FIG. 18A illustrates a state where the first blade 29A is at a machining position, and FIG. 18B illustrates a state where, from the state of FIG. 18A, the axial direction movement of the axial direction moving member 28 causes the first blade 29A to retract inwardly in the radial direction and the second blade 29B to move to the machining position.

In the configuration examples of FIG. 18A and FIG. 18B, the machining performance by the first blade 29A and the machining performance by the second blade 29B can be made the same precisely as stated below.

The first and the second side faces 28b and 28c are positioned with the center (i.e., rotary center) of the machining head 20 sandwiched therebetween, and the first and the second tool bases 27A and 27B also are positioned with the rotary center sandwiched therebetween.

Further, setting the directions revolving oppositely around the shaft axis (i.e., the rotary center) as first and second circumferential directions, the first blade 29A is positioned at a tip end of the first circumferential direction (counterclockwise in FIG. 15) at an end part of the first tool base 27A in the radial direction, and the second blade 29B is positioned at a tip end in the same first circumferential direction at an end part of the second tool base 27A in the radial direction.

With this configuration, the rotary direction during machining can be made the same when machining is performed by the first blade 29A and by the second blade 29B, and additionally machining is performed so that the machining position of the first blade 29A and the machining position of the second blade 29B are symmetry with respect to the rotary center during machining. Thusly, the machining performance by the first blade 29A and the machining performance by the second blade 29B can be made the same precisely.

The following describes a configuration example to align the first blade 29A at a machining position. In order to detect a contact pressure between the first blade 29A and the inner surface 2, a contact detection sensor (e.g., piezo-electric device) is incorporated into the axial direction moving member 28, for example. That is, since such a contact pressure acts on the axial direction moving member 28 through the first tool base 27A, the contact pressure can be detected by the contact detection sensor. Based on a contact pressure detected by the contact detection sensor when the first blade 29A is moved outwardly in the radial direction, an operation may be done to set a position where the first blade 29A just comes into contact with the inner surface 2 of the prepared hole as a reference position (zero-point position). After finding the reference position, a position where the first blade 29A is further moved from the reference position outwardly in the radial direction by a predetermined machining amount can be set as a machining position. In this way, the first blade 29A can be aligned to the machining position. As for the second blade 29B, similar operations may be done. Concerning a method to externally transmit a detection signal from the contact detection sensor, an opening in the axial direction may be made inside the axial direction moving member 28 and the blade drive rod 44, and a signal cable may be drawn through the opening so as to connect with the contact detection sensor, thus transmitting a signal.

According to the present configuration example, in association with the retracting motion of the first blade 29A from the machining position inwardly in the radial direction, the second blade 29B is allowed to move to a machining position outside of the radial direction from the inside of the radial direction, and therefore if the first blade 29A becomes worn after machining, then the first blade 29A is allowed to retract inwardly in the radial direction and a new second blade 29B can be moved to a machining position. Therefore, frequency to change blades can be reduced by half.

Note here that wear of the blade 29A can be determined as follows. A machining distance or a machining time by the blade 29A is measured, and when the machining distance or the machining time arrives at a predetermined wear machining distance or such a wear machining time, it may be determined wear of the blade 29A. Instead, by observing chips from machining by the blade 29A, it may be determined whether the blade 29A becomes worn or not.

Configuration C-2

Figure 19:
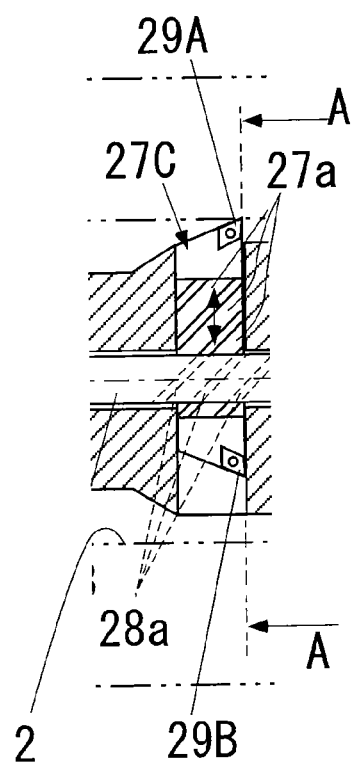
FIG. 19 illustrates configuration example C-2.
Figure 20A:
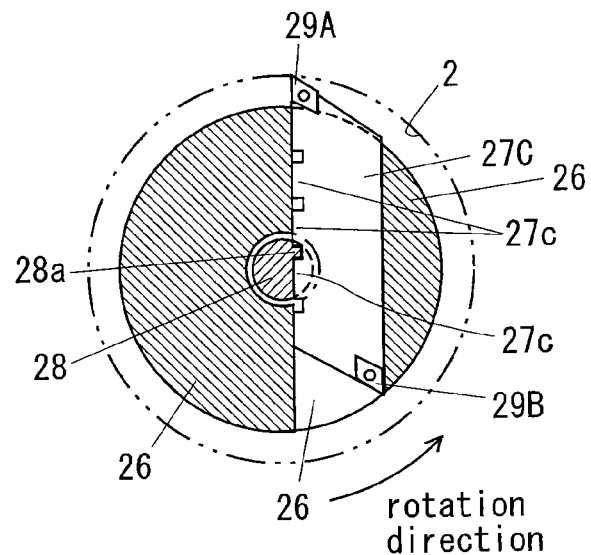
FIG. 20A is a cross-sectional view taken along the line A-A of FIG. 19.
Figure 20B:
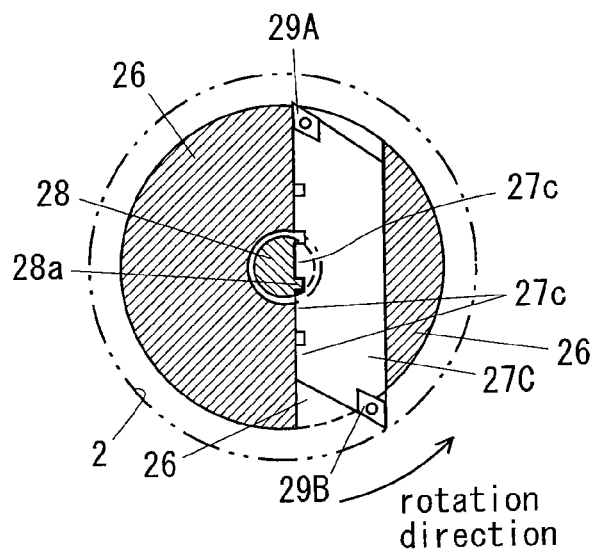
FIG. 20B illustrates a state where each blade moves from the state of FIG. 20A.

FIG. 19 illustrates a configuration example C-2, showing a part corresponding to a peripheral part of the tool base 27 of the machining head 20 of FIG. 6 or FIG. 10. FIG. 20A and FIG. 20B are cross-sectional views taken along the line A-A of FIG. 19.

In the present configuration example C-2, a machining head 20 includes a single tool base 27C instead of the first and the second tool bases 27A and 27B of the configuration example C-1. This tool base 27C is provided with a first blade 29A at one end part in the radial direction and a second blade 29B at the other end part in the radial direction.

An axial direction moving member 28 includes an inclined tooth 28a extending in a slanting direction with reference to the shaft axis. Meanwhile, the tool base 27C includes an inclined tooth 27c extending in the same slanting direction as that of the inclined tooth 28a and engaging with the inclined tooth 28a. Thereby the axial direction movement of the axial direction moving member 28 moves the tool base 27C in the radial direction. Thus, if the first blade 29A becomes worn after machining, then the axial direction movement of the axial direction moving member 28 can make the first blade 29A retract inwardly in the radial direction and move a new second blade 29B to a machining position. Note here that FIG. 20A illustrates a state where the first blade 29A is at a machining position, and FIG. 20B illustrates a state where, from the state of FIG. 20A, the axial direction movement of the axial direction moving member 28 causes the first blade 29A to retract inwardly in the radial direction and the second blade 29B to move to the machining position.

Setting the directions revolving oppositely around the shaft axis as first and second circumferential directions, the first blade 29A is positioned at a tip end of the first circumferential direction (counterclockwise in FIG. 20B) at an end part of the tool base 27C in the radial direction, and the second blade 29B also is positioned at a tip end in the same first circumferential direction at the other end of the tool base 27C in the radial direction. In this case, since the first and the second blades 29A and 29B can be arranged to face in the same first circumferential direction, the rotary direction for machining can be made the same between the machining by the first blade 29A and the machining by the second blade 29B.

Configuration Example C-3

Figure 21A:
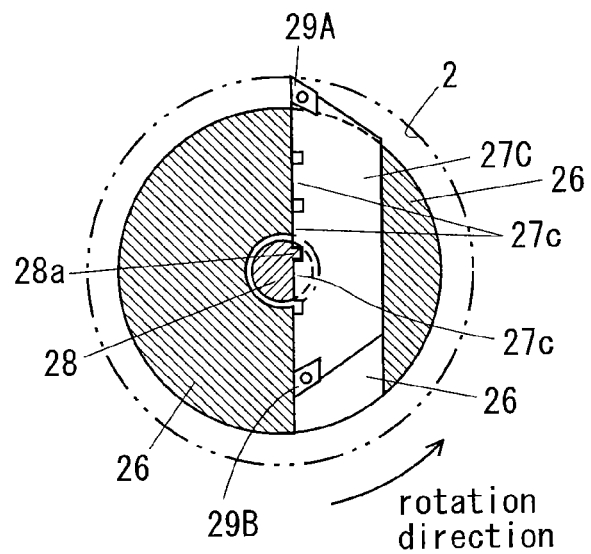
FIG. 21A illustrates configuration example C-3.
Figure 21B:
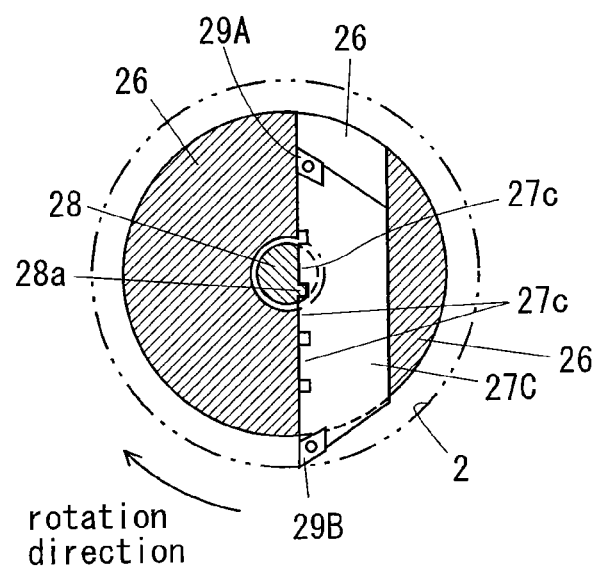
FIG. 21B illustrates a state where each blade moves from the state of FIG. 21A.

In the present configuration example C-3, instead of the configuration of FIG. 20A and FIG. 20B, first and second blades 29A and 29B may be arranged as in FIG. 21A and FIG. 21B. That is, FIG. 21A and FIG. 21B illustrate configuration example C-3, corresponding to the cross-sectional view taken along the line A-A of FIG. 19.

In FIG. 21, setting the directions revolving oppositely around the shaft axis as first and second circumferential directions, the first blade 29A is positioned at a tip end of the first circumferential direction (counterclockwise in FIG. 21A and FIG. 21B) at an end part of the tool base 27C in the radial direction, and the second blade 29B is positioned at a tip end of the second circumferential direction (clockwise in FIG. 21A and FIG. 21B) at the other end part of the tool base 27C in the radial direction. In this case, the rotary direction of the machining head 20 is opposite between the machining by the first blade 29A and the machining by the second blade 29B.

Note here that FIG. 21B illustrates a state where, from the state of FIG. 21A, the axial direction movement of the axial direction moving member 28 causes the first blade 29A to retract inwardly in the radial direction and the second blade 29B to move to the machining position.

Configuration Example D to Measure Center Deflection

The long shaft inner surface machining apparatus of Embodiment 1 may have a configuration to measure center deflection. The following describes this configuration.

Note here this configuration example D may be the same as the above-stated Embodiment 1 except for the configurations of the drawings referred to in the following and the points described in the following.

Figure 22:
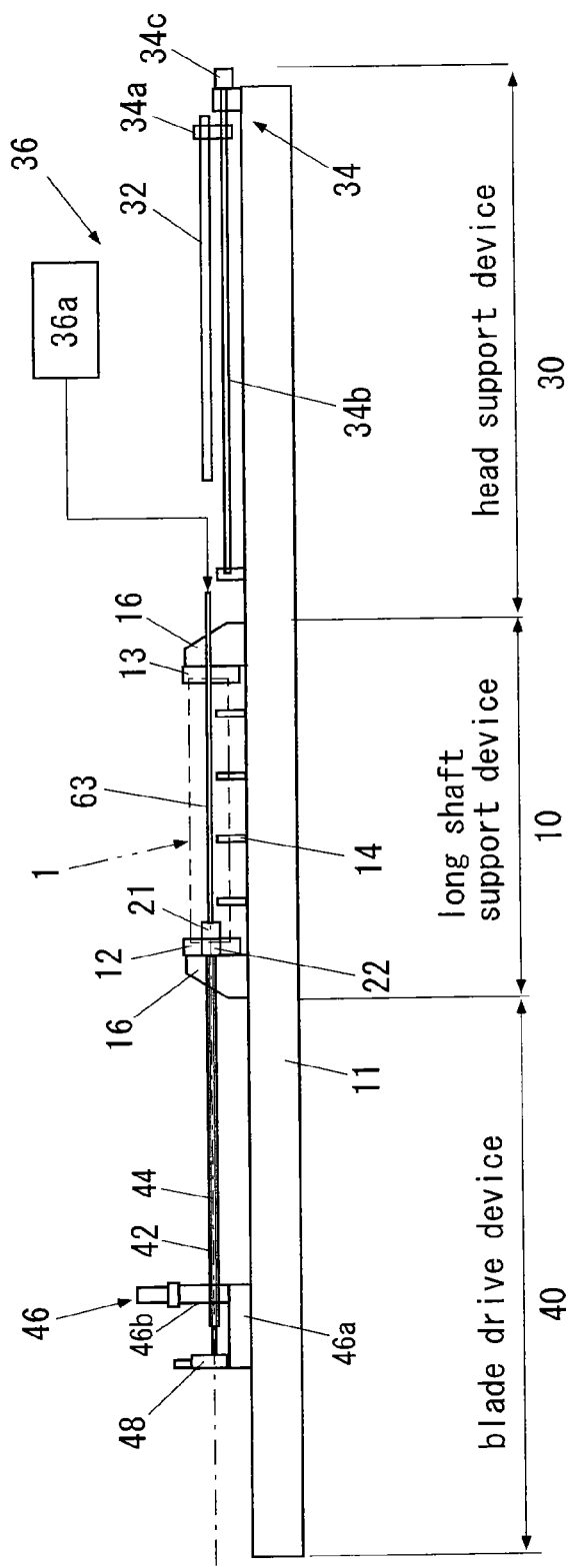
FIG. 22 illustrates a configuration to measure center deflection in Embodiment 1.
Figure 23:
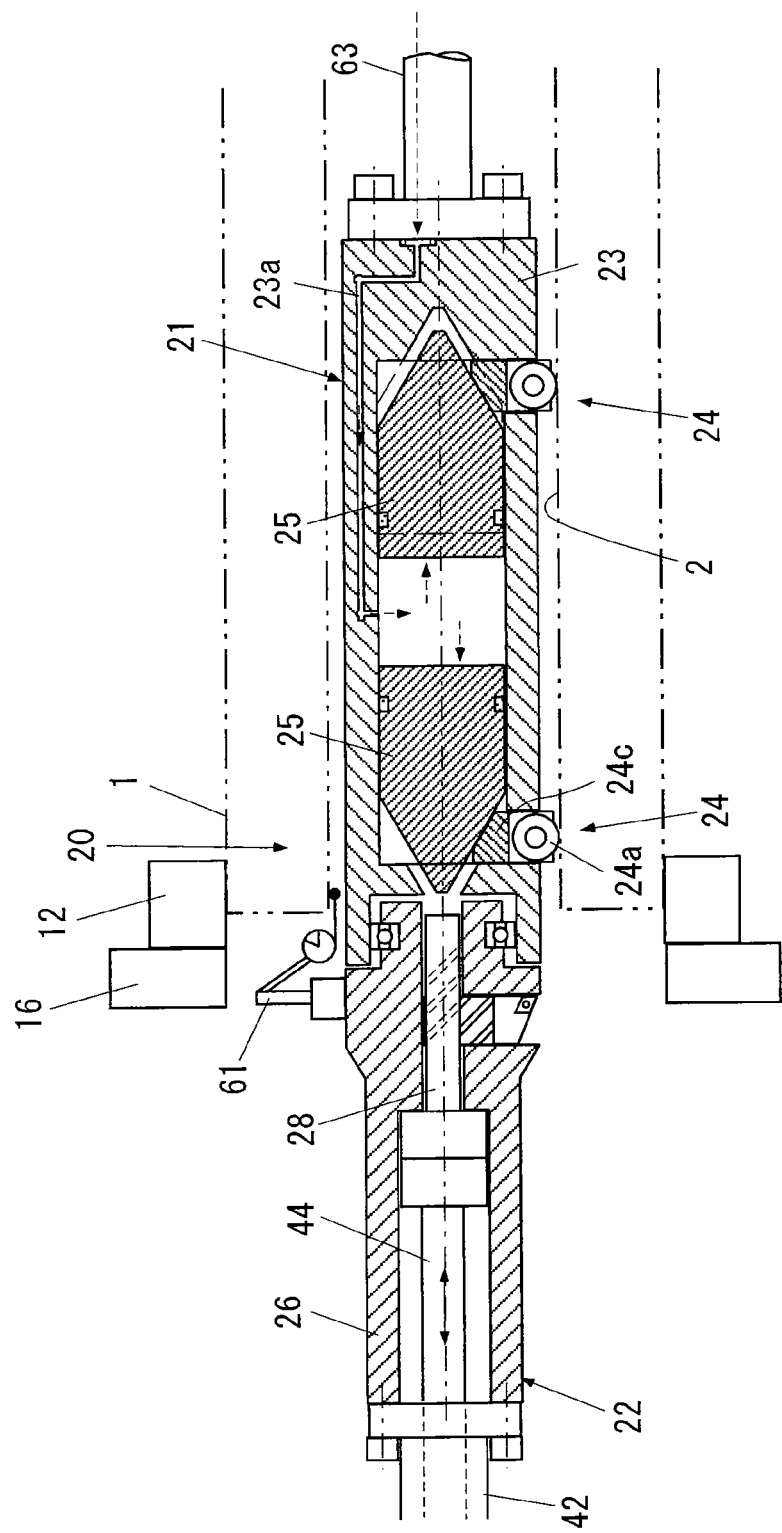
FIG. 23 is a partially enlarged cross-sectional view of FIG. 22.

FIG. 22 illustrates a configuration example to measure center deflection in Embodiment 1. FIG. 23 is a partially enlarged cross-sectional view of FIG. 22. For brevity of the drawing, FIG. 22 does not illustrate the machining fluid supply device 18, the middle support part 43 and the like. Similarly, FIG. 23 does not illustrate the second hollow 32b and the like.

The long shaft support device 10 includes: chuck device 12, 13 that support by grasping both end parts of the long shaft 1; a chuck rotation device 16 that rotates the chuck device 12, 13 around the shaft axis of the blade head 22, thus rotating the long shaft 1 and the inner surface copy head 24 attached to the inner circumferential surface 2 of this via the revolving rotor 24a relative to the blade head 22; and a measurement instrument 61 disposed to the blade head 22 to measure a position of a measurement point on the inner circumferential surface 2. The position measurement is to measure a position in the radial direction with reference to the center of the relative rotation, while shifting the measurement point in the circumferential direction by the relative rotation.

The chuck rotation device 16 rotates the chuck devices 12, 13 around the shaft axis of the blade head 22 while supporting the chuck devices 12, 13 rotatably in FIG. 22. Herein, in a normal state, the rotary center by the chuck rotation device 16 agrees with the shaft axis of the blade head 22.

When the chuck rotation device 16 rotates the chuck devices 12, 13, the long shaft 1 and the inner surface copy head 21 rotate integrally. That is, the long shaft 1 supported by grasping by the chuck devices 12, 13 rotates and further the inner surface copy head 21 attached to the inner circumferential surface 2 of the long shaft 1 rotates relative to the blade head 22.

In FIG. 23, the measurement instrument 61 is disposed to the blade head 22 to measure a position of a measurement point on the inner circumferential surface 2. This position measurement is to measure a position in the radial direction with reference to the center of the relative rotation. When the chuck rotation device 16 rotates the long shaft 1 relative to the blade head 22 as stated above, the measurement point by the measurement instrument 61 is shifted in the circumferential direction revolving around the center of the relative rotation. Thereby, the measurement point can be shifted across the entire circumference of the inner circumferential surface 2.

In the example of FIG. 23, the measurement instrument 61 is a dial gauge. Herein, according to the present invention, the measurement instrument 61 is not limited to a dial gauge, and may be other ones to measure a position of the measurement point in the radial direction, which is disposed to the blade head 22 so as to come into contact with the measurement point.

In FIG. 23, the inner surface copy head 21 is positioned at an end part of the long shaft 1, and the blade head 22 is positioned outside of the long shaft 1.

Further, in FIG. 22 and FIG. 23, a liquid supply tube 63 is connected with a body 23 of the inner surface copy head 21 via a hydraulic channel 23a to supply liquid between a pair of pistons 25 so as to give hydraulic pressure without coupling the body 23 of the inner surface copy head 21 with the boring bar 32 of the head support device 30. As in Embodiment 1, the body 23 of the inner surface copy head 21 may be coupled with the boring bar 32 of the head support device 30.

Meanwhile, in FIGS. 22 and 23, the blade head 22 may be coupled with the rotary drive device 46 via the main rod 42 and the blade drive rod 44 similarly to the case of FIG. 6. Herein, in this example, the blade head 22 is at rest during the position measurement by the measurement instrument 61. That is, during the position measurement by the measurement instrument 61, the rotary drive device 46 does not rotary-drive the blade head 22.

Configuration Example E to Measure Center Deflection

The long shaft inner surface machining apparatus of Embodiment 2 or Embodiment 4 may include a configuration to measure center deflection. The following describes this configuration.

Note here this configuration example E may be the same as the above-stated Embodiment 2 or 4 and the above-stated configuration example D except for the configurations of the drawings referred to in the following and the points described in the following.

Figure 24:
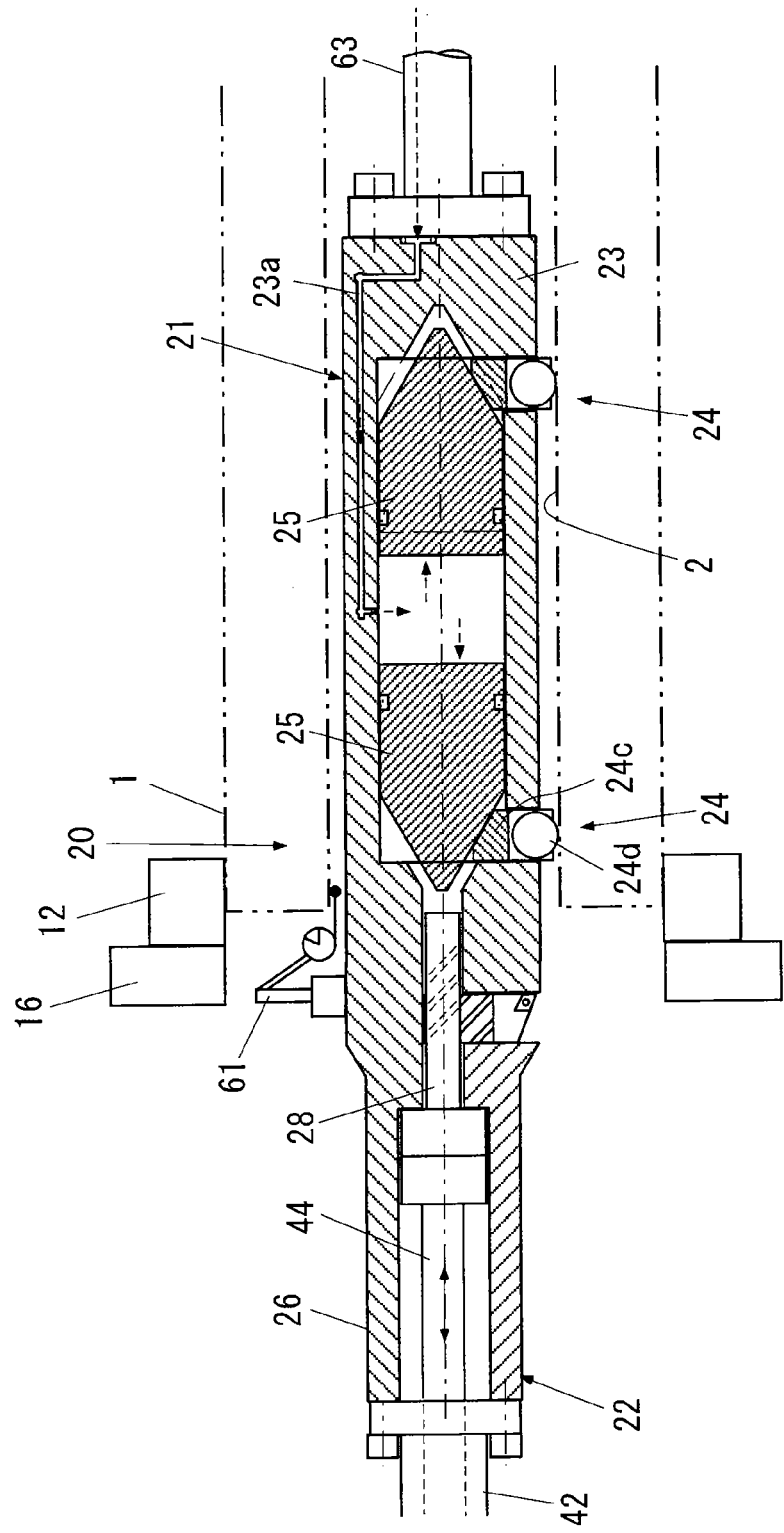
FIG. 24 illustrates a configuration to measure center deflection in Embodiment 2 or Embodiment 4.

FIG. 24 corresponds to FIG. 10, illustrating a state where a part of the machining head is positioned outside of the long shaft 1. For brevity of the drawing, FIG. 24 does not illustrate the second hollow 32b and the like.

The long shaft support device 10 includes: chuck device 12, 13 that support by grasping both end parts of the long shaft; a chuck rotation device 16 that rotates the chuck device 12, 13 around the shaft axis of the machining head 20, thus rotating the long shaft 1 relative to the machining head 20; and a measurement instrument 61 disposed to the machining head to measure a position of a measurement point on the inner circumferential surface of the long shaft. The position measurement is to measure a position in the radial direction with reference to the center of the relative rotation, while shifting the measurement point in the circumferential direction by the relative rotation.

The chuck rotation device 16 rotates the chuck devices 12, 13 around the shaft axis of the machining head 20 while supporting the chuck devices 12, 13 rotatably. Herein, in a normal state, the rotary center by the chuck rotation device 16 agrees with the shaft axis of the machining head 20.

When the chuck rotation device 16 rotates the chuck devices 12, 13, the long shaft 1 rotates integrally with the chuck devices 12, 13. That is, the long shaft 1 supported by grasping by the chuck devices 12, 13 rotates relative to the machining head 20. The relative rotation is done in a state where each free roller 24*d* comes into contact with the inner circumferential surface 2.

In FIG. 24, the measurement instrument 61 is disposed to the machining head 20 to measure a position of a measurement point on the inner circumferential surface 2. This position measurement is to measure a position in the radial direction with reference to the center of the relative rotation. When the chuck rotation device 16 rotates the long shaft 1 relative to the machining head 20 as stated above, the measurement point by the measurement instrument 61 is shifted in the circumferential direction revolving around the center of the relative rotation. Thereby, the measurement point can be shifted across the entire circumference of the inner circumferential surface 2.

In FIG. 24, the machining head 21 is positioned at an end part of the long shaft 1, and a part of the machining head 20 to dispose the measurement instrument 61 is positioned outside of the long shaft 1.

In FIG. 24, similarly to Embodiment 2 or Embodiment 4, the machining head 20 may be coupled with the rotary drive device 46 via the main rod 42 and the blade drive rod 44. Herein, in this example, the machining head 20 is at rest during the position measurement by the measurement instrument 61. That is, during the position measurement by the measurement instrument 61, the rotary drive device 46 does not rotary-drive the machining head 20.

Effects by Configuration Examples D and E

The above-stated configuration examples D and E are provided with the chuck rotation device 16 to rotate the chuck devices 12, 13 of the long shaft inner surface machining apparatus around the shaft axis of the blade head 22 (in the case of configuration E, the machining head 20, same as below) and include the measurement instrument 61 disposed at the blade head of the long shaft inner surface machining apparatus, so that the chuck rotation device 16 allows in configuration example D to rotate the long shaft 1 and the inner surface copy head 21 same as below) relative to the blade head 22 and in configuration example E to rotate the long shaft 1 relative to the machining head 20, thus shifting the measurement point on the inner circumferential face subjected to the position measurement by the measurement instrument 61 in the circumferential direction. Thereby, the radial direction position of the measurement point viewed from the blade head can be measured across the entire circumference, and therefore based on this measurement data, it can be confirmed whether the center of the inner circumferential face agrees with the shaft axis of the blade head (i.e., the shaft axis of the inner surface copy head) or not. That is, if the radial direction position of the measurement point fluctuates in the circumferential direction, then the center of the inner circumferential face will not agree with the shaft axis of the blade head (i.e., the shaft axis of the inner surface copy head).

Further, since the measurement instrument 61 (e.g., dial gauge) disposed to the blade head 22 is at rest during the position measurement, the above-stated position measurement by the measurement instrument 61 is not affected by gravity. As a result, the position measurement can be performed with high precision. That is, if the blade head 22 is rotated, the measurement instrument 61 (dial gauge) disposed thereto will face upward or downward, thus changing the degree of influence by gravity depending on the directions. As a result, the precision of the position measurement will deteriorate.

Using the above-stated configuration example D or E, it can be confirmed whether the center of the inner circumferential face 2 agrees with the shaft axis of the blade head 22 or not by any one of the following two cases of (A) and (B).

(A) The case where confirmation is made whether the shaft axis agreement function of the inner surface copy head 21 (machining head 20 in configuration example E, same as below) is normal or not.

(B) The case where confirmation is made whether the grasping position of the long head by the chuck grasping mechanism is appropriate or not.

The following describes the respective cases.

(A) The case where confirmation is made whether the shaft axis agreement function of the inner surface copy head 21 is normal or not.

This case is on the assumption that the chuck devices 12 and 13 grasp the long shaft 1 whose center of the outer circumferential face has been confirmed to agree with the center of the inner circumferential face 2 (assumption 1). For instance, it is on the assumption that the center position of the outer circumferential face and the center position of the inner circumferential face 2 are measured in advance, so as to confirm the agreement of both, and then the chuck devices 12, 13 grasp such a long shaft 1.

This case is also on the assumption that when the chuck devices 12, 13 grasp the long shaft 1 (e.g., the outer circumferential face thereof), the center of the chuck devices 12, 13 (i.e., the rotary center) and the center of the outer circumferential face of the long shaft 1 automatically will agree (assumption 2). For instance, the chuck devices 12, 13 include a plurality of grasping parts to grasp the outer circumferential face of the long shaft 1, which are disposed at intervals in the rotary direction of the chuck devices 12, 13, and these grasping parts may move in the radial direction together while keeping the same radial direction position with reference to the rotary center of the chuck devices 12, 13.

Thus, based on the assumptions 1 and 2, when rotating the chuck devices 12, 13 supporting the long shaft 1 by grasping, the long shaft 1 rotates around the center of the inner circumferential face 2. While rotating the long shaft 1 in this way, the radial direction position of the above-stated measurement point is measured by the measurement instrument 61 across the entire circumference of the inner circumferential surface 2.

If the radial direction position of the measurement point does not fluctuate in the circumferential direction, it can be determined that the shaft axis agreement function of the inner surface copy head 21 is normal.

On the other hand, if the radial direction position of the measurement point fluctuates in the circumferential direction, the shaft axis agreement function of the inner surface copy head 21 is not normal. Therefore, the inner surface copy head 21 is adjusted based on the fluctuation data of the radial direction position so as to make the shaft axis agreement function normal. For instance, the revolving rotor 24*a* became worn is replaced with a new one.

(B) The case where confirmation is made whether the grasping position of the long head by the chuck grasping mechanism is appropriate or not.

This case is on the assumption that the chuck devices 12 and 13 grasp the long shaft 1 whose center of the outer circumferential face has been confirmed not to agree with the center of the inner circumferential face 2 (assumption 1). For instance, it is on the assumption that the center position of the outer circumferential face and the center position of the inner circumferential face 2 are measured in advance, so as to confirm the disagreement of both, and then the chuck devices 12, 13 grasp such a long shaft 1.

This case is also on the assumption that when the chuck devices 12, 13 grasp such a long shaft 1 (e.g., the outer circumferential face thereof), the center of the inner circumferential face 2 of the long shaft 1 deviates from the center of the chuck devices 12, 13 (i.e., the rotary center) (assumption 2). For instance, as stated above, the chuck devices 12, 13 include a plurality of grasping parts to grasp the outer circumferential face of the long shaft 1, which are disposed at intervals in the rotary direction of the chuck devices 12, 13, and these grasping parts may move in the radial direction together while keeping the same radial direction position with reference to the rotary center of the chuck devices 12, 13.

This case is further on the assumption that the shaft axis agreement function of the inner surface copy head 21 is normal (assumption 3). That is, it is on the assumption that the inner surface copy head 21 can make the center of the inner circumferential face 2 normally agree with the center of the chuck devices 12, 13 (i.e., the rotary center.

Based on the above-stated assumptions 1 to 3, when the chuck devices 12, 13 grasp the outer circumferential face of the long shaft 1, the center of the inner circumferential face 2 of the long shaft 1 deviates from the center of the chuck devices 12, 13 (i.e., the rotary center). However, this is against the assumption 3 that "the normal shaft axis agreement function of the inner surface copy head 21" makes the center of the inner circumferential face 2 agree with the shaft axis of the machining head 20 (i.e., the center of the chuck devices 12, 13). Therefore, (small) deformation occurs at the respective parts, resulting in that the long shaft 1 rotates around a position deflecting from the center of the inner circumferential face 2. While rotating the long shaft 1 in this way, the radial direction position of the above-stated measurement point is measured by the measurement instrument 61 across the entire circumference of the inner circumferential surface 2.

The radial direction position of the measurement point fluctuates, and based on this fluctuation data, the grasping position of the long head by the chuck grasping mechanism is adjusted so that the center of the chuck devices 12, 13 agrees with the center of the inner circumferential face 2. For instance, the position of the above-stated each grasping part of the chuck devices 12, 13 is adjusted, or the position of the chuck devices 12, 13 themselves is adjusted.

Modification Example F

The above embodiments and configuration examples describe a horizontal-type long shaft inner surface machining apparatus to fix the long shaft 1 horizontally. However, the present invention is not limited to a horizontal type, and a vertical type may be used. That is, in the case of a vertical type configured based on Embodiment 1, the long shaft support device 10 fixes the long shaft 1 fixed with the shaft center thereof being directed to the vertical direction, the machining head 20 can move vertically along the shaft center of the prepared hole 2 of the long shaft 1, the head support device 30 moves the machining head 20 vertically, and the blade drive device 40 rotates the blade head 22 around the vertical shaft center.

Modification Example G

The long shaft inner surface machining apparatuses of Embodiment 1 to Embodiment 5 may be provided with a contact detection sensor to detect the blade 29 coming into contact with the inner surface of the prepared hole 2. The following describes such a configuration example as modification example G.

During boring operations, an operation called "blade alignment" is performed to confirm the position where the tip end of the blade 29 for inner face machining just comes into contact with the inner surface of the long shaft 1. Conventionally, an operator performs the blade alignment while listening to the sound when the blade tip end comes into contact with the inner surface of the long shaft. Alternatively, the inner surface of the long shaft is measured using an internal diameter measurement jig.

However, since there are variations in a sense of hearing among individuals, the judging method by listening to the sound does not have repeatability. The method using an internal diameter measurement jig requires a long jig to enable the measurement of a long shaft, and the jig itself will generate bending, and therefore measurement cannot be done precisely. Therefore, it is difficult to perform the blade alignment precisely.

Modification Example G is a configuration to solve with the above-stated problems.

Figure 25:
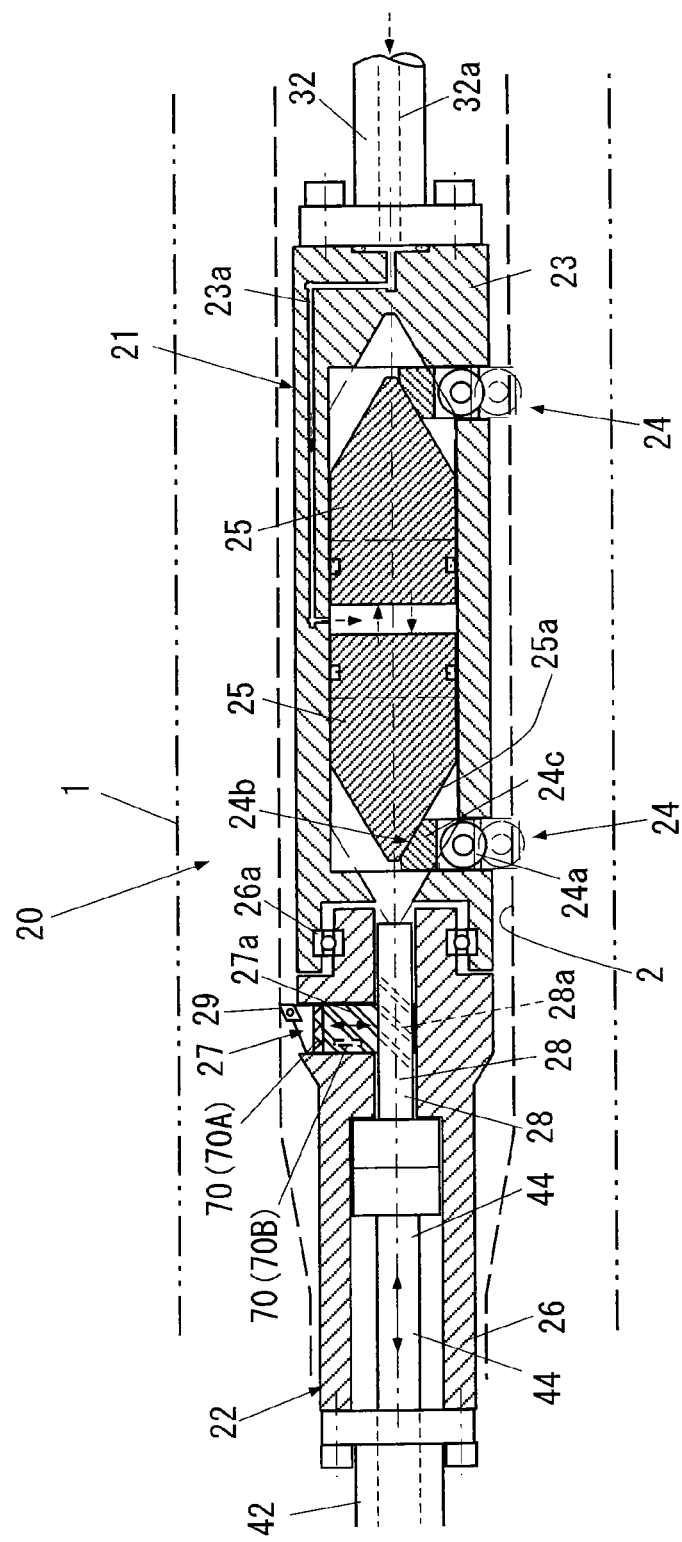
FIG. 25 illustrates configuration example G.

FIG. 25 is an enlarged cross-sectional view of the machining head 20 illustrating the configuration of modification example G. In FIG. 25, the long shaft inner surface machining apparatus includes a contact detection sensor 70 to detect a contact of the blade 29 with the inner surface of the prepared hole 2. Herein, FIG. 25 illustrates the configuration including the contact detection sensor 70 added to the machining head 20 of FIG. 6. However, the contact detection sensor 70 can be added similarly to the machining head 20 of FIG. 10 as well.

In the configuration example of FIG. 25, the contact detection sensor 70 is a pressure sensor 70A or a strain gauge 70B provided coming with the tool base 27. Although this example illustrates both of the pressure sensor 70A and the strain gauge 70B, the configuration may include only one of them.

In the case where the pressure sensor 70A is used as the contact detection sensor 70 provided to the tool base 27, the tool base 27 may be separated into a part formed with an inclined tooth 27a and a part with the blade 29 attached thereto, and the pressure sensor 70A is disposed between these parts, thus providing the pressure sensor 70A to the tool base 27. As the pressure sensor, a piezo-electric device or a load cell may be used.

In the case where the strain gauge 70B is used as the contact detection sensor provided to the tool base 27, the strain gauge 70B is attached at a position where strain in the moving direction of the tool base 27 (radial direction of the blade head 22) can be measured, thus providing the strain gauge 70B to the tool base 27.

As a method to externally transmit a detection signal from the pressure sensor 70A or the strain gauge 70B, an opening in the axial direction may be provided inside the axial direction moving member 28 and the blade drive rod 44, and a signal cable connected with the pressure sensor 70A or the strain gauge 70B may be drawn through the opening, thus transmitting a signal. Herein, since both of the axial direction moving member 28 and the blade drive rod 44 rotate in Embodiment 1 and Embodiment 3, electric connection means such as a slip ring has to be provided to enable signal transmission with a stationary part.

According to the above-stated configuration, when the blade 29 is moved toward the inner surface of the prepared hole 2, the contact detection sensor 15 can detect a contact of the blade 29 with the inner surface of the prepared hole 2, so that the position (zero-point position or reference position) where the blade 29 just comes into contact with the inner surface of the prepared hole can be detected precisely, whereby blade alignment can be done precisely.

In the configuration example of FIG. 25, both of the pressure sensor 70A and the strain gauge 70B can be provided so that the two sensors are used together to improve detection accuracy.

Figure 26:
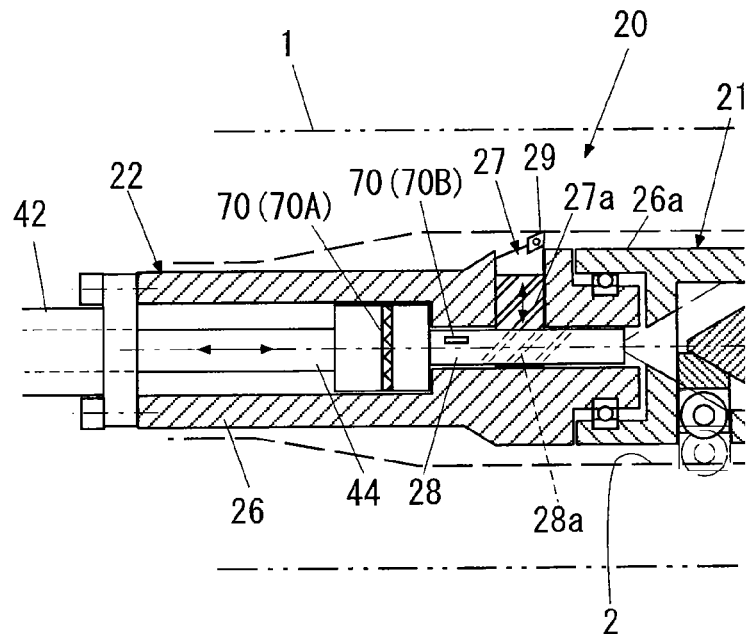
FIG. 26 illustrates another configuration as modification example G.

FIG. 26 illustrates a configuration example of another arrangement of the contact detection sensor 70. In the configuration example of FIG. 26, the pressure sensor 70A as the contact detection sensor is disposed between the axial direction moving member 28 and the blade drive rod 44. In this configuration, when the blade 29 is moved toward the inner surface of the prepared hole 2 until the blade 29 comes into contact with the inner surface of the prepared hole 2, an impact by the contact is transmitted as pressure (load) fluctuation to the pressure sensor 70A via the tool base 27 and the axial direction moving member 28, and therefore the pressure sensor 70A detects this fluctuation, thus enabling detection of a contact of the blade 29 with the inner surface of the prepared hole 2.

Further, as illustrated in FIG. 26, the strain gauge 70B as the contact detection sensor 70 may be attached to the axial direction moving member 28. In the case of this configuration, an impact of a contact of the blade 29 with the inner surface of the prepared hole 2 is transmitted as strain fluctuation to the strain gauge 70B via the tool base 27 and the axial direction moving member 28, and therefore the strain gauge 70B detects this fluctuation, thus enabling detection of a contact of the blade 29 with the inner surface of the prepared hole 2. In the configuration example of FIG. 26, both of the pressure sensor 70A and the strain gauge 70B can be provided so that the two sensors are used together to improve detection accuracy.

Figure 27:
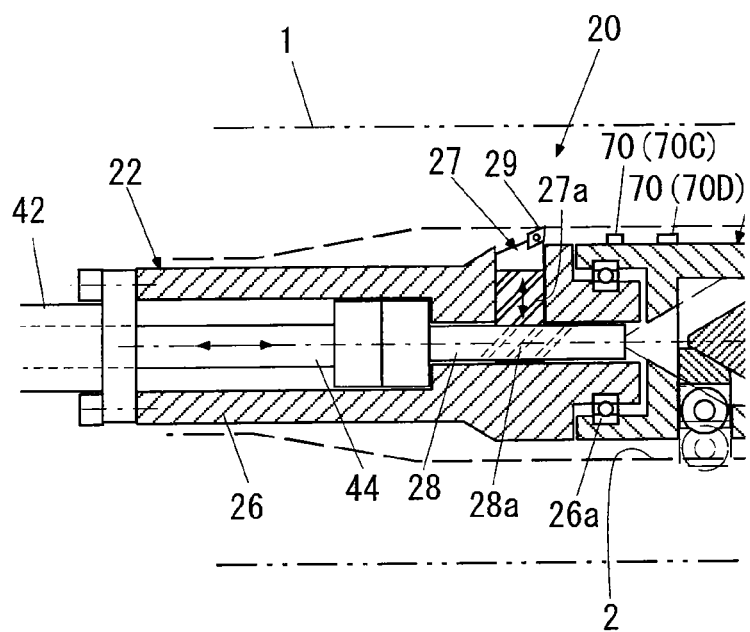
FIG. 27 illustrates still another configuration as modification example G.

FIG. 27 illustrates another configuration example of the contact detection sensor 70. In the configuration example of FIG. 27, the contact detection sensor 70 is a sound sensor 70C or a vibration sensor 70D attached to the machining head 20. This drawing illustrates both of the sound sensor 70C and the vibration sensor 70D. However, the configuration may include only one of them.

The sound sensor 70C (or the vibration sensor 70D) is preferably provided in the vicinity of the blade 29. Further, as illustrated in FIG. 27, the sound sensor 70C (or the vibration sensor 70D) is preferably provided to the inner surface copy head 21 that does not rotate, and such a configuration facilitates wiring of the signal cable of the sound sensor 70C (or the vibration sensor 70D).

According to the above-stated configuration, the sound sensor 70C or the vibration sensor 70D can detect sound or vibration generated when the blade 29 is moved toward the inner surface of the prepared hole 2 until the blade 29 comes into contact with the inner surface of the prepared hole, so that the position (zero-point position or reference position) where the blade 29 just comes into contact with the inner surface of the prepared hole can be detected precisely, whereby blade alignment can be done precisely.

In the configuration example of FIG. 27, both of the sound sensor 70C and the vibration sensor 70D can be provided so that the two sensors are used together to improve detection accuracy.

Figure 28A:
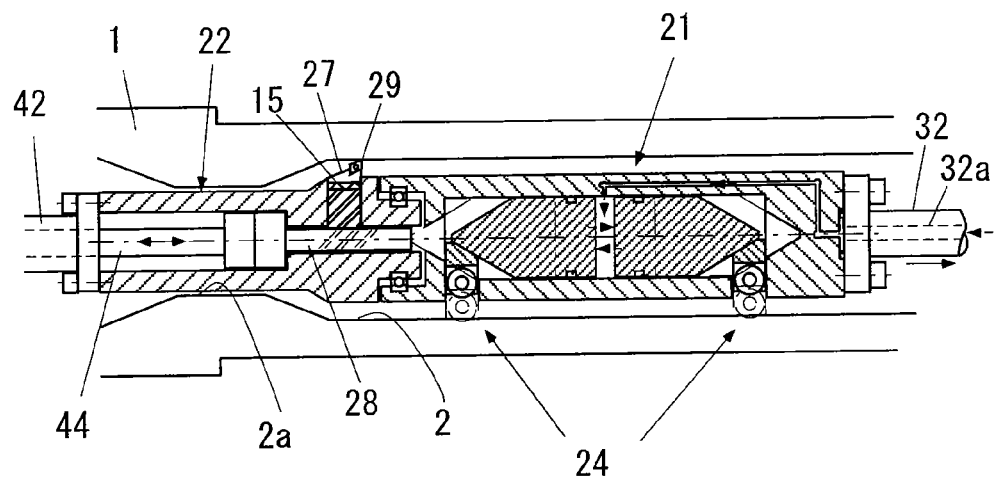
FIG. 28A is to describe an operation by a long shaft inner surface machining apparatus according to modification example G.
Figure 28B:
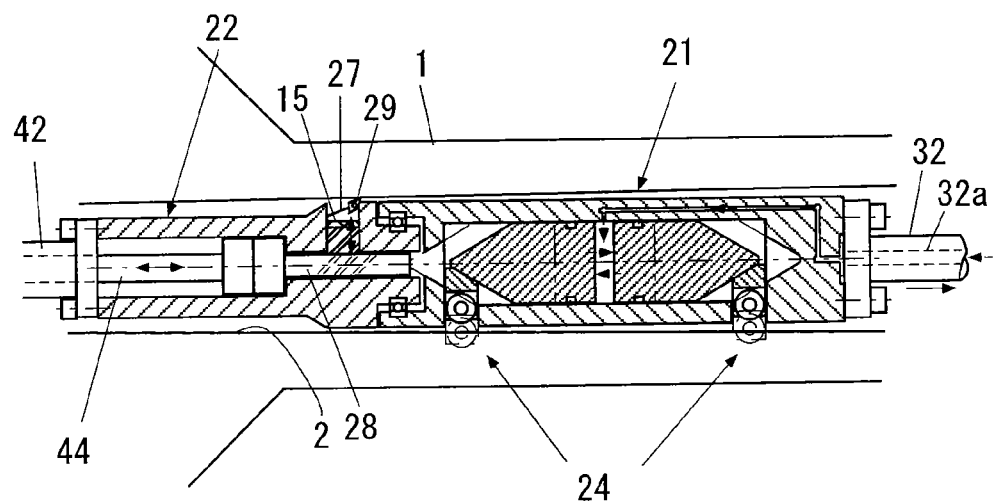
FIG. 28B is to describe an operation by a long shaft inner surface machining apparatus according to modification example G.

Referring now to FIG. 28A and FIG. 28B, the following describes operations of the long shaft inner surface machining apparatus according to modification example G.

Figure 3A:
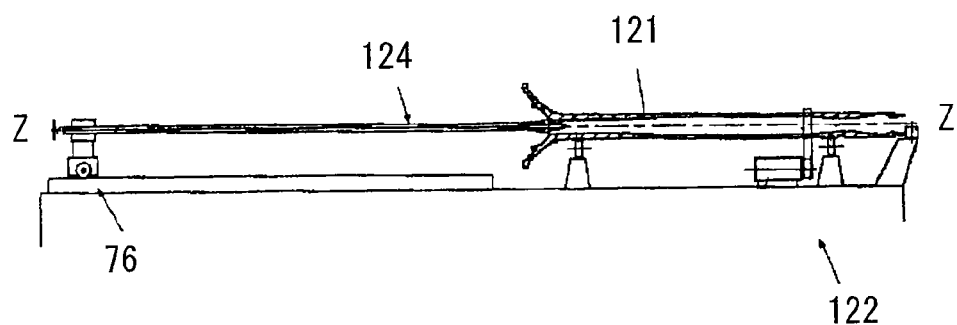
FIG. 3A illustrates a configuration of "a long shaft inner surface machining apparatus" of Patent Document 2.
Figure 3B:
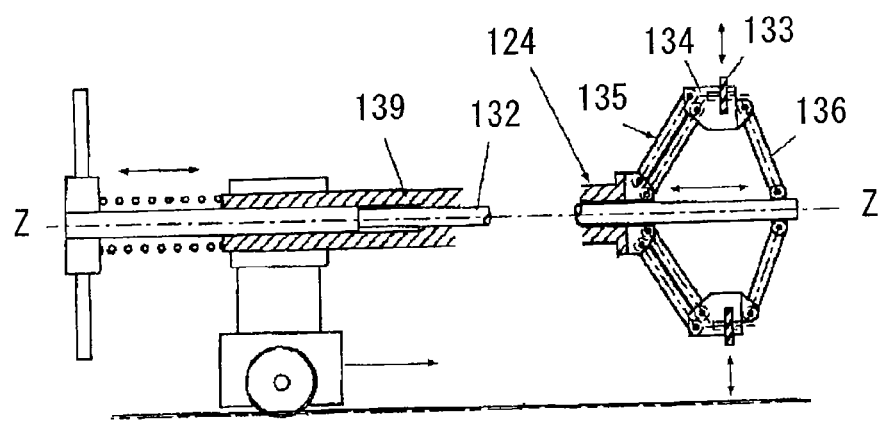
FIG. 3B illustrates a configuration of "a long shaft inner surface machining apparatus" of Patent Document 2.

FIG. 28A illustrates an inner surface machining state on the left end side (side opposed to flange) of the long shaft 1 of FIG. 3, and FIG. 28B illustrates a state on the right-end side (flange side). Although a contact detection sensor in the long shaft inner surface machining apparatus of FIG. 28 is the pressure sensor 70A provided at the tool base 27, the operation described in the following is similar to the case using the contact detection sensors (70A to 70D) of other configurations illustrated in FIG. 26 to FIG. 27.

In FIG. 28A, the machining head 20 is inserted into the prepared hole 2a of the minimum diameter on the left end side (side opposed to flange) of the long shaft 1 of FIG. 4 with the sub body 26 side facing the prepared hole 2.

Next, hydraulic fluid is supplied between the pair of pistons 25 through the hollow 32a of the boring bar 32 so as to move the pair of pistons 25 away from each other, whereby the diameter of the pair of inner surface chucks 24 is expanded radially. Such expansion of the diameter of the inner surface chucks 24 allows the shaft axis (rotation center) of the blade head 22 with the shaft axis of the prepared hole 2.

When the shaft axis of the blade head 22 coincides with the shaft axis of the prepared hole 2, the blade drive rod 44 is driven in the axial direction, thereby moving the blade 29 outwardly in the radial direction via the axial direction moving member 28 and the tool base 27 until the blade 29 just comes into contact with the inner surface of the prepared hole 2 based on the detection from the contact detection sensor 70, thus setting such a position at the reference position (zero-point position) (blade alignment operation). When finding the reference position, then the blade 29 is further moved from the reference position toward the inner surface of the prepared hole by a predetermined machining amount.

Next, the blade head 22 is rotated relative to the long shaft 1, and the machining head 20 is moved in the axial direction relative to the long shaft, thus machining the inner surface of the long shaft 1 so as to copy the prepared hole 2.

Next, as illustrated in FIG. 28B, the axial direction of the long shaft 1 is reversed, and the machining head 20 is inserted into the prepared hole on the right end side (flange side) of the long shaft 1 of FIG. 4 with the sub body 26 side facing the prepared hole, thus machining the inner surface in a similar manner. Thereby, the inner surface can be machined up to close to the flange of the long shaft 1.

As stated above, according to the configuration of modification example G, the contact detection sensor 15 can detect a contact of the blade 29 with the inner surface of the prepared hole 2, so that the position (zero-point position or reference position) where the blade 29 just comes into contact with the inner surface of the prepared hole 2 can be detected precisely, whereby blade alignment can be done precisely.

Modification Example H

The long shaft inner surface machining apparatus 10 of Embodiment 1 or Embodiment 3 further may include an inner surface inspection head 65. This inner surface inspection head 65 is attached to the inner surface copy head 21 instead of the blade head 22, and in such a state the inner surface inspection head 65 inspects the state of the inner surface 2 of the prepared hole (shape or radius of the inner surface 2, diameter, circularity or surface roughness of the inner surface 2).

Figure 29:
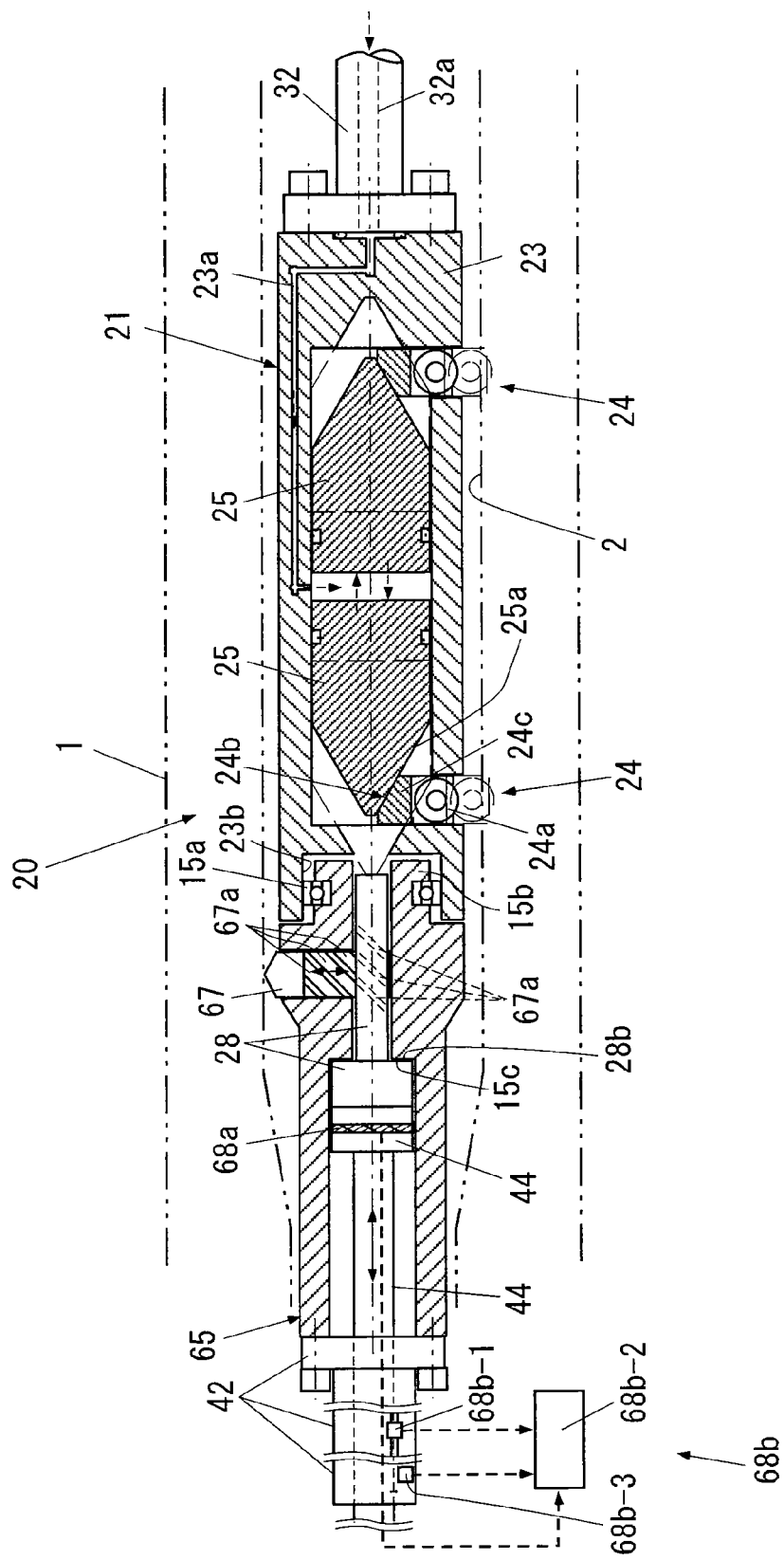
FIG. 29 illustrates a state where the inner surface inspection head replaced instead of the blade head is attached to the inner surface copy head in Embodiment 1, Embodiment 3 or Embodiment 4.

FIG. 29 illustrates a configuration example H-1 of the inner surface inspection head 65 according to modification example H, illustrating a state where the inner surface inspection head 65 replaced instead of the blade head 22 is attached to the inner surface copy head 21. Such replacement is done as in the following, for example. In FIG. 6, the main rod 42 is moved to the left side of FIG. 6 in the axial direction together with the rotary drive device 46, and the blade head 22 is removed from the inside of the long shaft 1. After removing, the blade head 22 is removed from the tip end of the main rod 42, and instead the inner surface inspection head 65 is attached at the tip end of the main rod 42. After that, the main rod 42 is moved in the axial direction together with the rotary drive device 46, whereby the inner surface inspection head 65 is inserted into the long shaft 1 and is attached to the inner surface copy head 21.

The inner surface inspection head 65 in a state of being attached to the inner surface copy head 21 is supported by the inner surface copy head 21 via a bearing 15a so as to be rotatable around the shaft axis thereof. In this example, the bearing 15a is incorporated into a side face of an axial direction end part 15b of the inner surface inspection head 65 facing the radial direction. Further, as illustrated in FIG. 29, the axial direction end part 15b may be inserted into an indentation 23b formed in the body 23 and recessed in the axial direction, whereby the inner surface inspection head 65 is attached to the inner surface copy head 21. In this state, the inner surface copy head 21 is moved together with the inner surface inspection head 65 in the axial direction by the head support device 30 of Embodiment 1 or the moving stage 10a of Embodiment 3.

As illustrated in FIG. 29, the inner surface inspection head 65 includes: a radial direction moving member 67 movable in the radial direction of the long shaft 1; the above-stated shaft moving device 48 and the axial direction moving member 28 that move the radial direction moving member 67 in the radial direction; a contact detection sensor 68a that detects a contact between the radial direction moving member 67 and the inner surface 2 of the long shaft 1 and outputs a signal of such; and a distance measurement part 68b that measures, based on the signal, a distance where the radial direction moving member 67 moves in the radial direction from the initial position to the contact position for contact with the inner surface 2. In this case, the rotary drive device 46 functions as a relative rotation device that rotates the inner surface inspection head 65 relative to the long shaft 1 around the shaft center of the long shaft 1.

Similarly to the tool base 27, the radial direction moving member 67 has an inclined tooth 67a inclined with reference to the shaft axis (i.e., the rotary center of the inner surface inspection head 65).

As stated above, the shaft moving device 48 moves the axial direction moving member 28 in the axial direction.

The axial direction moving member 28 may be used commonly by the inner surface inspection head 65 and the blade head 22. That is, in this example, the axial direction moving member 28 for the inner surface inspection head 65 is used by the blade head 22. When replacing the blade head 22 with the inner surface inspection head 65, the axial direction moving member 28 can be pulled out from the blade head 22 in the axial direction together with the tip end part of the blade drive rod 44 for removal at the outside of the long shaft 1. Subsequently, the axial direction moving member 28 is inserted in the axial direction into the inner surface inspection head 65 together with the tip end part of the blade drive rod 44, whereby the axial direction moving member 28 can be attached into the inner surface inspection head 65 as illustrated in FIG. 29. In this way, the axial direction moving member 28 can be pulled out from the blade head 22 and be inserted into the inner surface inspection head 65. An inclined tooth 28a is inclined in the same direction as of the inclined tooth 67a and meshes with the inclined tooth 67a. With this configuration, the axial direction movement of the axial direction moving member 28 moves the radial direction moving member 67 outwardly in the radial direction to bring the same into contact with the inner surface 2. Herein, the axial direction moving member 28 used in the inner surface inspection head 65 may be a different one from the axial direction moving member 28 used in the blade head 22, but has a configuration similar to that of the axial direction moving member 28 of the blade head 22.

The contact detection sensor 68a, for example, may be a piezo-electric device incorporated into the blade drive rod 44 or the axial direction moving member 28 (in the example of FIG. 29, the blade drive rod 44) so as to detect a contact pressure (i.e., contact) between the radius-direction moving member 67 and the inner surface 2. That is, the contact pressure acts on the blade drive rod 44 via the radial direction moving member 67 and the axial direction moving member 28, so that the contact detection sensor 68a can detect the contact.

As illustrated in FIG. 29, the distance measurement part 68b may include: a linear scale 68b-1; a conversion part 68b-2; and a proximity sensor 68b-3, for example.

The linear scale 68b-1 measures an axial direction moving distance of the axial direction moving member 28 (i.e., the blade drive rod 44). At the time when receiving a signal indicating the contact from the contact detection sensor 68a, the linear scale 68b-1 finishes the measurement.

The conversion part 68b-2 converts the axial direction moving distance of the axial direction moving member 28 measured by the linear scale 68b-1 into a radial direction moving distance of the radial moving member 16.

The proximity sensor 68b-3 may be a well-known eddy current detection type limit switch, for example, which detects the initial position where the radial direction moving member 67 retracts the most inwardly in the radial direction. In the example of FIG. 29, the proximity sensor 68b-3 detects an axial direction position of the axial direction moving member 28 (i.e., the blade drive rod 44) corresponding to the initial position. Thereby, the linear scale 68b-1 can start measuring the axial direction moving distance from the axial direction position of the axial direction moving member 28 corresponding to the initial position, and therefore the conversion part 68b-2 can calculate a moving distance of the radial direction moving member 67 while setting the initial position at origin point (zero). At this time, the radial direction position from the center of the initial position has to be measured beforehand.

With this configuration, based on a signal indicating the contact from the contact detection sensor 68a, a distance where the radial direction moving member 67 moves in the radial direction from the initial position until the radial direction moving member 67 comes into contact with the inner surface 2 can be measured.

The distance measurement part 68b measures a distance at the respective rotation positions. That is, while the inner surface inspection head 65 is rotated by the rotary drive device 46, a distance at the respective rotation positions is measured by the distance measurement part 68b. Based on the distances at the respective rotation positions, the shape of the inner surface 2 in the rotary direction can be obtained. Further, by continuously measuring the contact position in the radial direction, circularity or surface roughness can be measured as well.

Concerning a method to externally transmit a detection signal from the contact detection sensor 68a, an opening in the axial direction may be made inside the blade drive rod 44, and a signal cable may be drawn through the opening so as to connect with the contact detection sensor 68a, thus transmitting a signal.

The distance measurement part 68b may have another configuration instead of the above-stated configuration. For instance, in the case where the shaft moving device 48 moves the axial direction moving member 28 by a ball screw, the distance measurement part 68b detects the number of revolutions of the ball screw using an encoder instead of using the linear scale 68b-1, and multiplies such a detected value by a pitch to calculate a moving distance of the axial direction moving member 28. In this case, other respects are the same as in the above description with reference to FIG. 29.

The other configuration of the inner surface inspection head 65 other than the above description may be the same as in the blade head 22 except that the blade 29 is not provided.

The inner surface inspection head 65 is not limited to the above-stated configuration example H-1 illustrated in FIG. 29, and may use any one of the following configuration examples H-2 to H-5. In this case, the respects other than the following description in the configuration examples may be the same as in the above-stated configuration example H-1.

Configuration H-2

The inner surface inspection head 65 may be one capable of inspecting the shape of the inner surface 2 in a noncontact manner (e.g., a laser distance meter). When the inner surface inspection head 65 includes a laser distance meter, the laser distance meter is attached to the inner surface inspection head 65 so as to apply laser in the radial direction. Thereby, a distance to the inner surface 2 can be obtained at the respective rotary positions. That is, the rotary drive device 46 rotates the inner surface inspection head 65, whereby the laser distance meter can obtain a distance from the laser distance meter 18 to the inner surface 2 at the respective rotary positions. Based on these distances, the shape of the inner surface 2 in the rotary direction can be obtained. Further, since configuration example H-2 is a noncontact type, the above-stated radial direction moving member 67 can be omitted. Preferably, similarly to the blade head 22, the inside of the inner surface inspection head 65 is formed with a space into which the axial direction moving member 28 can be inserted from the side opposite to the inner surface copy head 21. Thereby, when changing the blade head 22 and the inner surface inspection head 65, there is no need to separate the axial direction moving member 28 from the blade drive rod 44. Herein, concerning a method to transmit a detection signal between the laser distance meter within the long shaft 1 and the outside of the long shaft 1, an opening may be made inside the blade drive rod 44 and the inner surface inspection head 65, for example, and a signal cable may be drawn through the opening so as to connect with the laser distance meter, thus transmitting a signal.

Configuration H-3

Further, the inner surface inspection head 65 may include an image pickup device (e.g., a CCD camera) that images the inner surface 2. In this case, the image pickup device is attached to the outer circumferential surface of the inner surface inspection head 65 so that the image pickup device faces outside in the radial direction. Preferably, the rotary drive device 46 rotates the inner surface inspection head 65, thereby obtaining image data of the inner surface 2 across the entire circumference in the rotary direction, and based on this image data, roughness of the inner surface 2 can be inspected. Further, since configuration example H-3 is a noncontact type, the above-stated radial direction moving member 67 can be omitted. Preferably, similarly to the blade head 22, the inside of the inner surface inspection head 65 is formed with a space into which the axial direction moving member 28 can be inserted from the side opposite to the inner surface copy head 21. Herein, concerning a method to transmit a detection signal between the CCD camera within the long shaft 1 and the outside of the long shaft, a similar method to that of configuration H-2 may be used.

In this configuration example H-3, a plurality of the image pickup devices may be provided in the circumferential direction revolving around the shaft of the long shaft 1. In this case, the inner surface 2 can be inspected across the entire circumference or at a plurality of positions in the circumferential direction without rotating the inner surface inspection head 65.

Configuration H-4

In the above-stated configuration example H-1, a plurality of sets of: the radial direction moving member 67; a driving device including the shaft moving device 48 and the axial direction moving member 28; the contact detection sensor 68a; and the distance measurement part 68b may be provided, and these plurality of sets of radial direction moving members 67 are provided at mutually different positions in the circumferential direction around the shaft of the long shaft 1. In this case, instead of the above-stated blade drive rod 44, a driving head coupled with the axial direction moving member 28 in the axial direction is provided for each of the above-stated sets. Further, in the same manner as in configuration example H-1, in each set, the driving device moves the corresponding driving head in the axial direction, thereby moving the corresponding radial direction moving member 67 in the radial direction via the axial direction moving member 28, so that based on a signal from the contact detection sensor 68a, the distance measurement part 68b obtains a distance from the initial position to the inner surface. In this case, the radial direction moving member 67 and the axial direction moving member 28 in each set are supported against the inner surface of the inner surface inspection head 65, so that operations of the radial direction moving member 67 and the axial direction moving member 28 in each set may be guided by the inner surface of the inner surface inspection head 65.

In the case of configuration example H-4, the inner surface 2 can be inspected across the entire circumference or at a plurality of positions in the circumferential direction without rotating the inner surface inspection head 65.

Configuration H-5

In the above-stated configuration example H-2, a plurality of the layer distance meters may be provided in the circumferential direction around the shaft of the long shaft 1. In this case, the inner surface 2 can be inspected across the entire circumference or at a plurality of positions in the circumferential direction without rotating the inner surface inspection head 65.

Note here that the present invention is not limited to the above-stated embodiments, and can be modified variously without departing from the scope of the present invention.

The invention claimed is:

1. A long shaft inner surface machining apparatus that cuts an inner surface of a long shaft including a prepared hole penetrating therethrough in an axial direction so as to copy the prepared hole, wherein the long shaft inner surface machining apparatus comprises:
   (a) a long shaft support device that fixes the long shaft so as not to bend;
   (b) a machining head that is insertable into the prepared hole of the long shaft in an axial direction, wherein the machining head includes a blade movable in a radial direction for inner surface machining, wherein the machining head is operable to let a rotation center of the blade coincide with a first shaft axis of the prepared hole, and wherein the machining head is movable within the prepared hole in the axial direction;
   (c) a head support device that is coupled with the machining head from a first end of the long shaft through the prepared hole, and the head support device moves the machining head in the axial direction; and
   (d) a blade drive device that is coupled with the machining head from a second end of the long shaft through the prepared hole, and the blade drive device rotary-drives the blade around a second shaft axis,
   wherein the machining head comprises:
   an inner surface copy head to expand a diameter thereof radially by hydraulic pressure so as to let a shaft axis thereof coincide with the shaft axis of the prepared hole and is movable in the axial direction within the prepared hole; and
   a blade head supported by the inner surface copy head rotatably around a shaft axis thereof, and including an axial direction moving member movable in the axial direction where axial direction movement thereof moves the blade in the radial direction,
   wherein the head support device includes a boring bar with one end thereof coupled with the inner surface copy head and extending in the axial direction, and a bar moving device that moves the boring bar in the axial direction so as not to rotate, and
   the blade drive device includes: a main rod with one end thereof coupled with the blade head and extending in the axial direction; and a rotary drive device that rotary-drives the main rod around a shaft axis and moves in the axial direction so as to follow the machining head.

2. A long shaft inner surface machining apparatus that cuts an inner surface of a long shaft including a prepared hole penetrating therethrough in an axial direction so as to copy the prepared hole, wherein the long shaft inner surface machining apparatus comprises:
   (a) a long shaft support device that fixes the long shaft so as not to bend, and the long shaft support device rotates the long shaft around a shaft center thereof;
   (b) a machining head that is insertable into the prepared hole of the long shaft in the axial direction, wherein the machining head includes a blade movable in a radial direction for inner surface machining, wherein the machining head is operable to let a rotation center of the blade coincide with a center axis of the machining head, wherein the machining head is movable within the prepared hole in the axial direction, and the machining head permits rotation of the long shaft when the machining head is inserted in the prepared hole;
   (c) a head support device that is coupled with the machining head from a first end of the long shaft through the prepared hole, and the head support device moves the machining head in the axial direction; and
   (d) a blade drive device that is coupled with the machining head from a second end of the long shaft through the prepared hole, and the blade drive moves the blade in the radial direction,
   wherein the machining head comprises:
   an inner surface copy head to expand a diameter thereof radially by hydraulic pressure so as to let a shaft axis thereof coincide with the shaft axis of the prepared hole and is movable in the axial direction within the prepared hole; and
   a blade head supported by the inner surface copy head rotatably around a shaft axis thereof, and including an axial direction moving member movable in the axial direction where axial direction movement thereof moves the blade in the radial direction,
   wherein the head support device includes a boring bar with one end thereof coupled with the inner surface copy head and extending in the axial direction, and a bar moving device that moves the boring bar in the axial direction so as not to rotate, and
   the blade drive device includes: a main rod with one end thereof coupled with the blade head and extending in the axial direction; and a rotary drive device that rotary-drives the main rod around a shaft axis and moves in the axial direction so as to follow the machining head.

3. A long shaft inner surface machining apparatus that cuts an inner surface of a long shaft including a prepared hole penetrating therethrough in an axial direction so as to copy the prepared hole, wherein the long shaft inner surface machining apparatus comprises:
   (a) a long shaft support device that fixes the long shaft so as not to bend, and the long shaft support device moves the long shaft in the axial direction;
   (b) a machining head that is insertable into the prepared hole of the long shaft in the axial direction, wherein the machining head includes a blade movable in a radial direction for inner surface machining, wherein the machining head is operable to let a rotation center of the blade coincide with a shaft axis of the prepared hole, and the machining head permits axial direction movement of the long shaft when the machining head is inserted in the prepared hole;
   (c) a head support device that is coupled with the machining head from a first end of the long shaft through the prepared hole, and the head support device fixes an axial direction position of the machining head; and
   (d) a blade drive device that is coupled with the machining head from a second end of the long shaft through the prepared hole, and the blade drive device rotary-drives the blade around a second shaft axis,
   wherein the machining head comprises:
   an inner surface copy head to expand a diameter thereof radially by hydraulic pressure so as to let a shaft axis thereof coincide with the shaft axis of the prepared hole and is movable in the axial direction within the prepared hole; and
   a blade head supported by the inner surface copy head rotatably around a shaft axis thereof, and including an axial direction moving member movable in the axial direction where axial direction movement thereof moves the blade in the radial direction, wherein
the head support device includes a boring bar with one end thereof coupled with the inner surface copy head and extending in the axial direction, and a bar support member that supports the boring bar so as not to rotate and so as not to move in the axial direction, and
the blade drive device includes: a main rod with one end thereof coupled with the blade head and extending in the axial direction; and a rotary drive device that rotary-drives the main rod around a shaft axis.

4. A long shaft inner surface machining apparatus that cuts an inner surface of a long shaft including a prepared hole penetrating therethrough in an axial direction so as to copy the prepared hole, wherein the long shaft inner surface machining apparatus comprises:
   (a) a long shaft support device that fixes the long shaft so as not to bend, wherein the long shaft support device moves the long shaft in the axial direction and rotates the long shaft around a shaft center thereof;
   (b) a machining head that is insertable into the prepared hole of the long shaft in the axial direction, wherein the machining head includes a blade for inner surface machining movable in a radial direction, wherein the machining head is operable to let a rotation center of the blade coincide with a center axis of the machining head, and the machining head permits axial direction movement and rotation of the long shaft when the machining head is inserted in the prepared hole;
   (c) a head support device that is coupled with the machining head from a first end of the long shaft through the prepared hole, and the head support device fixes an axial direction position of the machining head; and
   (d) a blade drive device that is coupled with the machining head from a second end of the long shaft through the prepared hole, and the blade drive moves the blade in the radial direction,
   wherein the machining head includes an axial direction moving member movable in the axial direction where axial direction movement of the axial direction moving member moves the blade in the radial direction, and expands a diameter thereof radially by hydraulic pressure so as to let a shaft axis thereof coincide with the shaft axis of the prepared hole,
   the head support device includes a boring bar with one end thereof coupled with the inner surface copy head and extending in the axial direction, and a bar support member that supports the boring bar so as not to rotate and so as not to move in the axial direction, and
   the blade drive device includes: a main rod with one end thereof coupled with the blade head and extending in the axial direction; and a main rod support device that supports the main rod.

5. A long shaft inner surface machining apparatus that cuts an inner surface of a long shaft including a prepared hole penetrating therethrough in an axial direction so as to copy the prepared hole, wherein the long shaft inner surface machining apparatus comprises:
   a long shaft support device that fixes the long shaft so as not to bend;
   a machining head that is insertable into the prepared hole of the long shaft in the axial direction, wherein the machining head includes a blade movable in a radial direction for inner surface machining, wherein the machining head is operable to let a rotation center of the blade coincide with an axis of the prepared hole, and wherein the machining head is movable in the prepared hole in the axial direction; and
   the machining head further comprising:
   an inner surface copy head to expand a diameter thereof radially by hydraulic pressure so as to let an axis thereof coincide with the axis of the prepared hole and is movable in the axial direction in the prepared hole; and
   a blade head supported by the inner surface copy head rotatably around the axis thereof, and including an axial direction moving member movable in the axial direction, wherein axial-direction movement of the axial direction moving member moves the blade in a radial direction,
   the long shaft inner surface machining apparatus further comprising:
   a head support device that includes a boring bar that is coupled with the inner surface copy head from a first end of the long shaft through the prepared hole, that moves the inner surface copy head and the blade head in the axial direction, and that is configured such that liquid for giving the hydraulic pressure to the inner surface copy head is supplied to the inner surface copy head through a hollow of the boring bar extending in the axial direction; and
   a blade drive device that includes a main rod that is coupled with the blade head from a second end of the long shaft through the prepared hole, and that includes a blade drive rod extending in the axial direction through a hollow of the main rod, wherein the blade drive device moves the axial direction moving member in the axial direction by axial-direction movement of the blade drive rod, to cause the blade to move in the radial direction, and wherein the blade drive device rotary-drives the blade around the axis by rotary-driving the main rod.

6. A long shaft inner surface machining apparatus that cuts an inner surface of a long shaft including a prepared hole penetrating therethrough in an axial direction so as to copy the prepared hole, wherein the long shaft inner surface machining apparatus comprises:
   a long shaft support device that fixes the long shaft so as not to bend, and the long shaft support device rotates the long shaft around a shaft center thereof; and
   a machining head that is insertable into the prepared hole of the long shaft in the axial direction, wherein the machining head includes a blade movable in a radial direction for inner surface machining, wherein the machining head is operable to let an axis of the blade coincide with an axis of the prepared hole, wherein the machining head is movable in the prepared hole in the axial direction, and the machining head permits rotation of the long shaft when the machining head is inserted in the prepared hole;
   wherein the machining head includes an axial direction moving member movable in the axial direction wherein axial-direction movement of the axial direction moving member moves the blade in a radial direction, and wherein the machining head expands a diameter thereof radially by hydraulic pressure so as to let the axis thereof coincide with the axis of the prepared hole,
   the long shaft inner surface machining apparatus comprising:
   a head support device that includes a boring bar that is coupled with the machining head from a first end of the long shaft through the prepared hole, that moves the machining head in the axial direction, and that is configured such that liquid for giving the hydraulic pressure to the machining head is supplied to the machining head through a hollow of the boring bar extending in the axial direction; and a blade drive device that includes a main rod that is coupled with the machining head from a second end of the long shaft through the prepared hole, and that includes a blade drive rod extending in the axial direction through a hollow of the main rod, wherein the blade drive device moves the axial direction moving member in the axial direction by axial-direction movement of the blade drive rod, to cause the blade to move in the radial direction.

7. A long shaft inner surface machining apparatus that cuts an inner surface of a long shaft including a prepared hole penetrating therethrough in an axial direction so as to copy the prepared hole, wherein the long shaft inner surface machining apparatus comprises:

a long shaft support device that fixes the long shaft so as not to bend, and the long shaft support device moves the long shaft in the axial direction;

a machining head that is insertable into the prepared hole of the long shaft in the axial direction, wherein the machining head includes a blade for inner surface machining movable in a radial direction for inner surface machining, wherein the machining head is operable to let a rotation center of the blade coincide with an axis of the prepared hole, and the machining head permits axial direction movement of the long shaft when the machining head is inserted in the prepared hole; and the machining head comprising:

an inner surface copy head to expand a diameter thereof radially by hydraulic pressure so as to let an axis thereof coincide with the axis of the prepared hole and is movable in the axial direction in the prepared hole; and a blade head supported by the inner surface copy head rotatably around the axis thereof, and including an axial direction moving member movable in the axial direction, wherein axial-direction movement of the axial direction moving member moves the blade in a radial direction, the long shaft inner surface machining apparatus comprising:

a head support device that includes a boring bar that is coupled with the inner surface copy head from a first end of the long shaft through the prepared hole, that fixes an axial-direction position of the inner surface copy head, and that is configured such that liquid for giving the hydraulic pressure to the inner surface copy head is supplied to the inner surface copy head through a hollow of the boring bar extending in the axial direction; and a blade drive device that includes a main rod that is coupled with the blade head from a second end of the long shaft through the prepared hole, and that includes a blade drive rod extending in the axial direction through a hollow of the main rod, wherein the blade drive device moves the axial direction moving member in the axial direction by axial-direction movement of the blade drive rod, to cause the blade to move in the radial direction, and wherein the blade drive device rotary-drives the blade around the axis by rotary-driving the main rod.

8. A long shaft inner surface machining apparatus that cuts an inner surface of a long shaft including a prepared hole penetrating therethrough in an axial direction so as to copy the prepared hole, wherein the long shaft inner surface machining apparatus comprises:

a long shaft support device that fixes the long shaft so as not to bend, wherein the long shaft support device moves the long shaft in the axial direction, and rotates the long shaft around a shaft center thereof; and a machining head that is insertable into the prepared hole of the long shaft in the axial direction, wherein the machining head includes a blade for inner surface machining movable in a radial direction, wherein the machining head is operable to let an axis of the blade coincide with an axis of the prepared hole, and the machining head permits axial direction movement and rotation of the long shaft when the machining head is inserted in the prepared hole, wherein the machining head includes an axial direction moving member movable in the axial direction wherein axial-direction movement of the axial direction moving member moves the blade in a radial direction, and wherein the machining head expands a diameter thereof radially by hydraulic pressure so as to let the axis thereof coincide with the axis of the prepared hole, a head support device that includes a boring bar that is coupled with the machining head from a first end of the long shaft through the prepared hole, that fixes an axial-direction position of the machining head, and that is configured such that liquid for giving the hydraulic pressure to the machining head is supplied to the machining head through a hollow of the boring bar extending in the axial direction; and a blade drive device that includes a main rod that is coupled with the machining head from a second end of the long shaft through the prepared hole, and that includes a blade drive rod extending in the axial direction through a hollow of the main rod, wherein the blade drive device moves the axial direction moving member in the axial direction by axial-direction movement of the blade drive rod, to cause the blade to move in the radial direction.

9. The long shaft inner surface machining apparatus according to claim 5, wherein the head support device includes the boring bar with one end thereof coupled with the inner surface copy head and extending in the axial direction, and a bar moving device that moves the boring bar in the axial direction so as not to rotate, and the blade drive device includes: a main rod with one end thereof coupled with the blade head and extending in the axial direction; and a rotary drive device that rotary-drives the main rod around a shaft axis and moves in the axial direction so as to follow the machining head.

10. The long shaft inner surface machining apparatus according to claim 6, wherein the head support device includes the boring bar with one end thereof coupled with the machining head and extending in the axial direction, and a bar moving device that moves the boring bar in the axial direction so as not to rotate, and the blade drive device includes: a main rod with one end thereof coupled with the machining head and extending in the axial direction; and a main rod support device that supports the main rod and moves in the axial direction together with the main rod so as to follow the machining head.

11. The long shaft inner surface machining apparatus according to claim 7, wherein the head support device includes the boring bar with one end thereof coupled with the inner surface copy head and extending in the axial direction, and a bar support member that supports the boring bar so as not to rotate and so as not to move in the axial direction, and the blade drive device includes: a main rod with one end thereof coupled with the blade head and extending in the axial direction; and a rotary drive device that rotary-drives the main rod around a shaft axis.

12. The long shaft inner surface machining apparatus according to claim 8,
wherein the head support device includes the boring bar with one end thereof coupled with the machining head and extending in the axial direction, and a bar support member that supports the boring bar so as not to rotate and so as not to move in the axial direction, and
the blade drive device includes: a main rod with one end thereof coupled with the machining head and extending in the axial direction; and a main rod support device that supports the main rod.

13. The long shaft inner surface machining apparatus according to claim 9, wherein the head support device includes a hydraulic supply device that supplies liquid through the hollow of the boring bar to give the inner surface copy head hydraulic pressure,
the inner surface copy head includes: a cylindrical main body with a diameter insertable into the prepared hole of the long shaft in the axial direction; a pair of inner surface chucks positioned with an interval in an axial direction of the main body; and a pair of pistons provided movably in opposite directions of the axial direction within the main body and between the inner surface chucks,
each inner surface chuck includes in a circumferential direction: three or more sets of a revolving rotor rotatable so as to permit axial direction movement of the machining head relative to the long shaft; and a guide member provided movably in the radial direction within the main body and causes axial direction movement of the pistons to move the revolving rotor in the radial direction, and
the main body includes a hydraulic channel that supplies the liquid between the pair of pistons from the hollow of the boring bar.

14. The long shaft inner surface machining apparatus according to claim 10, wherein the head support device includes a hydraulic supply device that supplies liquid through the hollow of the boring bar to give the machining head hydraulic pressure,
the machining head includes: a cylindrical head body with a diameter insertable into the prepared hole of the long shaft in the axial direction; a pair of inner surface chucks positioned with an interval in an axial direction of the head body; and a pair of pistons provided movably in opposite directions of the axial direction within the head body and between the inner surface chucks,
each inner surface chuck includes in a circumferential direction: three or more sets of a free roller rotatable so as to permit movement in the axial direction and rotation of the machining head relative to the long shaft; and a guide member provided movably in the radial direction within the head body and causes axial direction movement of the pistons to move the free roller in the radial direction, and
the head body includes a hydraulic channel that supplies the liquid between the pair of pistons from the hollow of the boring bar.

15. The long shaft inner surface machining apparatus according to claim 9, wherein the main rod includes the hollow penetrating through in the axial direction, and the blade drive device includes: the blade drive rod extending in the axial direction through the hollow of the main rod and coupled with the axial direction moving member; and a shaft moving device that moves the blade drive rod relative to the main rod in the axial direction.

16. The long shaft inner surface machining apparatus according to claim 9, wherein the blade head includes: a cylindrical sub body supported rotatably around a shaft axis thereof against the inner surface copy head; and a tool base including the blade at a tip end thereof and including an inclined tooth guided movably in the radial direction within the sub body and inclined with reference to a shaft axis, the axial direction moving member includes an inclined tooth meshing with the inclined tooth of the tool base.

17. The long shaft inner surface machining apparatus according to claim 10, wherein the machining head includes a head body and a tool base including an inclined tooth guided movably in the radial direction within the body and inclined with reference to a shaft axis, the tool base including the blade at a tip end thereof, and the axial direction moving member includes an inclined tooth meshing with the inclined tooth of the tool base.

18. The long shaft inner surface machining apparatus according to claim 9, wherein the blade drive device includes: a main rod support part provided at a position between the long shaft support device and the rotary drive device closer to the long shaft support device, which supports the main rod rotatably; and a middle support part provided movably in the axial direction at a position between the main rod support part and the rotary drive device, which supports the main rod rotatably.

19. The long shaft inner surface machining apparatus according to claim 18, wherein the middle support part is coupled with the rotary drive device by a cord.

20. The long shaft inner surface machining apparatus according to claim 19, wherein the blade drive device further comprises a driven mechanism that mechanically and operatively associates with axial direction movement of the rotary drive device to move the middle support part in a same moving direction and by a moving amount less than an axial direction movement amount of the rotary drive device.

21. The long shaft inner surface machining apparatus according to claim 9, wherein
the boring bar includes a second hollow extending in the axial direction,
the head support device includes a machining fluid supply device that supplies machining fluid to the machining head via the second hollow of the boring bar, and
the machining head includes a machining fluid channel that guides machining fluid supplied from the machining fluid supply device close to a part to be cut.

22. The long shaft inner surface machining apparatus according to claim 21, wherein a machining fluid outlet of the machining fluid channel is provided under the machining head.

23. The long shaft inner surface machining apparatus according to claim 5, wherein the machining head includes, as the blade, a first blade and a second blade, operatively in association with a retracting motion by the first blade from a machining position to cut the inner surface inwardly in the radial direction, the second blade is moved to a machining position outside of the radial direction from inside of the radial direction.

24. The long shaft inner surface machining apparatus according to claim 5, wherein the long shaft support device includes a chuck device that supports by grasping both end parts of the long shaft; a chuck rotation device that rotates the chuck device so as to rotate, together with the long shaft, the inner surface copy head attached to the inner circumferential surface of the long shaft relative to the blade head; and a measurement instrument disposed to the blade head to measure a position of a measurement point on the inner circumferential surface, wherein the position measurement is to measure a position in the radial direction with reference to a center of the relative rotation, and the relative rotation shifts the measurement point in a circumferential direction.

25. The long shaft inner surface machining apparatus according to claim 6, wherein the long shaft support device includes:
    a chuck device that supports by grasping both end parts of the long shaft;
    a chuck rotation device that rotates the chuck device so as to rotate the long shaft relative to the machining head; and
    a measurement instrument disposed to the machining head to measure a position of a measurement point on an inner circumferential surface of the long shaft,
    wherein the position measurement is to measure a position in the radial direction with reference to a center of the relative rotation, and the relative rotation shifts the measurement point in a circumferential direction.

26. The long shaft inner surface machining apparatus according to claim 9, further comprising a contact detection sensor to detect a contact of the blade with the inner surface of the prepared hole.

27. The long shaft inner surface machining apparatus according to claim 26, wherein the blade head includes a tool base with the blade attached at a tip end thereof and movable in the radial direction, where the axial direction moving member is driven in the axial direction and the axial direction movement moves the tool base in the radial direction,
    the blade drive device includes a blade drive rod that moves the axial direction moving member in the axial direction, and
    the contact detection sensor is a pressure sensor or a strain gauge provided coming with the tool base, the axial direction moving member or the blade drive rod.

28. The long shaft inner surface machining apparatus according to claim 26, wherein the contact detection sensor is a sound sensor or a vibration sensor attached to the machining head.

29. The long shaft inner surface machining apparatus according to claim 5,
    wherein the blade head is supported by the inner surface copy head rotatably around a shaft axis thereof in a state of being attached to the inner surface copy head, and is rotary-driven by the blade drive device, and
    an inner surface inspection head is further provided that inspects the inner surface in a state of being attached to the inner surface copy head instead of the blade head.

30. The long shaft inner surface machining apparatus according to claim 29, wherein the inner surface inspection head includes: a radial direction moving member movable in a radial direction of the long shaft; a driving device that moves the radial direction moving member in the radial direction; a contact detection sensor that detects a contact between the radial direction moving member and the inner surface and outputs a signal of the contact; and a distance measurement part that measures, based on the signal, a distance where the radial direction moving member moves in the radial direction from an initial position to a contact position for the contact with the inner surface, and
    the long shaft inner surface machining apparatus comprises a relative rotation device that rotates the inner surface inspection head relative to the long shaft around a shaft center of the long shaft.

31. The long shaft inner surface machining apparatus according to claim 29, wherein the inner surface inspection head includes a laser distance meter that applies laser to the inner surface to measure a distance to the inner surface based on the laser reflected from the inner surface, and
    the long shaft inner surface machining apparatus comprises a relative rotation device that rotates the inner surface inspection head relative to the long shaft around a shaft center of the long shaft.

32. The long shaft inner surface machining apparatus according to claim 29, wherein the inner surface inspection head includes an image pickup device that images the inner surface.

33. The long shaft inner surface machining apparatus according to claim 29, wherein the inner surface inspection head includes: a radial direction moving member movable in a radial direction of the long shaft; a driving device that moves the radial direction moving member in the radial direction; a contact detection sensor that detects a contact between the radial direction moving member and the inner surface and outputs a signal of the contact; and a distance measurement part that measures, based on the signal, a distance where the radial direction moving member moves in the radial direction from an initial position to a contact position for the contact with the inner surface, and
    a plurality of sets of the radial direction moving members, the driving devices, the contact detection sensors, and the distance measurement parts are provided, where these plurality sets of radial direction moving members are provided at mutually different positions in a circumferential direction revolving around a shaft of the long shaft.

34. The long shaft inner surface machining apparatus according to claim 29, wherein the inner surface inspection head includes a laser distance meter that applies laser to the inner surface to measure a distance to the inner surface based on the laser reflected from the inner surface, and
    a plurality of the laser distance meters are provided in a circumferential direction revolving around a shaft of the long shaft.

35. A long shaft inner surface machining method that cuts an inner surface of a long shaft including a prepared hole penetrating therethrough in an axial direction so as to copy the prepared hole using the long shaft inner surface machining apparatus according to claim 5, comprising the steps of:
    preparing a machining head including a cylindrical main body, a cylindrical sub body supported rotatably around a shaft axis thereof, and a blade for inner surface machining capable of protruding from the sub body, the main body having a diameter insertable into the prepared hole of the long shaft in the axial direction, and the sub body having a diameter insertable into the prepared hole of a minimum diameter of the long shaft in the axial direction;
    after inserting the machining head into the long shaft, radially expanding a diameter of a pair of inner surface chucks positioned with an interval in an axial direction of the main body so as to let a shaft axis of the main body coincide with a shaft axis of the prepared hole and support the main body movably in the axial direction;
    letting the blade for inner surface machining protrude from the sub body;
    moving the main body in the axial direction from outside, while performing inner surface machining so as to copy the prepared hole by rotary-driving the sub body around a shaft axis thereof from outside; and then reversing the axial direction of the long shaft, and performing inner machining in a similar manner.

36. A long shaft inner surface machining method that cuts an inner surface of a long shaft including a prepared hole penetrating therethrough in an axial direction so as to copy the prepared hole using the long shaft inner surface machining apparatus according to claim 6, comprising the steps of:

preparing a machining head including a cylindrical head body and a blade for inner surface machining capable of protruding from the head body, the head body including a part formed with a diameter insertable into the prepared hole of the long shaft in the axial direction and a part formed with a diameter insertable into the prepared hole of a minimum diameter of the long shaft in the axial direction;

after inserting the machining head into the long shaft, radially expanding a diameter of a pair of inner surface chucks positioned with an interval in an axial direction of the head body so as to let a shaft axis of the machining head coincide with a shaft axis of the prepared hole and support the same movably in the axial direction, while permitting rotation of the long shaft with reference to the machining head;

letting the blade for inner surface machining protrude from the head body;

moving the machining head in the axial direction from outside, while rotating the long shaft around the shaft axis to perform inner surface machining so as to copy the prepared hole; and then reversing the axial direction of the long shaft, and performing inner machining in a similar manner.

37. A long shaft inner surface machining method that cuts an inner surface of a long shaft including a prepared hole penetrating therethrough in an axial direction so as to copy the prepared hole using the long shaft inner surface machining apparatus according to claim 7, comprising the steps of:

preparing a machining head including a cylindrical main body, a cylindrical sub body supported rotatably around a shaft axis thereof, and a blade for inner surface machining capable of protruding from the sub body, the main body having a diameter insertable into the prepared hole of the long shaft in the axial direction, and the sub body having a diameter insertable into the prepared hole of a minimum diameter of the long shaft in the axial direction;

after inserting the machining head into the long shaft, radially expanding a diameter of a pair of inner surface chucks positioned with an interval in an axial direction of the main body so as to let a shaft axis of the main body coincide with a shaft axis of the prepared hole in a state of permitting axial direction movement of the long shaft;

letting the blade for inner surface machining protrude from the sub body;

moving the long shaft in the axial direction, while rotary-driving the sub body around the shaft axis from outside to perform inner surface machining so as to copy the prepared hole; and then reversing the axial direction of the long shaft, and performing inner machining in a similar manner.

38. A long shaft inner surface machining method that cuts an inner surface of a long shaft including a prepared hole penetrating therethrough in an axial direction so as to copy the prepared hole using the long shaft inner surface machining apparatus according to claim 8, comprising the steps of:

preparing a machining head including a cylindrical head body and a blade for inner surface machining capable of protruding from the head body, the head body including a part formed with a diameter insertable into the prepared hole of the long shaft in the axial direction and a part formed with a diameter insertable into the prepared hole of the long shaft in the axial direction;

after inserting the machining head into the long shaft, radially expanding a diameter of a pair of inner surface chucks positioned with an interval in an axial direction of the head body so as to let a shaft axis of the machining head coincide with a shaft axis of the prepared hole and permit axial direction movement and rotation of the long shaft with reference to the machining head;

letting the blade for inner surface machining protrude from the head body;

moving the long shaft in the axial direction, while rotating the long shaft around the shaft axis to perform inner surface machining so as to copy the prepared hole; and then reversing the axial direction of the long shaft, and performing inner machining in a similar manner.

\* \* \* \* \*